United States Patent [19]
Yamaguchi et al.

[11] Patent Number: 5,654,607
[45] Date of Patent: Aug. 5, 1997

[54] IMAGE FORMING DEVICE AND METHOD INCLUDING SURFACE-CONDUCTION ELECTRON EMITTING DEVICES AND AN ELECTRODE ARRAY FOR GENERATING AN ELECTRON BEAM

[75] Inventors: Eiji Yamaguchi, Zama; Yoshiyuki Osada, Atsugi; Hidetoshi Suzuki, Fujisawa; Toshihiko Takeda, Atsugi; Hiroaki Toshima, Tokyo; Aoji Isono; Noritake Suzuki, both of Atsugi; Yasuyuki Todokoro, Yokohama, all of Japan

[73] Assignee: Canon Kabushiki Kaisha, Tokyo, Japan

[21] Appl. No.: 222,228

[22] Filed: Apr. 4, 1994

[30] Foreign Application Priority Data

| Apr. 5, 1993 | [JP] | Japan | 5-077899 |
| Mar. 25, 1994 | [JP] | Japan | 6-056124 |
| Apr. 5, 1995 | [JP] | Japan | 5-077898 |

[51] Int. Cl.⁶ .................................................. H01V 1/62
[52] U.S. Cl. ............................................................ 313/495
[58] Field of Search ..................................... 313/495–497

[56] References Cited

U.S. PATENT DOCUMENTS

| 4,126,814 | 11/1978 | Marlowe | 315/307 |
| 4,547,797 | 10/1985 | Mick | 358/27 |

FOREIGN PATENT DOCUMENTS

| 0497412 | 8/1992 | European Pat. Off. . |
| 0523702 | 1/1993 | European Pat. Off. . |
| 2656484 | 6/1991 | France . |
| 4531615 | 10/1970 | Japan . |
| 45-31615 | 10/1970 | Japan . |
| 64-31332 | 2/1989 | Japan . |
| 6431332 | 2/1989 | Japan . |

OTHER PUBLICATIONS

Hisashi Ariaki et al., "Electroforming and Electron Emission of Carbon Thin Films", Journal of the Vacuum Society of Japan, vol. 26, No. 1, p. 22 (1983).
G. Dittmer, "Electrical Conduction and Electron Emission of Discontinuous Thin Films," An International Journal on Their Science and Technology, vol. 9 (1972).
W.P. Dyke et al., "Field Emission", Advances in Electronics and Electron Physics, vol. 8, (1956).
H. Araki, et al., "Electroforming and Electron Emission of Carbon Thin Films", Journal of the Vacuum Society of Japan, vol. 26, No. 1.
M. Hartwell et al., "Strong Electron Emission from Patterned Tin —Indium Oxide Thin Films", Trans, Int'l Electron Devices Meeting, p. 519, 1975.
C.A. Mead, "Operation of Tunnel–Emission Devices", Journal of Applied Physics, vol. 32, No. 4, p. 646.
M.I. Elinson et al., "The Emission of Hot Electrons and The Field Emission of Electrons From Tin Oxide", Radio Engineering and Electronic Physics, p. 1290, 1965.
C.A. Spindt, et al., "Physical Properties of Thin–Film Field Emission Cathodes with molybdenum Cones", Journal of Applied Physics, vol. 47, No. 12, Dec. 1976.

Primary Examiner—Stephen Brinich
Attorney, Agent, or Firm—Fitzpatrick, Cella, Harper & Scinto

[57] ABSTRACT

A color display device has an evacuated vessel accommodating at least an electron-beam generating source in which a plurality of surface-conduction electron emitting devices are arrayed on a substrate, and phosphors for the three primary colors red, green and blue for emitting light in response to being irradiated with electron beams from the electron-beam generating source. A modulator is provided to modulate the electron beams, which irradiate the phosphors, based upon an image signal, the modulator having γ-corrector for subjecting the image signal to a gamma correction. The modulator modulates the electron beams based upon the image signal corrected in advance by the γ-corrector.

17 Claims, 36 Drawing Sheets

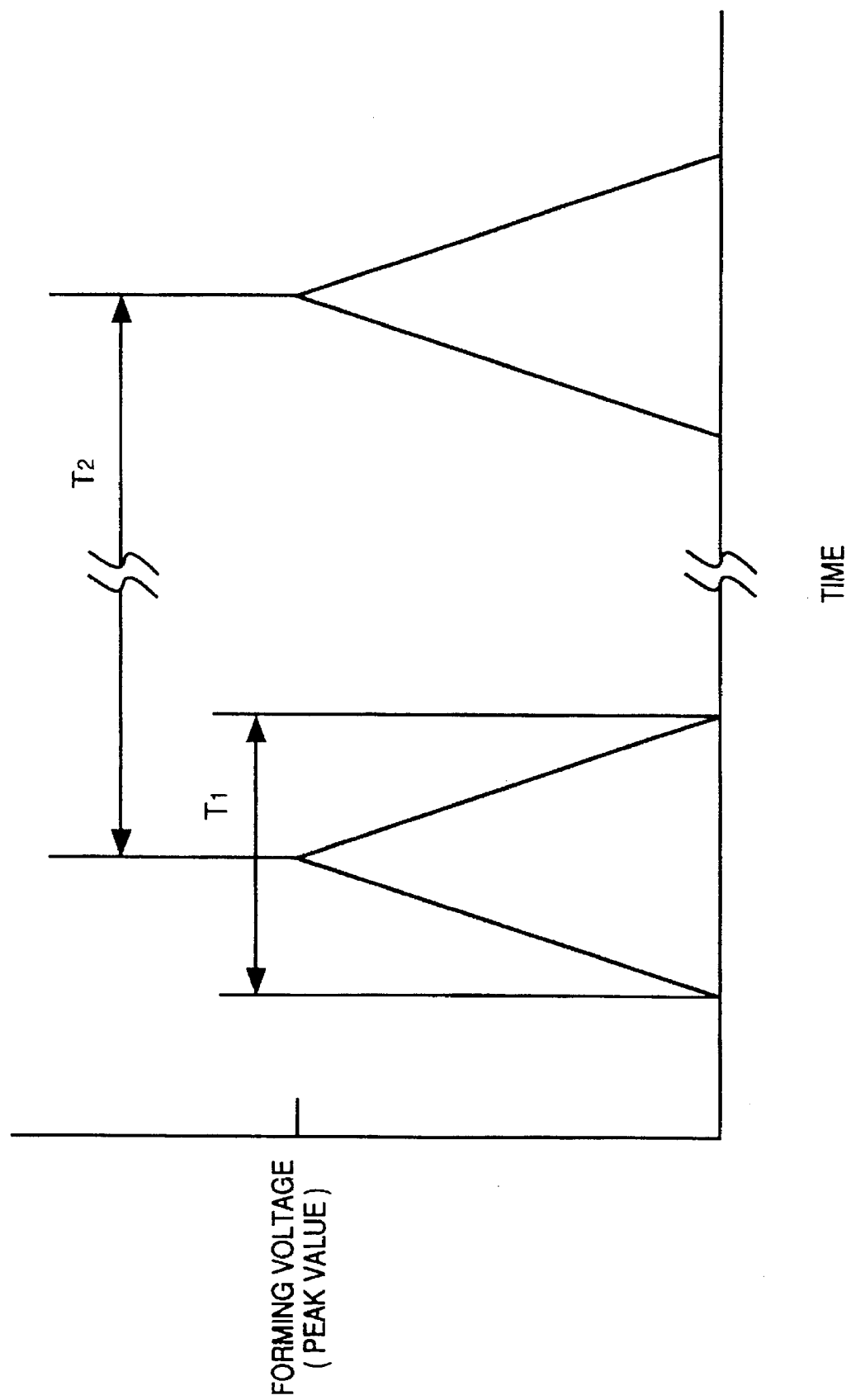

STRIPES

291 BLACK CONDUCTOR

292 PHOSPHOR

MATRIX

291 BLACK CONDUCTOR

292 PHOSPHOR

FIG. 14

FORMULA ON PICK-UP TUBE SIDE $$\begin{bmatrix} E_Y \\ E_I \\ E_Q \end{bmatrix} = \begin{bmatrix} 0.30 & 0.59 & 0.11 \\ 0.60 & -0.28 & -0.32 \\ 0.21 & -0.52 & 0.31 \end{bmatrix} \begin{bmatrix} E_R \\ E_G \\ E_B \end{bmatrix}$$

FORMULA ON PICTURE TUBE SIDE $$\begin{bmatrix} E_R \\ E_G \\ E_B \end{bmatrix} = \begin{bmatrix} 1 & 0.96 & 0.63 \\ 1 & -0.28 & -0.64 \\ 1 & -1.11 & 1.72 \end{bmatrix} \begin{bmatrix} E_Y \\ E_I \\ E_Q \end{bmatrix}$$

GENERAL FORMULA OF SIGNAL $$E_C = E_C + E_Q \sin(W_t + 33) + E_I \cos(W_t + 33)$$

⎰⎱ : COEFFICIENTS OF MATRIX CIRCUIT $$e_1 = \frac{Y_1 \cdot E_R + Y_2 \cdot E_G + Y_3 \cdot E_B}{Y_0 + Y_1 + Y_2 + Y_3}$$

$$\left(Y_n = \frac{1}{R_n}\right)$$

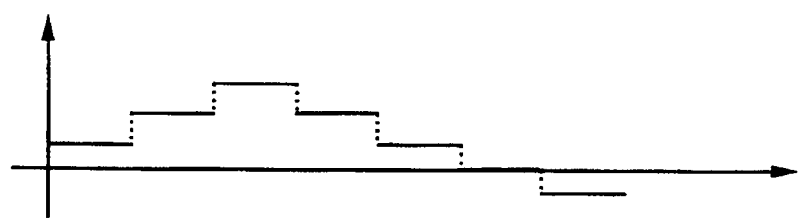
FIG. 19A
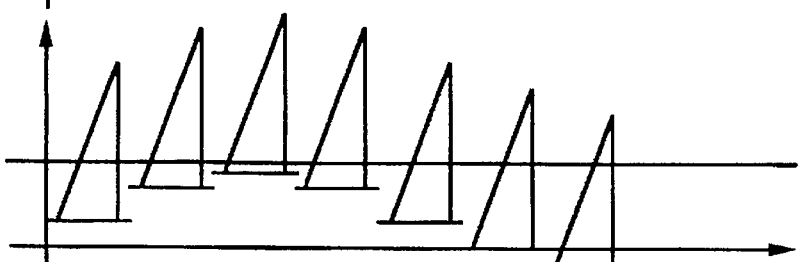
FIG. 19B1
COMPARISON
REFERENCE
LEVEL VOLTAGE
PEAK VALUE 25
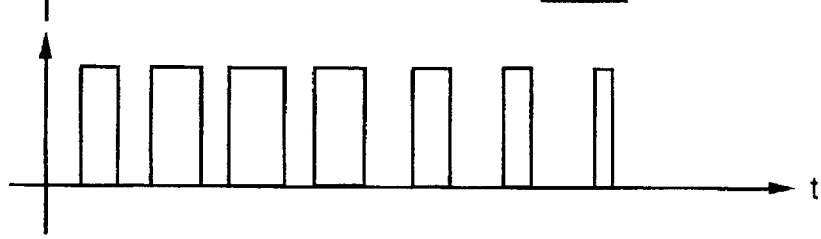
FIG. 19C1
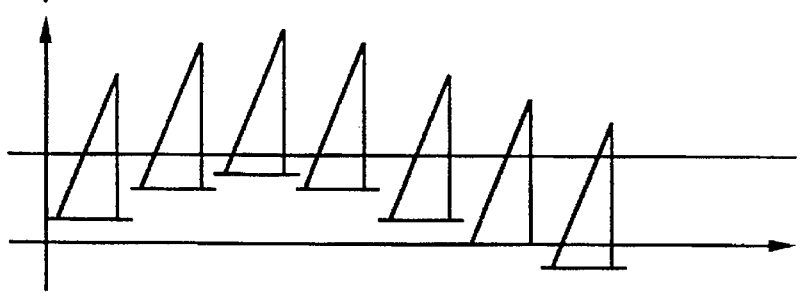
FIG. 19B2
COMPARISON
REFERENCE
LEVEL VOLTAGE
PEAK VALUE 20
FIG. 19C2
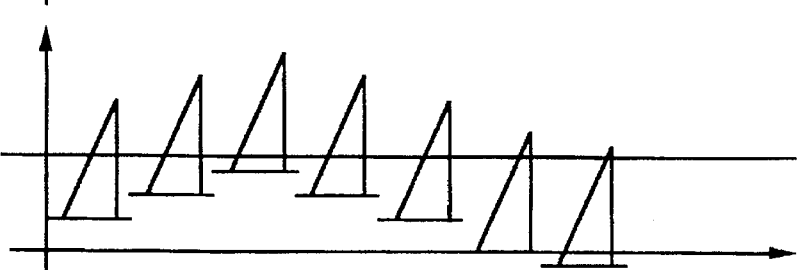
FIG. 19B3
COMPARISON
REFERENCE
LEVEL VOLTAGE
PEAK VALUE 16
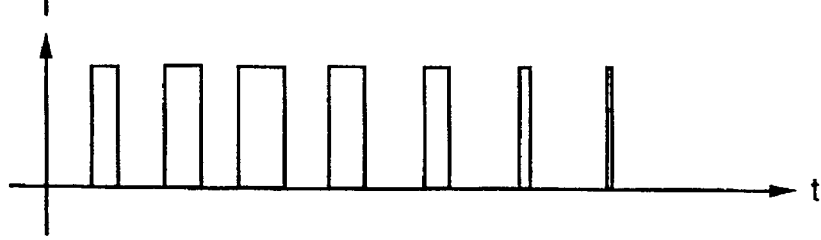
FIG. 19C3

FIG. 21A
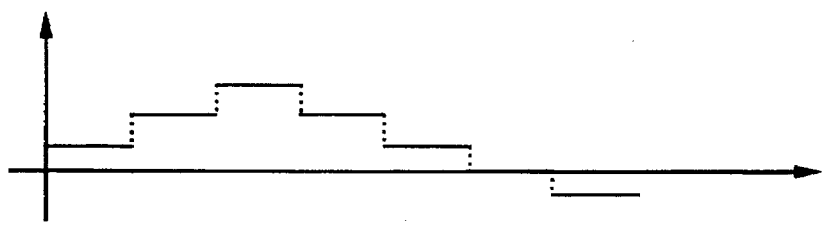
FIG. 21B
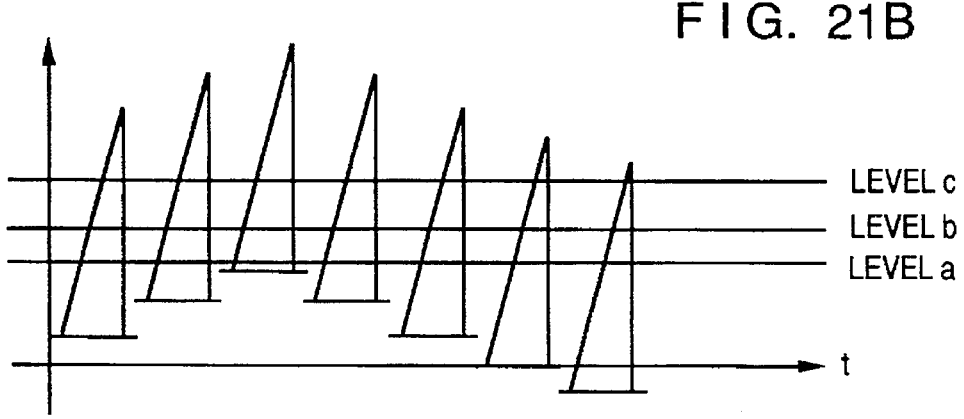
FIG. 21C1
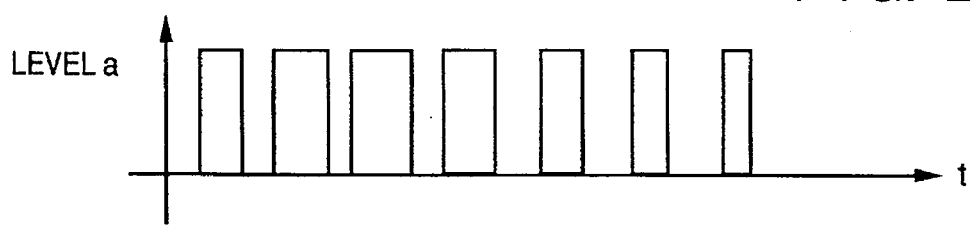
FIG. 21C2
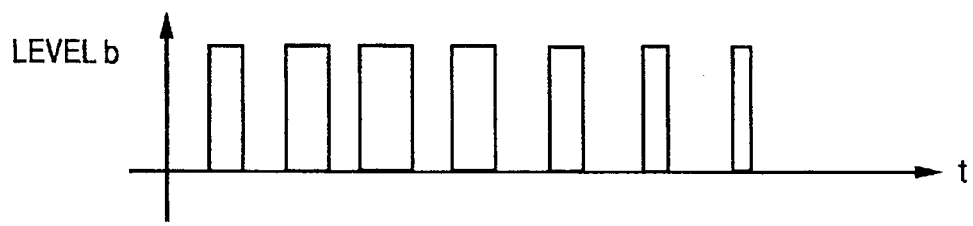
FIG. 21C3
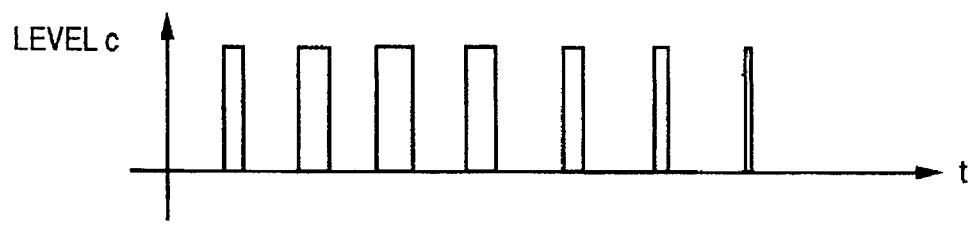

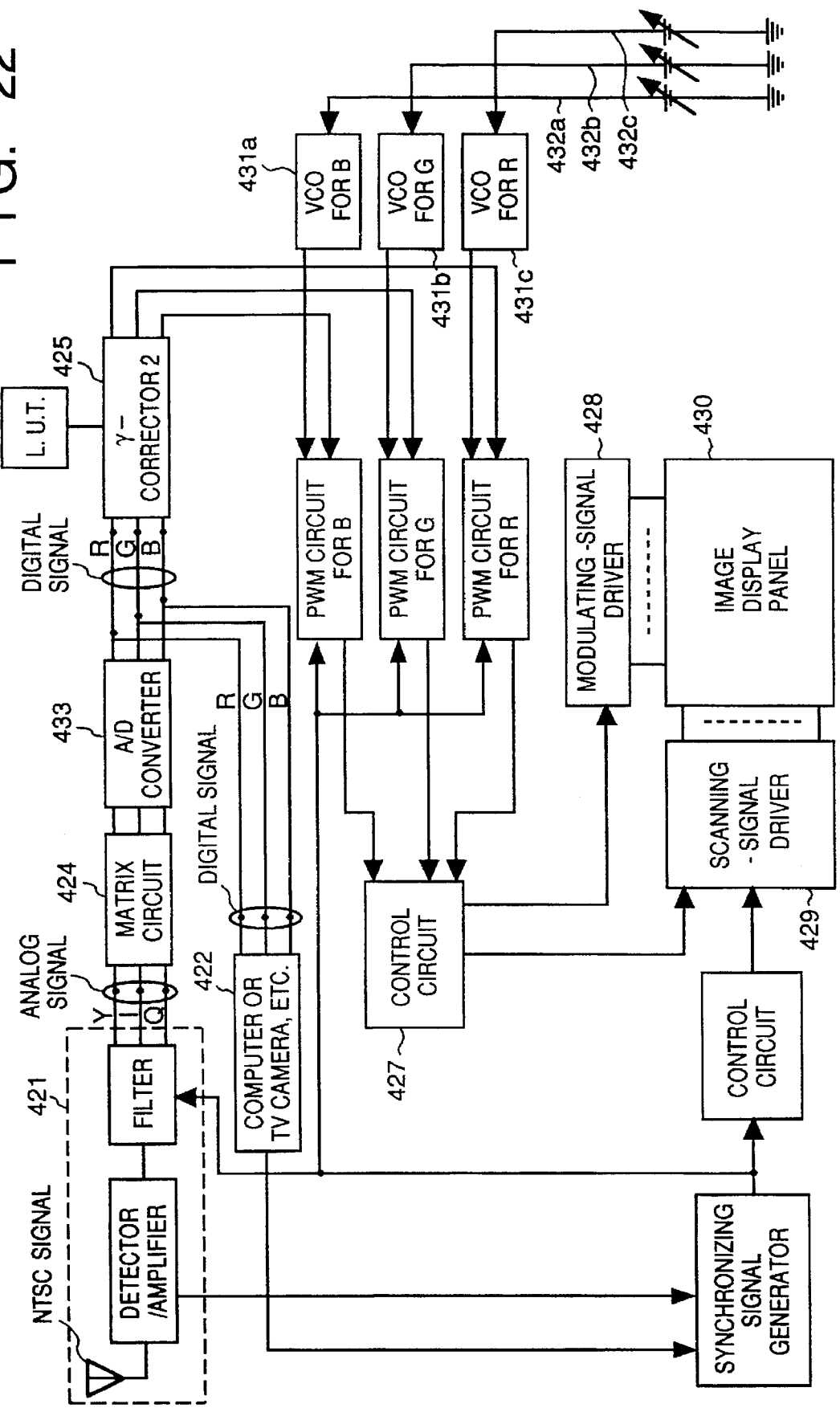

FIG. 23A
| | INPUT SIDE | OUTPUT SIDE |
|---|---|---|
| 1 | 00H | 00H |
| ⋮ | ⋮ | ⋮ |
| 200 | 55H | AAH |
| ⋮ | ⋮ | ⋮ |
| 256 | FFH | FFH |
EXAMPLE OF LUT ( LOOK UP TABLE)
FIG. 23B
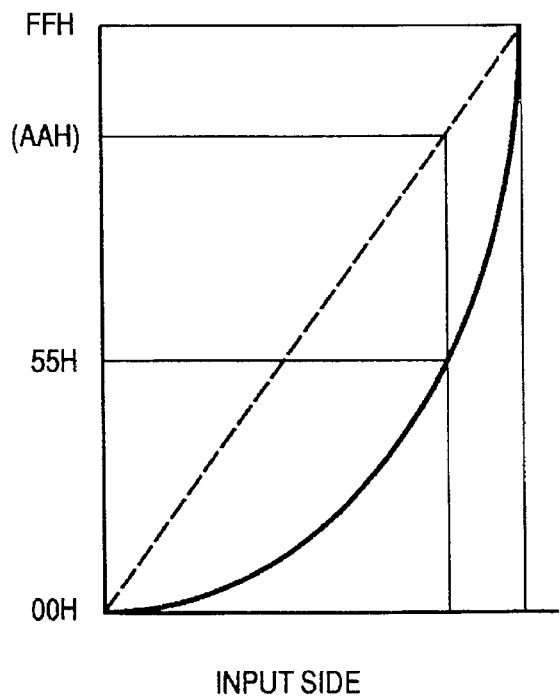
INPUT SIDE
FIG. 23C
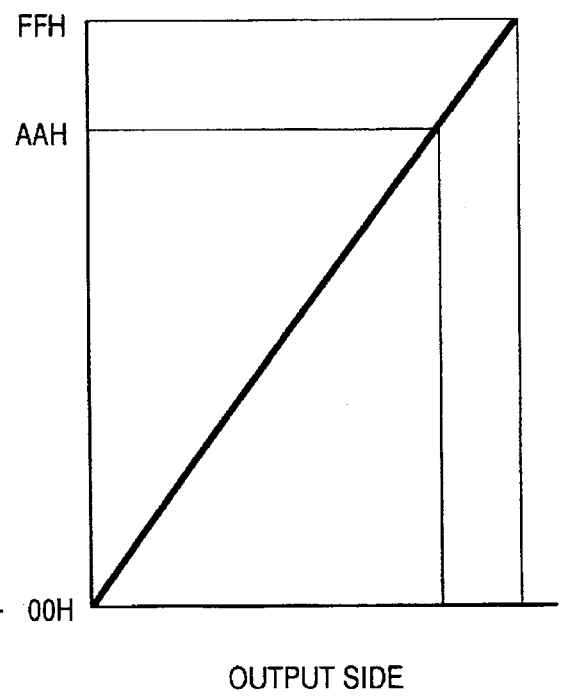
OUTPUT SIDE
EXAMPLE OF LUT ( LOOK UP TABLE) FOR PHOSPHOR GAMMA CORRECTION

IMAGE FORMING DEVICE AND METHOD INCLUDING SURFACE-CONDUCTION ELECTRON EMITTING DEVICES AND AN ELECTRODE ARRAY FOR GENERATING AN ELECTRON BEAM

BACKGROUND OF THE INVENTION

1. Field of the Invention

This invention relates to an electron source and an image forming device, such as a display device, that is an application thereof. More particularly, the invention relates to an image forming device and an image forming method in which a plurality of cold cathode electron sources are arrayed two-dimensionally in a plane to present a color display.

2. Description of the Related Art

Two types of electron sources, namely thermionic cathode and cold cathode electron sources, are known as electron emission devices. Examples of cold cathode electron sources are electron emission devices of the field emission type (abbreviated to "FE" below), metal/insulator/metal type (abbreviated to "MIM" below) and surface-conduction emission type (abbreviated to "SCE").

Known examples of the FE type are described by W. P. Dyke and W. W. Dolan, "Field emission", Advance in Electron Physics, 8.89 (1956) and by C. A. Spindt, "Physical properties of thin-film field emission cathodes with molybdenum cones", J. Appl. Phys., 47.5248 (1976).

A known example of the MIM type is described by C. A. Mead, "The tunnel-emission amplifier", J. Appl. Phys., 32.616 (1961).

A known example of the SCE type is described by M. I. Elinson, Radio. Eng. Electron Phys., 10 (1965).

The SCE type makes use of a phenomenon in which an electron emission is produced in a small-area thin film, which has been formed on a substrate, by passing a current parallel to the film surface.

Various examples of this surface-conduction electron emitting devices have been reported. One relies upon a thin film of $SnO_2$ according to Elinson, mentioned above. Other examples use a thin film of Au [G. Dillmer: "Thin Solid Films", 9.319 (1972)]; a thin film of $In_2O_3/SnO_2$ [M. Harwell and C. G. Fonstad: "IEEE Trans. E. D. Conf.", 519 (1975)]; and a thin film of carbon [Hisashi Araki, et al: "Vacuum", Vol. 26, No. 1, p. 22 (1983)].

FIG. 33 illustrates the construction of the device according to M. Hartwell, described above. This device is typical of the surface-conduction electron emitting devices. As shown in FIG. 33, numeral 2501 denotes an insulative substrate. Numeral 2502 denotes a H-shaped thin film for forming an electron-emitting region. The thin film 2502 comprises a thin film of a metal oxide formed by sputtering. An electron-emitting region 2503 is formed by an electrification process referred to as "forming", described below. Numeral 2504 designates a thin film, which includes the electron-emitting region 2503 formed on the thin film for forming the electron-emitting region. Further, L1 is set to 0.5~1 mm, and W is set to 0.1 mm.

In these conventional surface-conduction electron emitting devices, generally the electron-emitting region 2503 is formed on the thin film 2502, which is for forming the electron-emitting region, by the so-called "forming" electrification process before electron emission is performed. According to the forming process, a voltage is impressed across the thin film 2502, which is for forming the electron-emitting region, thereby locally destroying, deforming or changing the property of the thin film 2502 and forming the electron-emitting region 2503, the electrical resistance of which is high.

The forming process causes a crack in part of the thin film 2502, which is for forming the electron-emitting region. Electrons are emitted from the vicinity of the crack. In the surface-conduction electron emitting devices that has been subjected to the above-described forming treatment, a voltage is applied to the thin film 2502, and a current is passed through the device, whereby electrons are emitted from the electron-emitting region 2503.

Various problems in terms of practical application are encountered in these conventional surface-conduction electron emitting devices. However, the applicant has solved these practical problems by exhaustive research regarding improvements set forth below.

Since the foregoing surface-conduction electron emitting devices is simple in structure and easy to manufacture, an advantage is that a large number of devices can be arrayed over a large surface area. Accordingly, a variety of applications that exploit this feature have been studied. For example, electron beam sources and display devices can be mentioned. As an example of a device in which a number of surface-conduction electron emitting devices are formed in an array, mention can be made of an electron source in which surface-conduction electron emitting devices are arrayed in parallel and both ends of the individual devices are connected by wiring to obtain a row, a number of which are provided in an array (for example, see Japanese Patent Application Laid-Open NO. 1-031332, filed by the applicant).

Further, in an image forming device such as a display device, flat-type displays using liquid crystal have recently become popular as a substitute for CRTs. However, since such displays do not emit their own light, a problem encountered is that they require back-lighting. Thus, there is a need to develop a display device of the type that emits its own light.

Since the foregoing surface-conduction electron emitting devices is structurally simple and readily lends itself to manufacture, an advantage is that a large number of devices can be arrayed over a large surface area. Accordingly, there area a variety of applications that exploit this feature.

Certain problems arise in prototype image forming devices produced using the known surface-conduction electron emitting devices described above. These problems will now be described.

By way of example, a display device shown in FIGS. 34 and 35 has been developed, as described in the specification of Japanese Patent Publication No. 45-31615. FIG. 35 illustrates the display device as seen from the direction of arrow A in FIG. 34. The display device includes serially connected lateral-current electron emission bodies 2512 and stripe-shaped transparent electrode 2514 arranged so as to form a lattice together with the electron emission bodies 2512. Glass plates 2513 each having a small hole 2513' are arranged between the lateral-current electron emission bodies 2512 and the transparent electrode 2514. The glass plates 2513 are arranged in such a manner that the holes 2513' will be situated at positions where they intersect the lateral-current electron emission bodies 2512 and the transparent electrode 2514. Furthermore, a gas is sealed in the holes 2513'. Only the intersection between a lateral-current electron emission body 2512 emitting electrons and a transparent electrode 2514 to which an accelerating voltage E2 is applied emits light owing to electrical discharge of the gas.

Though the lateral-current electron emission body 2512 is not described in detail in the aforesaid specification of Japanese Patent Publication No. 45-31615, the disclosed material (a metallic thin film, a NESA film) and the structure of a neck portion 2512' are identical with those of the surface-conduction electron emitting devices set forth above, and therefore it is believed that the disclosed device falls within the scope of a surface-conduction electron emitting devices. (Furthermore, the term "surface-conduction electron emitting devices" used by the inventors of this application is in line with the description given in thin-film handbooks.)

The problems encountered with the foregoing display device are as follows:

(1) Electrons emitted from the lateral-current electron emission bodies are accelerated and collide with the gas molecules to produce an electric discharge in the display device. However, even if the same current is passed through a lateral-current electron emission body, there is a disparity in the luminance of the light emitted by the discharge and luminance fluctuates even for one and the same pixel. This is caused by the fact that the strength of the discharge is highly dependent upon the state of the gas, thereby resulting in poor controllability. Another cause is that the output of the lateral-current electron emission body is not always stable under a pressure of 15 mmHg, which is of the kind introduced in an experiment. For these reasons the aforesaid display device finds difficulty in presenting a multiple-tone display, and use of such a display device is limited.

(2) Though it is possible to change the color of the emitted light by changing the type of gas sealed in the aforesaid display device, the wavelength of visible light generally obtained with a discharge light emission is limited and a wide range of colors cannot always be displayed. In addition, there are cases in which the optimum pressure of the discharge light emission differs depending upon the type of gas. Accordingly, when it is attempted to change the color displayed by a single panel, it is necessary to change the type and pressure of the gas sealed in each hole. This results in a panel having a very complicated structure. Stacking three panels in each of which a different gas is sealed in order to produce a change in color is unrealistic.

(3) The aforesaid display device has a complicated structure since it is a combination of such components as the substrate of the lateral-current electron emission bodies, the transparent electrodes and gas-filled holes. This makes it difficult to provide an inexpensive display device. Further, as illustrated in the aforementioned patent publication, the threshold voltage of the discharge light emission is a high 35 V. This means that it is necessary to use electrical devices having a high withstand voltage in the electrical circuitry that drives the panel. This also is a cause of an increase in the cost of the display device.

Thus, the problems set forth above arise in a case where light is emitted and color produced by inducing an electrical discharge in gas using the conventional surface-conduction electron emitting devices.

There is a method available which uses phosphors as a structural device for emitting light and producing color in an image display device equipped with surface-conduction electron emitting devices. However, the luminance of the light emitted by phosphors generally has a non-linear characteristic with respect to the density of the current with which it is irradiated. Further, this characteristic is not the same for each of the primary colors [red (R), green (G) and blue (B)]. Accordingly, in a case where the irradiation current value is made the same variable quantity with regard to each of the colors R, G, B, the ratio of the light-emission luminances among the colors R, G, B before and after a change generally differs. In other words, the balance of each color differs.

SUMMARY OF THE INVENTION

The present invention has been devised in view of the foregoing problems and its object is to provide an image forming device and method using surface-conduction electron emitting devices, wherein it is possible to obtain a superior tone display characteristic and readily achieve control of color shift and color balance in a case where color is changed.

An image forming apparatus according to the present invention has the following characterizing features in order to attain the foregoing object:

(1) Specifically, there is provided an image forming device having an electron-beam generating source in which a plurality of surface-conduction electron emitting devices are arrayed on a substrate, and phosphors for the three primary colors red, green and yellow for emitting light in response to being irradiated with electron beams from the electron-beam generating source, at least the electron-beam generating source and the phosphors being sealed in an evacuated vessel, and modulating means for modulating the electron beams, which irradiate the phosphors, based upon an image signal, wherein the modulating means has correcting means for subjecting the image signal to a gamma correction.

An image forming method used in a color display device of the present invention forms an image by modulating the electron beam based upon an image signal gamma-corrected beforehand by the correcting means.

(2) The electron-beam generating source capable of being used in the color display device of the invention includes a plurality of surface-conduction electron emitting devices arrayed two-dimensionally on the substrate, the devices being connected in the form of a matrix by wiring in a row direction and wiring in a column direction.

(3) In the color display device having the electron-beam generating source mentioned in (2) above, the modulating means has correcting means for correcting the image signal based upon a gamma characteristic, of emission-current intensity vs. applied voltage, of the surface-conduction electron emitting devices.

(4) Further, the modulating means has correcting means for correcting the image signal based upon a gamma characteristic, of light-emission intensity vs. amount of electron beam irradiation, of the phosphors.

(5) The electron-beam generating source capable of being used in the color-image display device of the invention includes a device group in which a plurality of surface-conduction electron emitting devices are arrayed along a row direction on the substrate, and an electrode array in which grid electrodes are arrayed along a column direction, which is substantially perpendicular to the row direction, on or off the substrate.

(6) In the color-image display device having the electron-beam generating source mentioned in (5) above, the modulating means has correcting means for correcting the image signal based upon a gamma characteristic, of light-emission intensity vs. amount of electron beam irradiation, of the phosphors.

(7) The modulating means has correcting means for correcting the image signal based upon a gamma characteristic, of amount of electron beam transmission vs. grid-electrode application signal, of the grid electrodes.

(8) In the color-image display device of the invention, a modulating method for modulating the electron beams that irradiate the phosphors includes modulating length of time (pulses), during which the phosphors are irradiated with the electron beams, based upon the gamma-corrected image signal.

(9) In the color-image display device using the modulating method of (8) above, the modulating means has means for adjusting the modulating signal, which is for modulating the electron beams, independently for each of the color components (red, green, blue).

(10) The means for adjusting the modulating signal, which is for modulating the electron beams, independently for each of the color components (red, green, blue) includes a comparator provided individually for each color component of the gamma-corrected image signal, the adjusting means independently adjusting a correlation between a comparison reference of each comparator and the image signal.

(11) The means for adjusting the modulating signal, which is for modulating the electron beam, independently for each of the color components (red, green, blue) includes an amplifier, the amplification factor of which is capable of being adjusted independently, and a comparator, the amplifier and comparator being provided for each color component of the gamma-corrected image signal, the image signal amplified by the amplifiers being compared with reference values in the comparators, whereby modulated pulses are generated.

(12) The means for adjusting the modulating signal, which is for modulating the electron beams, independently for each of the color components (red, green, blue) includes a pulse-width modulator provided individually for each color component of the gamma-corrected image signal, the adjusting means independently adjusting the frequency of an operating reference clock of each pulse-width modulator.

(13) In the color-image display device of the invention, a modulating method for modulating the electron beams that irradiate the fluorescent bodies includes modulating current amplitude of the electron beams, which irradiate the phosphors, based upon the gamma-corrected image signal.

(14) In the color-image display device using the modulating method of (13) above, the modulating means has means for adjusting the modulating signal, which is for modulating the electron beams, independently for each of the color components (red, green, blue).

(15) The means for adjusting the modulating signal, which is for modulating the electron beams, independently for each of the color components (red, green, blue) includes a level shifter provided individually for each color component of the gamma-corrected image signal, the adjusting means independently adjusting amount of shift of each level shifter.

(16) The means for adjusting the modulating signal, which is for modulating the electron beams, independently for each of the color components (red, green, blue) includes an amplifier provided individually for each color component of the gamma-corrected image signal, the adjusting means independently adjusting the amplification factor of each comparator.

In accordance with the present invention, each color signal that includes tone information is converted based upon the light-emission characteristic of a color light-emission panel equipped with surface-conduction electron emitting devices. By driving the light-emission panel based upon converted color signals, an image corrected for color balance and color shift is obtained.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a diagram illustrating the waveform of a forming voltage in the surface-conduction electron emitting devices used in the present invention;

FIG. 14 is a diagram showing an example of ordinary matrix coefficients in a matrix circuit;

FIGS. 19A, 19B1 through 19B3, and 19C1 through 19C3 illustrate signal waveforms at various points in the circuit of FIG. 18;

FIGS. 21A through 21C3 illustrate signal waveforms at various points in the circuit of FIG. 20;

FIG. 22 is a block diagram of a circuit for controlling color signals having tones according to a fourth embodiment;

FIGS. 23A through 23C are diagrams for describing a method of correcting the gamma characteristic of phosphors using the circuit of FIG. 22;

DESCRIPTION OF THE PREFERRED EMBODIMENTS

Figure 1A:
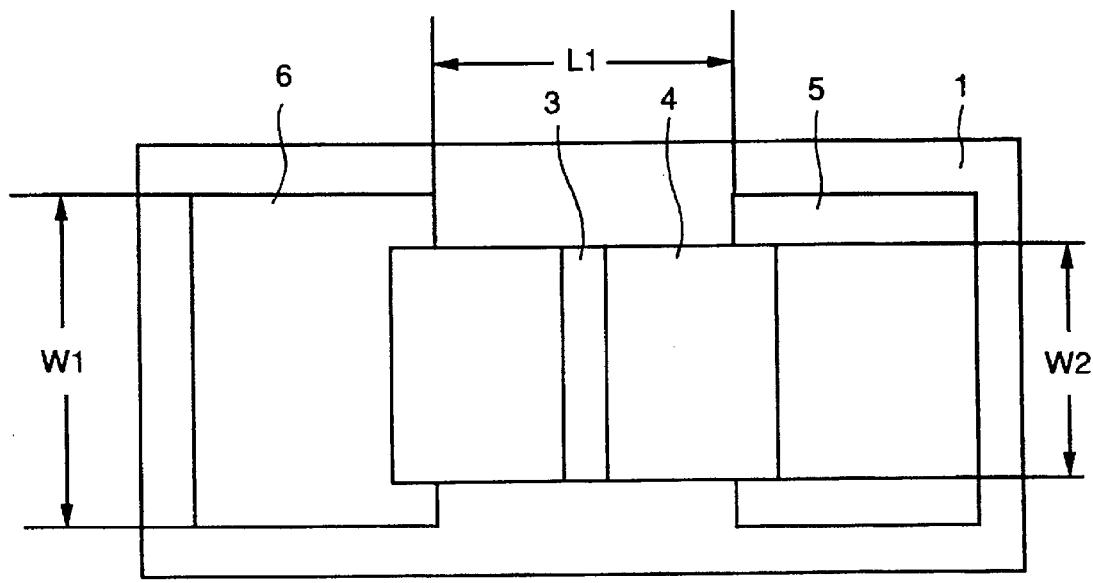
FIGS. 1A and 1B are plan and sectional views, respectively, illustrating a preferred planar-type surface-conduction electron emitting devices used in the present invention.

Preferred modes of an image forming device according to the present invention will now be described.
(First Mode)

A color display device according to the present invention has an evacuated vessel accommodating at least an electron-beam generating source in which a plurality of surface-conduction electron emitting devices are arrayed on a substrate, and phosphors for the three primary colors red, green and yellow for emitting light in response to being irradiated with electron beams from the electron-beam generating source, and modulating means for modulating the electron beams, which irradiate the phosphors, based upon an image signal, wherein the modulating means has correcting means for subjecting the image signal to a gamma correction.

The evacuated vessel comprises a light-transmitting face plate on the inner surface of which phosphors for the three primary colors are formed, a bottom plate and a side wall. The interior of the vessel is held at a vacuum of $10^{-5}$–$10^{-7}$ Torr, by way of example. More specifically, unlike the conventional device having the problem related to electrical discharge in the gas, the phosphors for the three primary colors are directly irradiated with an electron beam emitted in vacuum. This makes it possible to obtain a stable light emission.

An image forming method used in the color display device of the present invention forms an image by modulating the electron beam based upon an image signal gamma-corrected beforehand by the correcting means.

Specifically, a variety of image signals, such as those obtained with the NTSC system, PAL system, SECAM system or in a high-definition television, are corrected beforehand in accordance with the display characteristic (gamma characteristic) of a display panel in which the electron source is equipped with surface-conduction electron emitting devices, and the display panel is modulated based upon the corrected image signals, whereby a display image faithful to the original is obtained.

The electron source, which has the array of the plurality of surface-conduction electron emitting devices used in the color display device according to the invention, will be described in second and fifth modes below.

Further, the means for performing the correction in accordance with the gamma characteristic of the display panel will be described in third, fourth, sixth and seventh modes.

A method of modulating the electron beam will be described in eighth and ninth modes below.
(Second Mode)

According to one aspect, the electron-beam generating source capable of being used in the color display device of the invention includes a plurality of surface-conduction electron emitting devices arrayed two-dimensionally on a substrate, the devices being connected in the form of a matrix by wiring in row and column directions.

More specifically, M×N (where M, N are positive integers) surface-conduction electron emitting devices are formed in rows and columns on an electrically insulative substrate, and N wires in the row direction and the M wires in the column direction are connected in the form of a matrix. By applying appropriate drive signals to the wires, desired ones of the surface-conduction electron emitting devices are caused to emit electron beams. By changing the amplitude or duration of the drive signals, it is possible to readily control the intensity or the amount of electric charge of the electron beams emitted by the surface-conduction electron emitting devices.
(Third Mode)

In the color display device having the electron-beam generating source according to the first aspect, the modulating means has correcting means for correcting the image signal based upon a gamma characteristic of the surface-conduction electron emitting devices, namely emission current strength vs. applied voltage.

The emission current strength of a surface-conduction electron emitting devices generally exhibits a threshold value with respect to applied voltage and increases non-linearly with respect to an increase in voltage above the threshold value. Accordingly, if phosphors are irradiated with an electron beam by driving the surface-conduction electron emitting devices without applying a correction to the image signal, no light emission will take place since only a voltage below the threshold value is impressed upon the device below a certain level of the image signal. In addition, luminance undergoes a sudden change above a certain level of the image signal.

In the color-image display device according to the invention, the image signal is subjected beforehand to a correction that takes into account the electron-beam output characteristic (gamma characteristic) specific to the surface-conduction electron emitting devices. This provides a display more faithful to the original image.

(Fourth Mode)

In the color-image display device having the electron-beam generating source according to the first aspect, the modulating means has correcting means for correcting the image signal based upon a gamma characteristic of the phosphors, namely light emission strength vs. amount of electron beam irradiation.

More specifically, the phosphors for each of the colors red, green and blue exhibit a non-linear change in light-emission intensity with respect to the quantity of electron beams irradiating the phosphors. Moreover, the characteristic curves of the phosphors differ for each color. Accordingly, if the phosphors are irradiated with an electron beam without applying a correction to the image signal, a problem which arises is that luminance and hue deviate from those of the original image.

In the color-image display device according to the present invention, the image signal is subjected to a correction that takes into account the light-emission characteristics possessed by the phosphor for each color. This provides a display that is more faithful to the original image.

It should be noted that the correcting means used in the third and fourth modes set forth above may treat image information as either an analog or digital value.

(Fifth Mode)

A second aspect of the electron-beam generating source capable of being used in the color-image display device of the invention includes a device group in which a plurality of surface-conduction electron emitting devices are arrayed along a row direction on a substrate, and an electrode array in which grid electrodes are arrayed along a column direction, which is substantially perpendicular to the row direction, on or off the substrate.

More specifically, M×N (where M, N are positive integers) surface-conduction electron emitting devices are formed in rows and columns on an electrically insulative substrate, and devices arrayed in the row direction are electrically wired in parallel. There are N rows of devices, in each row of which M-number of device are wired in parallel.

M-number of electron beams can be delivered from any of the device rows simultaneously by applying appropriate drive signals to the wiring lines.

Further, M-number of grid electrodes are provided along the column direction, which is substantially perpendicular to the row direction, on or off the substrate. Each grid electrode is formed to have a beam transmission aperture corresponding to each surface-conduction electron emitting devices.

By applying an appropriate voltage signal to a grid electrode, it is possible to control the amount of transmission of the electron beam outputted by the surface-conduction electron emitting devices.

In other words, in the electron-beam generating source, the amplitude or duration of the signal applied to a grid electrode is varied to enable easy control of the intensity or amount of electric charge of the electron beam transmitted through the grid electrode.

(Sixth Mode)

In the color display device having the electron-beam generating source according to the second aspect set forth above, the modulating means has correcting means for correcting the image signal based upon the gamma characteristic of the phosphors, namely light emission strength vs. amount of electron beam irradiation.

More specifically, the phosphors for each of the colors red, green and blue exhibit a non-linear change in light-emission intensity with respect to the quantity of electron beams irradiating the phosphors. Moreover, the characteristic curves of the phosphors differ for each color. Accordingly, if the phosphors are irradiated with an electron beam without applying a correction to the image signal, luminance and hue deviate from those of the original image.

In the color-image display device according to the present invention, the image signal is subjected in advance to a correction that takes into account the light-emission characteristics possessed by the phosphor for each color. This provides a display that is more faithful to the original image.

(Seventh Mode)

The modulating means has correcting means for correcting the image signal based upon the gamma characteristic of the grid electrodes, namely intensity of the transmitted electron beam vs. voltage applied to the grid electrodes.

More specifically, in the electron-beam source, which comprises the combination of the surface-conduction electron emitting devices and the grid electrodes, the intensity of the electron beam that is transmitted through a grid electrode has a threshold value with respect to the voltage applied to the grid electrode and varies non-linearly with respect to voltages greater than the threshold value. Though the characteristic curve naturally differs depending upon the material and shape of the surface-conduction electron emitting devices as well as the shape and positions of the grid electrodes, the characteristic of this electron-beam source is different from that of a well-known electron-beam source comprising the combination of thermionic cathodes and grid electrodes.

Accordingly, if a phosphor is irradiated with an electron beam by driving the surface-conduction electron emitting devices without applying a correction to the image signal, no light emission will take place since only a voltage below the threshold value is impressed upon the device below a certain level of the image signal. In addition, luminance undergoes a sudden change above a certain level of the image signal.

In the color-image display device according to the invention, the image signal is subjected beforehand to a correction that takes into account the electron-beam transmission characteristic specific to the electron-beam source, which is the combination of the surface-conduction electron emitting devices and grid electrodes. This provides a display more faithful to the original image.

It should be noted that the correcting means used in the sixth and seventh modes set forth above may treat image information as either an analog or digital value.

(Eighth Mode)

In the color-image display device of the invention, a modulating method for modulating the electron beams that irradiate the phosphors includes modulating length of time, over which the phosphors are irradiated with the electron beams, based upon the gamma-corrected image signal.

The means for modulating length of time over which the phosphors are irradiated modulates the signal, which is applied to the electron-beam source, in dependence upon the luminance level of the gamma-corrected image information. For example, in the electron-beam source of the second mode described above, the duration of a drive signal applied to a surface-conduction electron emitting devices is modulated. In the electron-beam source of the fifth mode described above, the duration of a voltage signal applied to a grid electrode is modulated.
(Ninth Mode)

In the color-image display device using the modulating method of the first aspect above, the modulating means has means for adjusting the modulating signal, which is for modulating the electron beam, independently for each of the color components (red, green, blue).

More specifically, with regard to electron-beam sources provided to correspond to the phosphors of each of the colors (red, green, blue), adjusting means is provided to change the irradiation time of the electron beam independently color by color.

The adjusting means is set by the manufacturer at the time of manufacture of the color-image display device in such a manner that the appropriate color balance will be obtained. Preferably, the adjusting means is so adapted as to allow the user to change the setting as desired after manufacture.
(Tenth Mode)

According to a first aspect, the means for adjusting the modulating signal, which is for modulating the electron beam, independently for each of the color components (red, green, blue) includes a comparator provided individually for each color component of the gamma-corrected image signal, the adjusting means independently adjusting a correlation between a comparison reference of each comparator and the image signal.

More specifically, the color components of the image signal are made sawtooth waveforms the amplitudes of which change in dependence upon luminance, and these sawtooth waveforms are compared with reference values to effect a conversion to pulse-width modulated signals whose pulse widths vary in dependence upon luminance. A comparator is provided individually for each color component and is so adapted that the reference value can be set or changed independently. Any adjusting means will suffice so long as it is capable of adjusting, for each color component, the relative relationship between the sawtooth waveforms and the reference values. Therefore, depending upon the case, means may be provided for applying a bias to the sawtooth waveform for each color component, and it may be so arranged that the amount of bias is capable of being adjusted independently.
(11th Mode)

According to a second aspect, the means for adjusting the modulating signal, which is for modulating the electron beam, independently for each of the color components (red, green, blue) includes an amplifier, the amplification factor of which is capable of being adjusted independently, as well as a comparator. The amplifier and the comparator are provided for each color component of the gamma-corrected image signal. Image signals amplified by the amplifiers are compared with reference values in the comparators, whereby modulated pulses are generated.

It should be noted that the correcting means used in the 10th and 11th modes set forth above may treat image information as either an analog or digital value.
(12th Mode)

According to a third aspect, the means for adjusting the modulating signal, which is for modulating the electron beam, independently for each of the color components (red, green, blue) includes a pulse-width modulator provided individually for each color component of the gamma-corrected image signal, the adjusting means independently adjusting the frequency of the operating reference clock of each pulse-width modulator.

More specifically, in an arrangement having, say, a counter for counting the number of reference clock pulses and a pulse-width modulator for comparing the count in the counter with the data of the image signal and generating pulses until the value of the count and the value of the data become equal, the frequency of the reference clock is capable of being set independently for each color component.
(13th Mode)

In the color-image display device of the invention, a modulating method for modulating the electron beam that irradiates the phosphors includes modulating current amplitude of the electron beam, which irradiates the phosphors, based upon the gamma-corrected image signal.

More specifically, unlike the method of the eighth mode which modulates the length of time the phosphors are irradiated with the electron beams, this method modulates the amplitude of the voltage signal, which is applied to the electron-beam source, in dependence upon the luminance level of the image information. For example, in the electron-beam source of the second mode, the amplitude of the driving voltage applied to the surface-conduction electron emitting devices is modulated. In the electron-beam source of the fifth mode, the amplitude of the voltage signal applied to the grid electrodes is modulated.
(14th Mode)

In the color-image display device using the modulating method according to the second aspect, the modulating means has means for adjusting the modulating signal, which is for modulating the electron beam, independently for each of the color components (red, green, blue).

More specifically, with regard to electron-beam sources provided to correspond to the phosphors of each of the colors (red, green, blue), adjusting means is provided to change the modulating signal, which is for modulating the electron beam, independently for each of the color components (red, blue, green).

The adjusting means is set by the manufacturer at the time of manufacture of the color-image display device in such a manner that the appropriate color balance will be obtained. Preferably, the adjusting means is so adapted as to allow the user to change the setting as desired after manufacture.
(15th Mode)

According to a first aspect, the means for adjusting the modulating signal, which is for modulating the electron beam, independently for each of the color components (red, green, blue) in the 14th mode includes a level shifter provided individually for each color component of the gamma-corrected image signal, the adjusting means independently adjusting amount of shift of each level shifter.

More specifically, when the image signal is suitably amplified and the driving signal of the electronic-beam generating source is modulated, a level shifter is provided for each color component and the amount of shift is adjusted with respect to the image signal after it is gamma-corrected or a signal obtained by amplifying the image signal.
(16th Mode)

According to a second aspect, the means for adjusting the modulating signal, which is for modulating the electron beam, independently for each of the color components (red, green, blue) in the 14th mode includes an amplifier provided individually for each color component of the gamma-corrected image signal, the adjusting means independently adjusting the amplification factor of each amplifier.

In the modes described above, the modulating method of the eighth mode or 13th mode can be used in the electron-beam generating source of the second mode. Further, the modulating method of the eighth mode or 13th mode can be used in the electron-beam generating source of the fifth mode.

The third and fourth modes are effective even if practiced separately. However, by practicing these two modes in combination, there are instances in which it is possible to obtain an even more faithful display and therefore it is preferred that the two modes be implemented together.

Further, the sixth and seventh modes are effective even if used separately. However, by practicing these two modes in combination, there are instances in which it is possible to obtain an even more faithful display and therefore it is preferred that the two modes be implemented together.

Further, the tenth and 11th modes are effective even if practiced separately. However, practicing both modes in combination provides much better picture quality.

The 15th and 16th modes are effective even if used separately. However, by practicing these two modes in combination, there are instances in which it is possible to obtain an even more faithful display and therefore it is preferred that the two modes be implemented together.

In working the present invention, no particular limitations are imposed upon the structure, material or manufacturing process, etc., of the surface-conduction electron emitting devices used in the electron-beam generating source. However, the devices illustrative of the following modes are particularly preferred owing to ease of manufacture and outstanding electron emission characteristics.

(Mode of surface-conduction electron emission device)

The basic construction and manufacturing method of a surface-conduction electron emitting devices relation to the present invention will now be described.

The basic construction of a surface-conduction electron emitting devices according to the present invention essentially is of two types, namely planar and stepwise. The planar-type surface-conduction electron emitting devices will be described first.

Figure 1B:
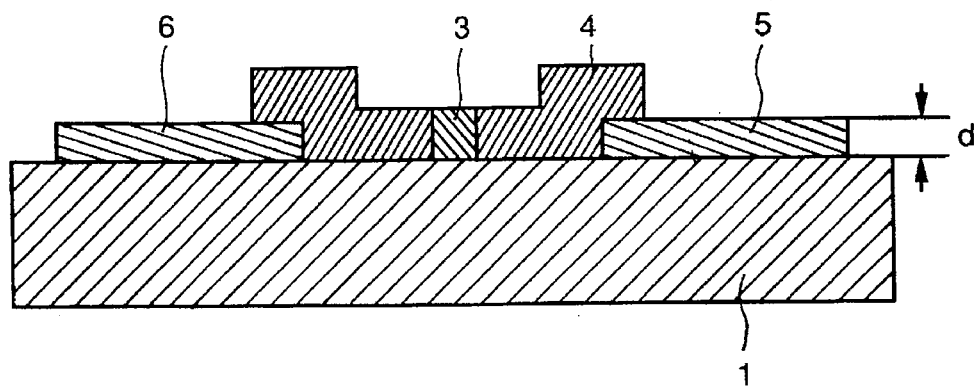

FIGS. 1A and 1B are schematic plan and sectional views, respectively, illustrating the basic construction of a surface-conduction electron emitting devices according to the present invention.

Shown in FIGS. 1A and 1B are a substrate 1, device electrodes 5, 6, and a thin film 4 including an electron-emitting region 3.

Examples of the substrate 1 are quartz glass, glass having a reduced impurity content such as of Na, soda lime glass, a glass substrate obtained by depositing a layer of $SiO_2$, which is formed by a sputtering process or the like, on soda lime glass, or a ceramic such as alumina.

Any material may be used for the opposing device electrodes 5, 6 so long as it is electrically conductive. Examples that can be mentioned are the metals Ni, Cr, Au, Mo, W, Pt, Ti, Al, Cu and Pd or alloys of these metals, printed conductors formed from the metals Pd, Ag, Au, $RuO_2$, Pd—Ag or from metal oxides and glass, transparent conductors such as $In_2O_3$—$SnO_2$ and semiconductor materials such as polysilicon.

Spacing L1 between the device electrodes is on the order of several hundred angstroms to several hundred micrometers. This is determined by the basic photolithographic technique of the electrode manufacturing process, namely the capability of the exposure equipment and the etching process, as well as by voltage applied across the device electrodes and the electric field strength capable of producing the electron emission. Preferably, L1 is on the order of several micrometers to several tens of micrometers.

Length W1 and film thickness d of the device electrodes 5, 6 are selected upon taking into consideration the resistance values of the electrodes. Ordinarily, the length W1 of the device electrodes is on the order of several micrometers to several hundred micrometers, and the thickness d of the device electrodes 5, 6 is on the order of several hundred Angstroms to several micrometers.

The thin film 4 placed between and on the opposing device electrodes 5, 6 provided on the substrate 1 includes the electron-emitting region 3. However, there are cases, in which the thin film 4 is not placed on the device electrodes 5, 6. That is, there are cases in which a thin film 4 and the opposing device electrodes 5, 6 are built up on the substrate 1 in the order mentioned. There are also cases in which the entire region between the opposing the device electrode 5 and device electrode 6 functions as the electron-emitting region, depending upon the manufacturing process. The film thickness of the thin film 4 that includes this electron-emitting region 3 preferably is on the order of several Angstroms to several thousand Angstroms, with a range of 10 A to 500 A being particularly preferred. This is selected appropriated depending upon the step coverage to the device electrodes 5, 6, the resistance values between the electron-emitting region 3 and the device electrodes 5, 6, the particle diameter of the electrically conductive particles constituting the electron-emitting region 3 and the electrification process conditions. The resistance value of the thin film 4 indicates a sheet resistance value of from $10^1$ to $10^7$ $\Omega/\square$.

Specific examples of the material constituting the thin film 4 that includes the electron-emitting region 3 are the metals Pd, Pt, Ru, Ag, Au, Ti, In, Cu, Cr, Fe, Zn, Sn, Ta, W and Pb, etc., the oxides PdO, $SnO_2$, $In_2O_3$, PbO and $Sb_2O_3$, etc., the borides $HfB_2$, $ZrB_2$, $LAB_6$, $CeB_6$, $YB_4$ and $GdB_4$, the carbides TiC, ZrC, HfC, TaC, SiC and WC, etc., the nitrides TiN, ZrN and HfN, etc., the semiconductors Si, Ge, etc., and fine particles of carbon.

A film of fine particles mentioned here refers to a film that is an aggregate of a plurality of fine particles. As for the fine structure, the fine particles are not limited to individually dispersed particles; the film may be one in which the fine particles are mutually adjacent or overlapping. The particle diameter of the particles is on the order of several angstroms to several thousand angstroms, preferably 10~200 A.

The electron-emitting region 3 comprises a number of electrically conductive fine particles having a particle diameter on the order of several angstroms to several hundred angstroms, with a range of 10~500 A being particularly preferred. This depends upon the film thickness of the thin film 4 that includes the electron-emitting region and the manufacturing process, such as the conditions of the electrification process. The material constituting the electron-emitting region 3 is a substance that is partially or completely identical with the devices of the material constituting the thin film 4 that includes the electron-emitting region.

Figure 2A:
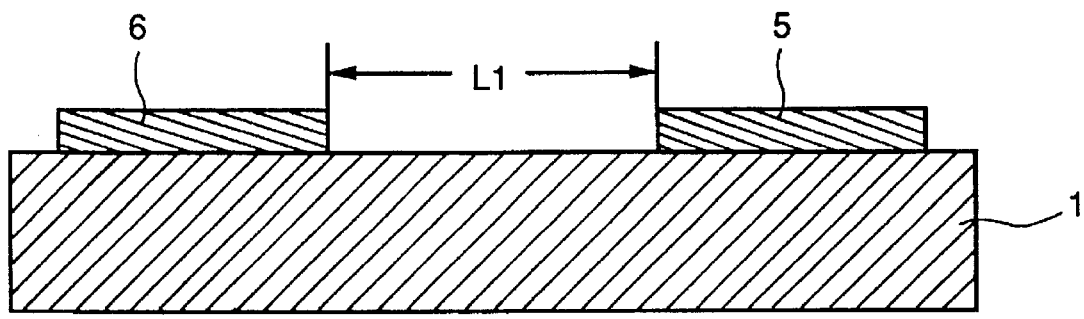
FIGS. 2A through 2C are diagrams illustrating a process for manufacturing the preferred surface-conduction electron emitting devices used in the present invention.
Figure 2B:
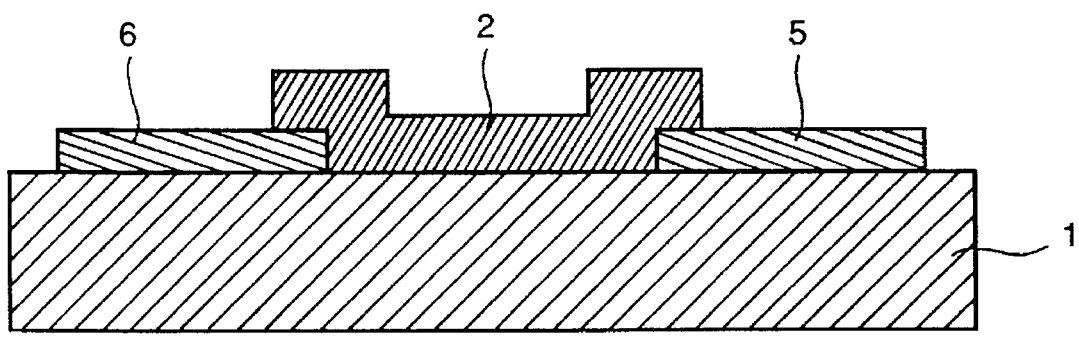

Various processes for manufacturing the electron emitting device having the electron-emitting region 3 are conceivable. One example is shown in FIGS. 2A and 2B, in which numeral 2 denotes a thin film for forming the electron-emitting region. An example of the thin film is a film of fine particles.

The manufacturing processing will be described with reference to FIGS. 1A, 1B, 2A and 2B.

1) The substrate 1 is cleansed sufficiently using a detergent, pure water or an organic solvent, after which a device electrode material is deposited by vacuum deposition, sputtering or the like. The device electrodes 5, 6 are formed on the surface of the insulative substrate 1 by photolithography [FIG. 2A].

2) The part of the substrate between the device electrodes 5 and 6 formed thereon is coated with an organic metal solution, which is then left standing. The result is formation of an organic metal thin film. The organic metal solution is a solution of an organic compound whose principal device is a metal such as the aforesaid Pd, Ru, Ag, Au, Ti, In, Cu, Cr, Fe, Zn, Sn, Ta, W or Pb. Thereafter, the organic metal thin film is subjected to a heating and patterning is carried out by lift-off or etching to form the thin film 2 [FIG. 2B]. Though formation of the thin film is described as being performed by coating with an organic metal solution, the invention is not limited to this technique. Formation may be carried out by vacuum deposition, sputtering, chemical phase deposition, a dispersive coating process, a dipping process, a spinner process, etc.

Figure 2C:
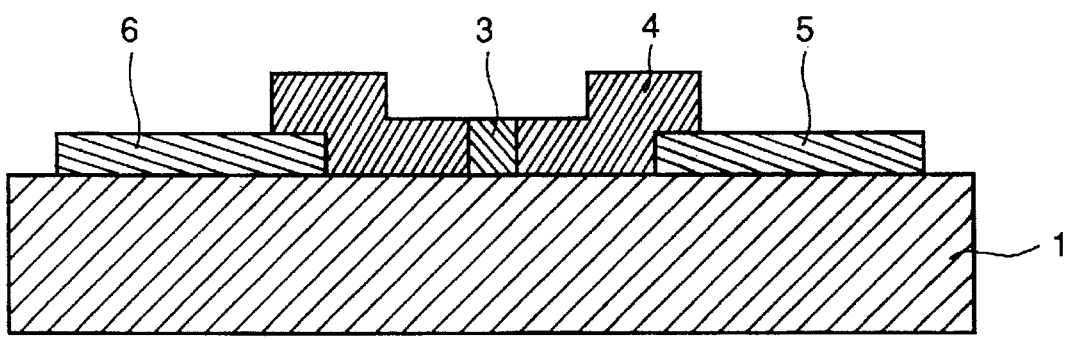

3) Next, an electrification process referred to as "forming" is carried out. Specifically, a voltage is impressed across the device electrodes 5, 6 in pulsed form by means of a power supply (not shown). Alternatively, an electrification process based upon elevating voltage is executed. As a result of electrification, the electron-emitting region 3, the structure of which has undergone a change, is formed on the location of the thin film 2 [FIG. 2C]. Owing to the electrification process, the thin film 2 is locally destroyed, deformed or changed in property. The resulting region of changed structure is referred to as the electron-emitting region 3. As described earlier, the applicants have observed that the electron-emitting region 3 is composed of electrically conductive fine particles. FIG. 3 illustrates the voltage waveform in a case where pulses in the forming treatment are applied.

In FIG. 3, T1 and T2 represent the pulse width and pulse interval, respectively, of the voltage waveform. The pulse width T1 is on the order of 1 μsec to 10 msec, the pulse interval T2 is on the order to 10 μsec to 100 msec, and the peak value of the triangular wave is selected appropriately. The forming treatment is applied over a period of from several tens of seconds to several tens of minutes under a vacuum of about $10^{-5}$ Torr.

In the formation of the electron-emitting region described above, the forming treatment is performed by applying the triangular pulsed voltage across the device electrodes. However, the waveform impressed across the electrodes is not limited to a triangular waveform. Any desired waveform such as a rectangular wave may be used, and the peak value, pulse width and pulse interval thereof also are not limited to the values mentioned above. Desired values may be selected in accordance with the resistance value of the thin film 2, etc., so as to form a favorable electron-emitting region.

Figure 4:
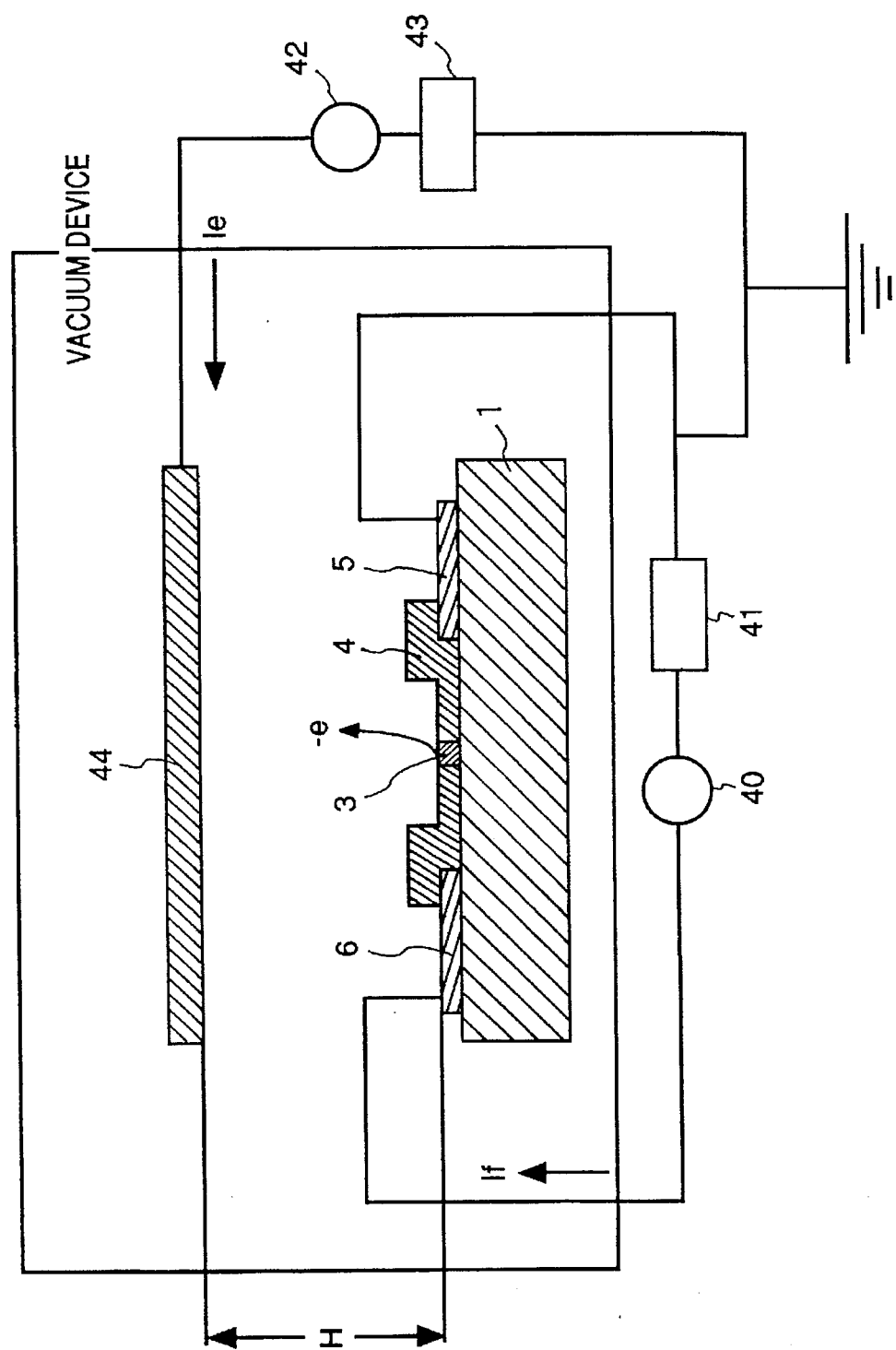
FIG. 4 is a diagram illustrating a device for evaluating the characteristics of the surface-conduction electron emitting devices used in the present invention.

The electrical process following forming is carried out within a measuring and evaluating apparatus shown in FIG. 4. This apparatus will now be described.

FIG. 4 is a schematic view showing the construction of a measuring and evaluating apparatus for measuring the electron emission characteristic of the device having the constitution illustrated in FIGS. 1A and 1B. Shown in FIG. 4 are the substrate 1, the device electrodes 5 and 6, and the thin film 4, and the electron-emitting region 3. Further, numeral 41 denotes a power supply for applying a voltage Vf to the device (referred to as device Voltage Vf hereinafter), 40 an ammeter for measuring a device current If that flows through the thin film 4 inclusive of the electron-emitting region between the device electrodes 5 and 6, 44 an anode electrode for capturing an emission current Ie emitted by the electron-emitting region of the device, 43 a high-voltage power supply for applying a voltage to the anode electrode 44, and 42 an ammeter for measuring the emission current Ie emitted by the electron-emitting region of the device.

To measure the device current If and emission current Ie of the electron emission device, the power supply 41 and ammeter 40 are connected to the device electrodes 5, 6, and the anode electrode 44 to which the power supply 43 and ammeter 42 are connected is placed above the electron emission device. The electron emission device and anode electrode 44 are placed inside a vacuum apparatus, which is equipped with equipment (not shown) such as an exhaust pump and vacuum indicator necessary for producing vacuum. The device is measured and evaluated in the prescribed vacuum.

Measurement is performed at an anode-electrode voltage of 1~10 kV and with a distance H between the anode electrode and electron emission device of 2~8 mm.

Figure 5:
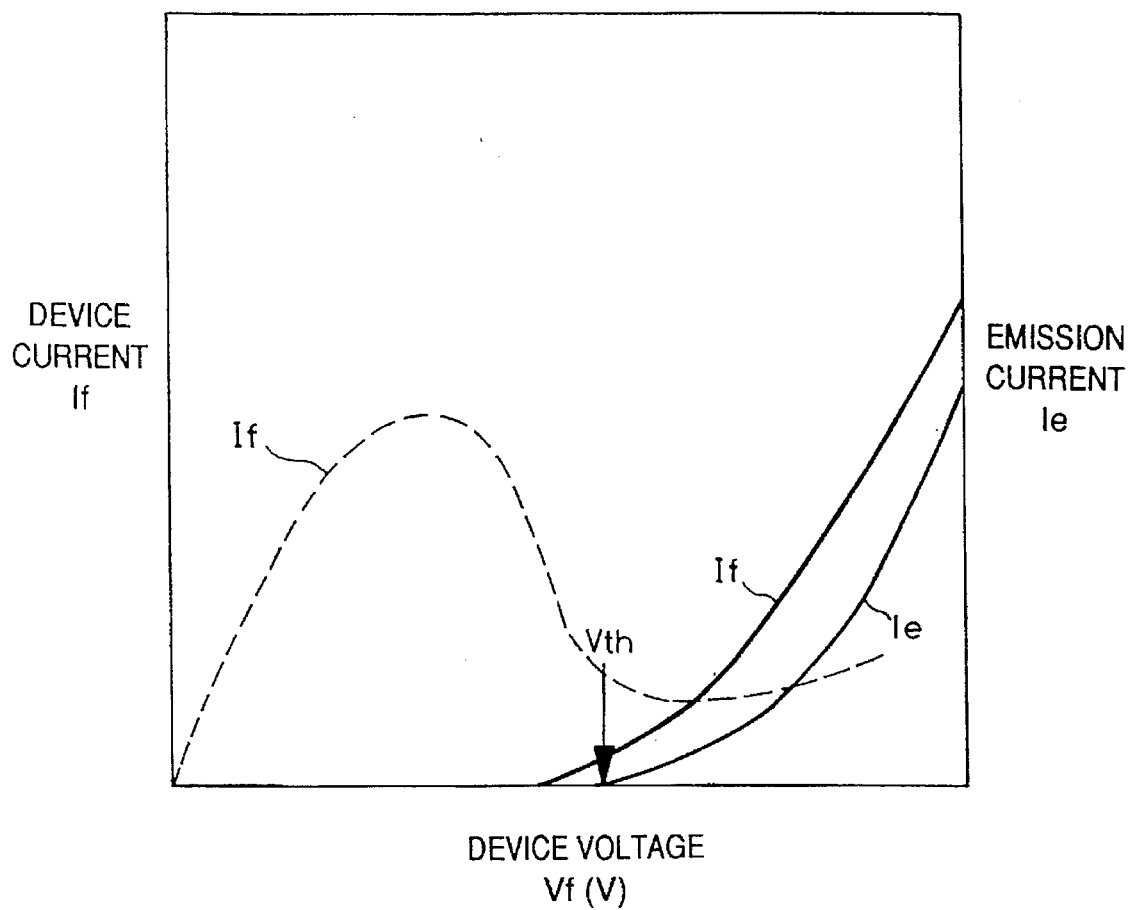
FIG. 5 is a diagram illustrating the electrical characteristics of the preferred surface-conduction electron emitting devices used in the present invention.

FIG. 5 illustrates a typical example of the relationship among the emission current Ie, device current If and device voltage Vf measured by the measuring and evaluating apparatus of FIG. 4. FIG. 5 is illustrated using arbitrary units since the emission current Ie is very small in comparison with the device current If. It should be evident from FIG. 5 that this electron emission device has three features with respect to emission current Ie.

First, when a device voltage greater than a certain voltage (referred to as a threshold voltage, indicated by Vth in Figure in FIG. 5) is applied to the surface-conduction electron emitting device, the emission current Ie suddenly increases. When the applied voltage is less than the threshold voltage Vth, on the other hand, almost no emission current Ie is detected. In other words, the device is a non-linear device having the clearly defined threshold voltage Vth with respect to the emission current Ie.

Second, since the emission current Ie is dependent upon the device voltage Vf, it is capable of being controlled by the device voltage Vf.

Third, the emitted electric charge captured by the anode electrode 44 is dependent upon the time over which the device voltage Vf is applied. That is, the amount of electric charge captured by the anode electrode 44 is capable of being controlled based upon the time over which the device voltage Vf is applied.

An example of the characteristic in which the device current If increases monotonously with respect to the device voltage Vf (this is referred to as an MI characteristic) is indicated by the solid line If in FIG. 5. However, there are also cases in which the device current If exhibits a voltage-controlled negative resistance characteristic (referred to as a VCNR characteristic) with respect to the device voltage Vf (see the dashed line in FIG. 5). These characteristics of the device current are believed to be dependent upon the manufacturing method and the measurement conditions when measurement is performed. In this case also the electron emission device has the three features, in terms of its characteristics, set forth above.

Furthermore, in a surface-conduction electron emitting devices constructed by dispersing electrically conductive fine particles in advance, part of the basic manufacturing process or the basic device construction may be changed.

Figure 6:
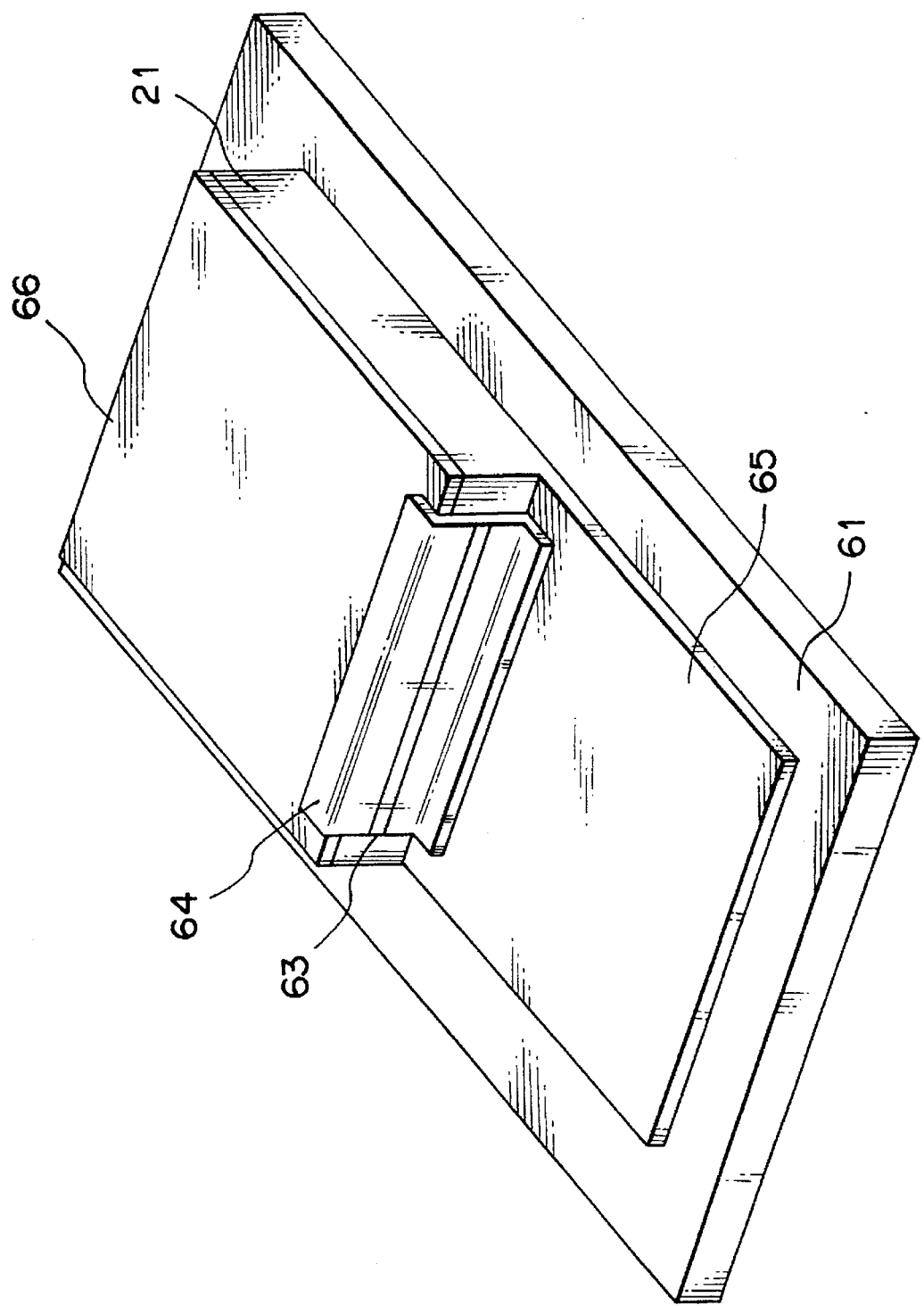
FIG. 6 is a diagram showing the structure of a preferred stepwise-type surface-conduction electron emitting devices used in the present invention.

Next, the stepwise-type surface-conduction electron emitting devices, which is the other type of surface-conduction electron emitting devices relation to the present invention, will be described. FIG. 6 is a schematic view illustrating the construction of a basic stepwise-type surface-conduction electron emitting.

Shown in FIG. 6 are a substrate 61, device electrodes 65 and 66, a thin film 64 that includes an electron-emitting region 63, and a step forming portion 21.

The substrate 61, the device electrodes 65 and 66, the thin film 64 that includes the electron-emitting region and the electron-emitting region 63 consist of materials similar to those use in the planar-type surface-conduction electron emitting devices described above. The step forming portion 21 and the thin film 64 including the electron-emitting region, which characterize the stepwise-type surface-conduction electron emitting devices, will now be described in detail.

The step forming portion 21 consists of an insulative material such as $SiO_2$ formed by vacuum deposition, printing, sputtering, etc. The thickness of the step forming portion 21 which corresponds to the electrode spacing L1 of the planar-type surface-conduction electron emitting devices described earlier, is on the order of several hundred angstroms to several tens of micrometers. The thickness is set depending upon the manufacturing method of the step forming portion, the voltage applied across the device electrodes. Preferably, the thickness is on the order of several thousand angstroms to several micrometers.

Since the thin film 64 that includes the electron-emitting region is formed after the device electrodes 65, 66 and step forming portion 21 are fabricated, it is formed on the device electrodes 65, 66. Further, the film thickness of the thin film 64 that includes the electron-emitting region depends upon the manufacturing process thereof. There are many cases in which film thickness at the step portion and film thickness of the portions formed on the device electrodes 65, 66 differ. The film thickness at the step portion generally is less. It should be noted that though the electron-emitting region 63 is shown as being linear on the step forming portion 21 in FIG. 6, this does not place a limitation upon its shape and position. The shape and position are dependent upon the fabrication conditions, the forming conditions, etc.

Though the basic construction and manufacturing process of the surface-conduction electron emitting devices has been described, the gist of the invention is such that the invention is not limited to the foregoing construction so long as it possesses the three features described above in connection with the characteristics of the surface-conduction electron emitting devices. The surface-conduction electron emitting devices is applicable to an image forming device according to the present invention such as a display device described later.

EMBODIMENTS (First Embodiment)

First an electron source used in the image forming device of the invention will be discussed in detail, then the construction of a display panel will be described, and finally a method of displaying a color image will be set forth.

<Description of electron source of this embodiment>

Figure 7:
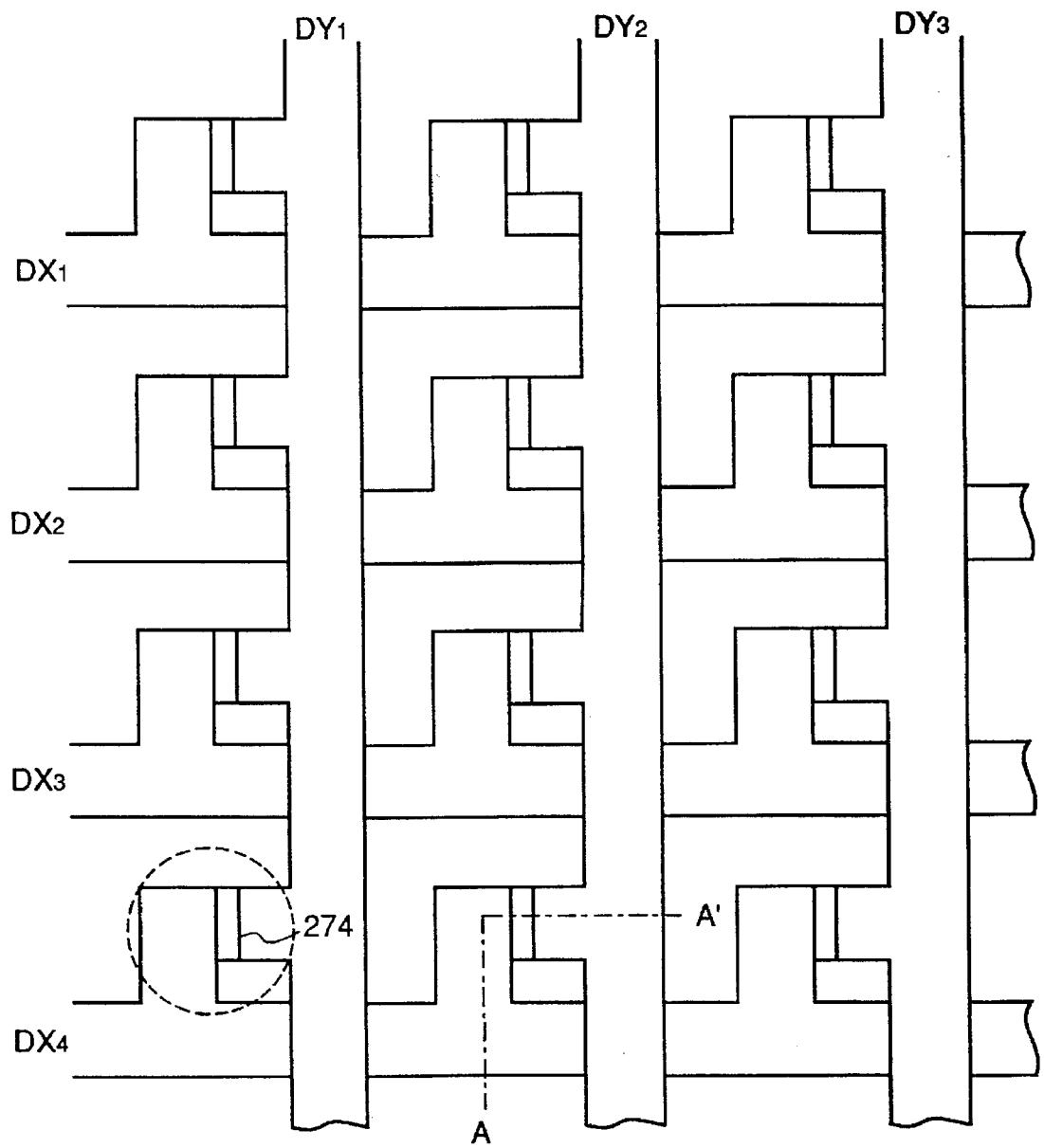
FIG. 7 is a plan view illustrating the construction of a multiple electron beam source used in a display device according to a first embodiment of the present invention.
Figure 8:
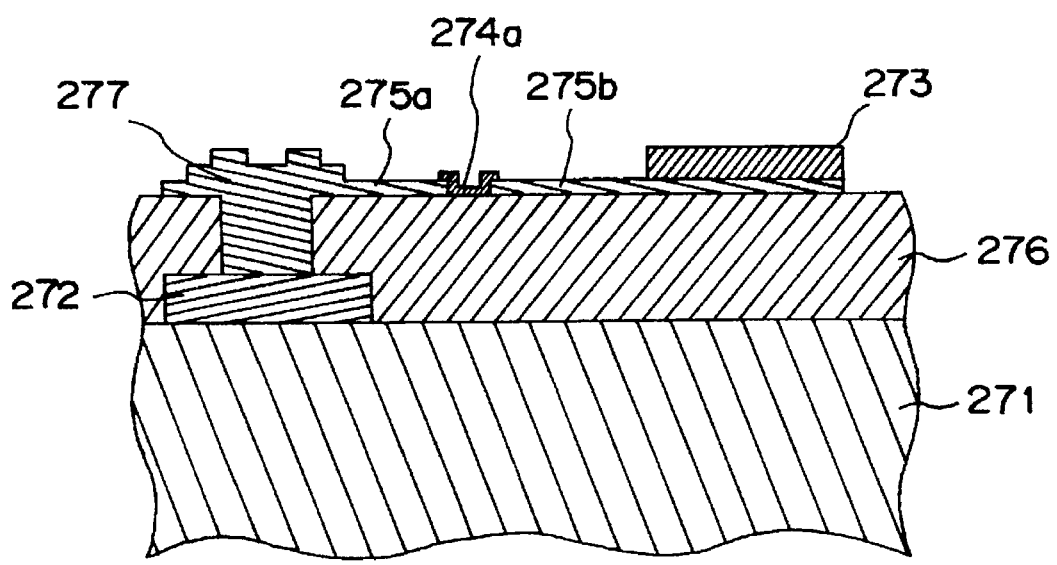
FIGS. 8 and 9A through 9H are sectional views for describing a process for manufacturing the multiple electron beam source shown in FIG. 7.

FIG. 7 is a plan view illustrating a portion of an electron source. FIG. 8 is a sectional view taken along line A–A' of FIG. 7. Further, FIGS. 9A–9H and FIG. 10 are diagrams illustrating a process for manufacturing the electron source of this embodiment. Components in FIGS. 7–10 that are identical are designated by like reference characters.

In FIG. 7, numeral 272 denotes wiring along the X direction, specifically m-number of wires $DX_1$~$DX_m$, and numeral 273 denotes wiring along the Y direction, specifically n-number of wires $DY_1$~$DY_n$.

In FIG. 8, numeral 271 denotes an insulative substrate, 272 the X-direction wiring (also referred to as "lower wiring"), and 273 the Y-direction wiring (also referred to as "upper wiring"). Numeral 274a denotes a thin film for forming an electron-emitting region. By subjecting this film to a forming treatment, the electron-emitting region is formed to obtain a surface-conduction electron emitting devices 274. Numerals 275a, 275b denote device electrodes, 276 an interlayer insulating layer, and 277 a contact hole for electrically connecting the device electrode 275a and the X-direction wiring 272.

A method of manufacturing the electron source of this embodiment will now be described in detail in accordance with the process steps while referring to FIGS. 9A–9H.

Figure 9A:
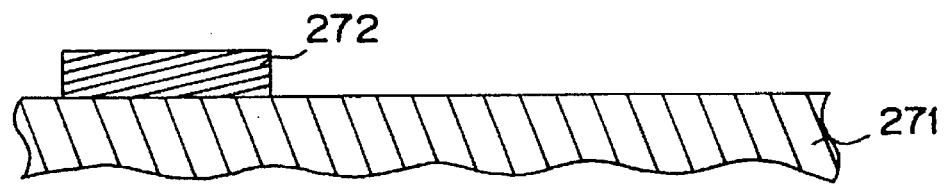

[Step a] [see FIG. 9A]

Cr having a thickness of 50 A and Au having a thickness of 6000 A are successively formed on the substrate 271, which comprises a cleaned soda lime glass, by vacuum deposition. Thereafter, a photoresist (AZ1370, manufactured by Hoechst Japan Limited) is applied thereto by a spinner and then baked. A photomask image is then exposed and developed to form the-resist pattern of the X-direction wiring. The deposited film of Au/Cr is then subjected to wet etching to form the X-direction wiring 272 of the desired shape.

Figure 9B:
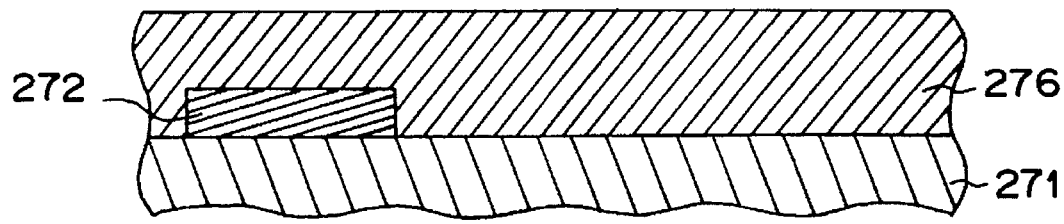

[Step b] [see FIG. 9B]

Next, the interlayer insulating layer 276, which comprises a silicon oxide films having a thickness of 0.1 μm, is deposited by RF sputtering.

Figure 9C:
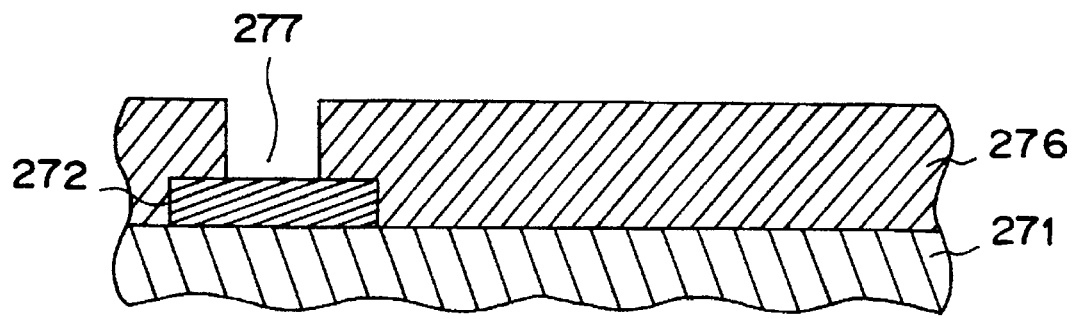

[Step c] [see FIG. 9C]

A photoresist pattern for forming the contact hole 277 in the silicon oxide film (the interlayer insulating layer 276), which was deposited at step b, is produced, and the interlayer insulating layer 276 is etched away, using the photoresist pattern as a mask, to form the contact hole 277. The etching method is RIE (reactive ion etching) using $CF_4$ and $H_2$ gas, by way of example.

Figure 9D:
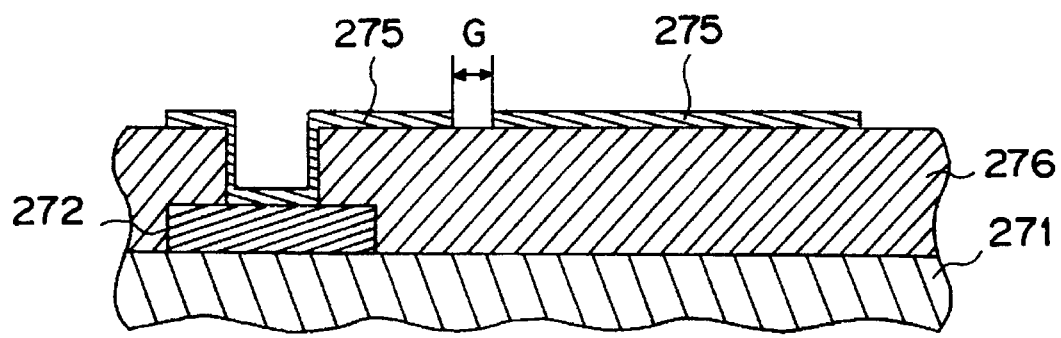

[Step d] [see FIG. 9D]

Next, to obtain the device electrodes 275 and a gap G between the device electrodes, a pattern is formed by a photoresist (RD-2000N-41, manufactured by Hitachi Kasei K. K.), after which Ti and Ni are successively deposited to thicknesses of 50 A and 1000 A, respectively, by vacuum deposition. The photoresist pattern is dissolved by an organic solvent and the deposited film of Ni/Ti is lifted off to form the device electrodes 275a, 275b having the gap G between them. Here the gap is 2 μm.

Figure 9E:
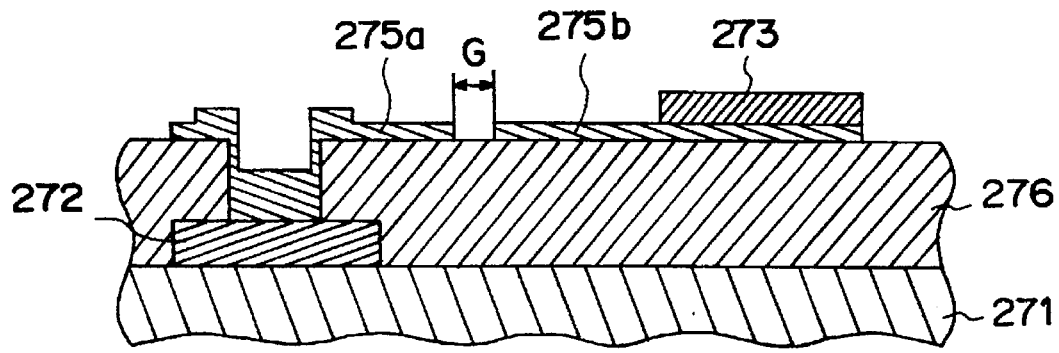

[Step e] [see FIG. 9E]

After a photoresist for the Y-direction wiring is formed on the device electrode 275b, Ti and Au are successively vacuum-deposited to thicknesses of 50 A and 5000 A, respectively. Unnecessary portions are then removed by being lifted off to form the Y-direction wiring 273.

Figure 9F:
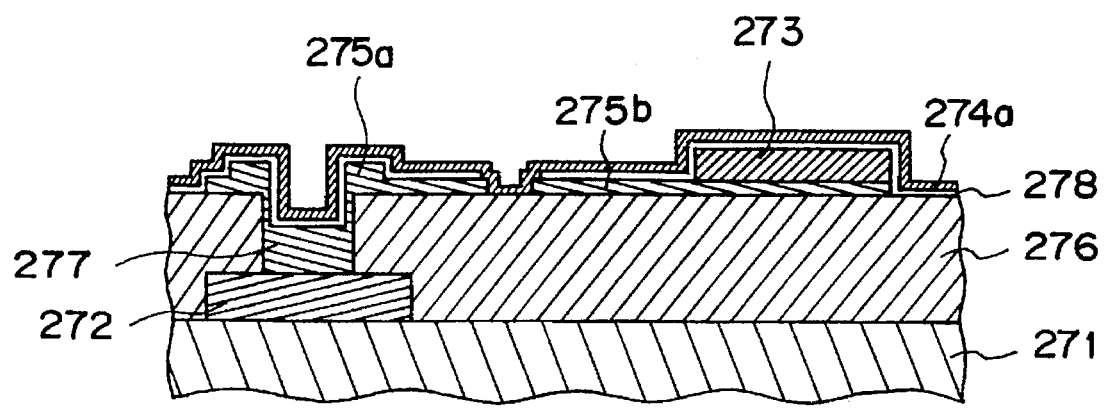

[Step f] [see FIG. 9F]

Figure 10:
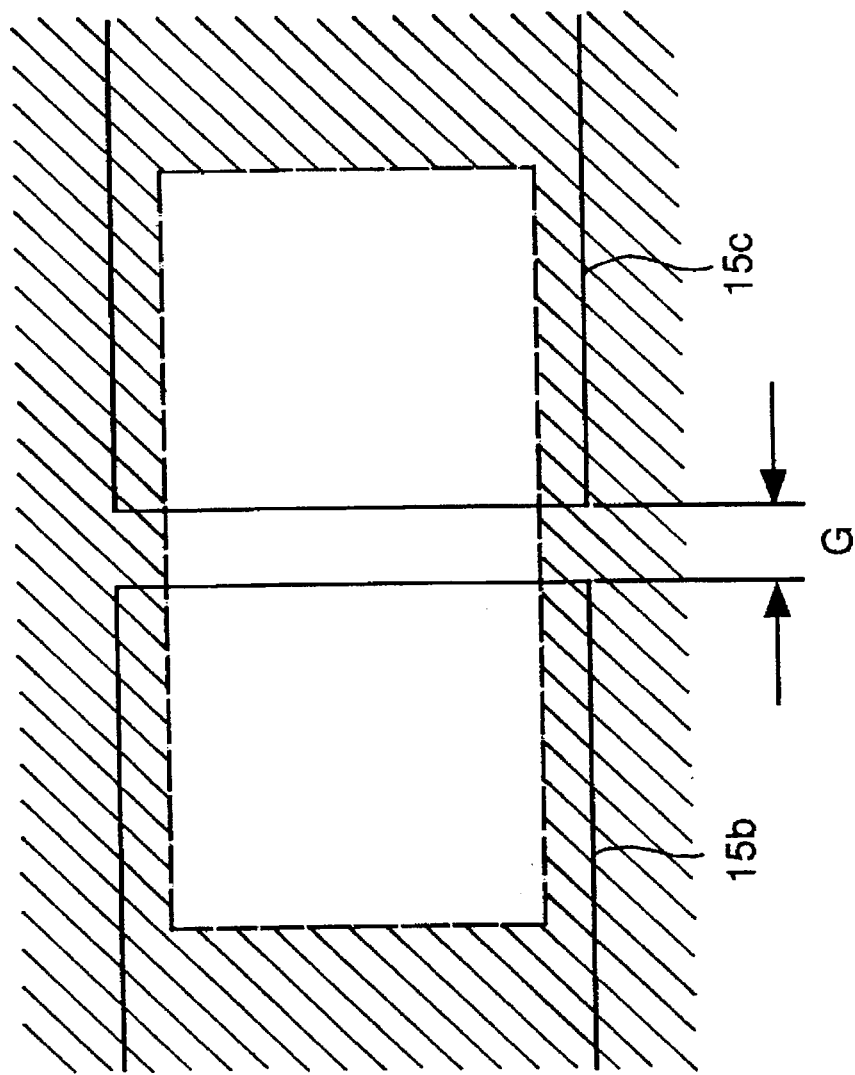
FIG. 10 is a plan view for describing a method of manufacturing the multiple electron beam source shown in FIG. 7.

FIG. 10 is a partial plan view showing a mask of the thin film 274a, which is formed in this process. This mask has an inter-electrode gap G and openings in the vicinity thereof. A Cr film 278 having a film thickness of 1000 A is deposited by vacuum deposition and subjected to patterning. Organic Pd (CCP4230, manufactured by Okuno Pharmaceutical Co. Ltd.) is then applied to the Cr thin film 278 by a spinner, after which a heating and baking treatment is applied for 10 min at 300° C. to form the thin film 274a, which is for forming the electron-emitting region, comprising Pd. The thin film 274a thus formed consists of fine particles in which Pd is the principal device, the film thickness thereof is 100 A and the sheet resistance value is $5 \times 10^4$ Ω/□. The film of fine particles is a film composed of an aggregate of a plurality of fine particles, as set forth earlier. As for the fine structure, the fine particles are not limited to individually dispersed particles; the film may be one in which the finely divided particles are mutually adjacent or overlapping (or arrayed as islands). Particle diameter refers to those fine particles for which particle shape can be recognized in the above-mentioned states.

Figure 9G:
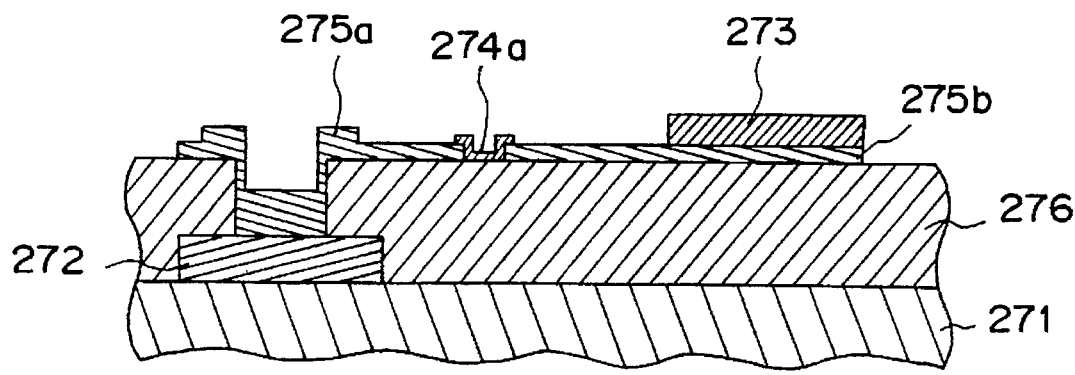

[Step g] [see FIG. 9G]

The Cr film 278 and the thin film 274a are subjected to wet etching by an acid etchant to form a desired pattern.

Figure 9H:
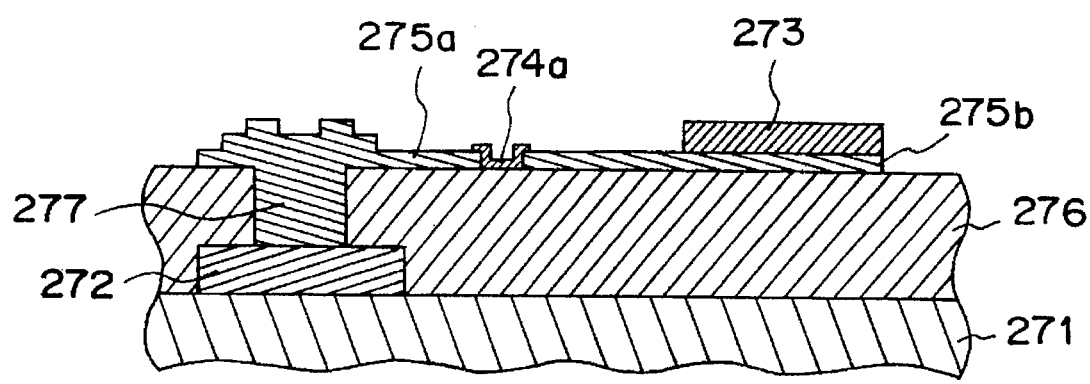

[Step h] [see FIG. 9H]

A pattern such as will apply a photoresist to portions other than that of the contact hole 277 is formed, after which Ti and Au are successively deposited to thicknesses of 50 A and 1.1 µm, respectively, by vacuum deposition. By removing unnecessary portions, the contact hole 277 is left filled.

Thus, by performing the foregoing process, the X-direction wiring 272, the interlayer insulating layer 276, the Y-direction wiring 273, the device electrodes 275a, 275b and the film 274a for forming the electron-emitting region are formed on the same substrate, as a result of which a matrix-wired substrate of surface-conduction electron emitting devices is formed. Though the foregoing process is an example in which use is made of such techniques as photolithography and etching, this does not impose a limitation upon the invention. Printing may be used to form the wiring. Various other techniques may also be employed.

<Description of image forming device of this embodiment>

Figure 11:
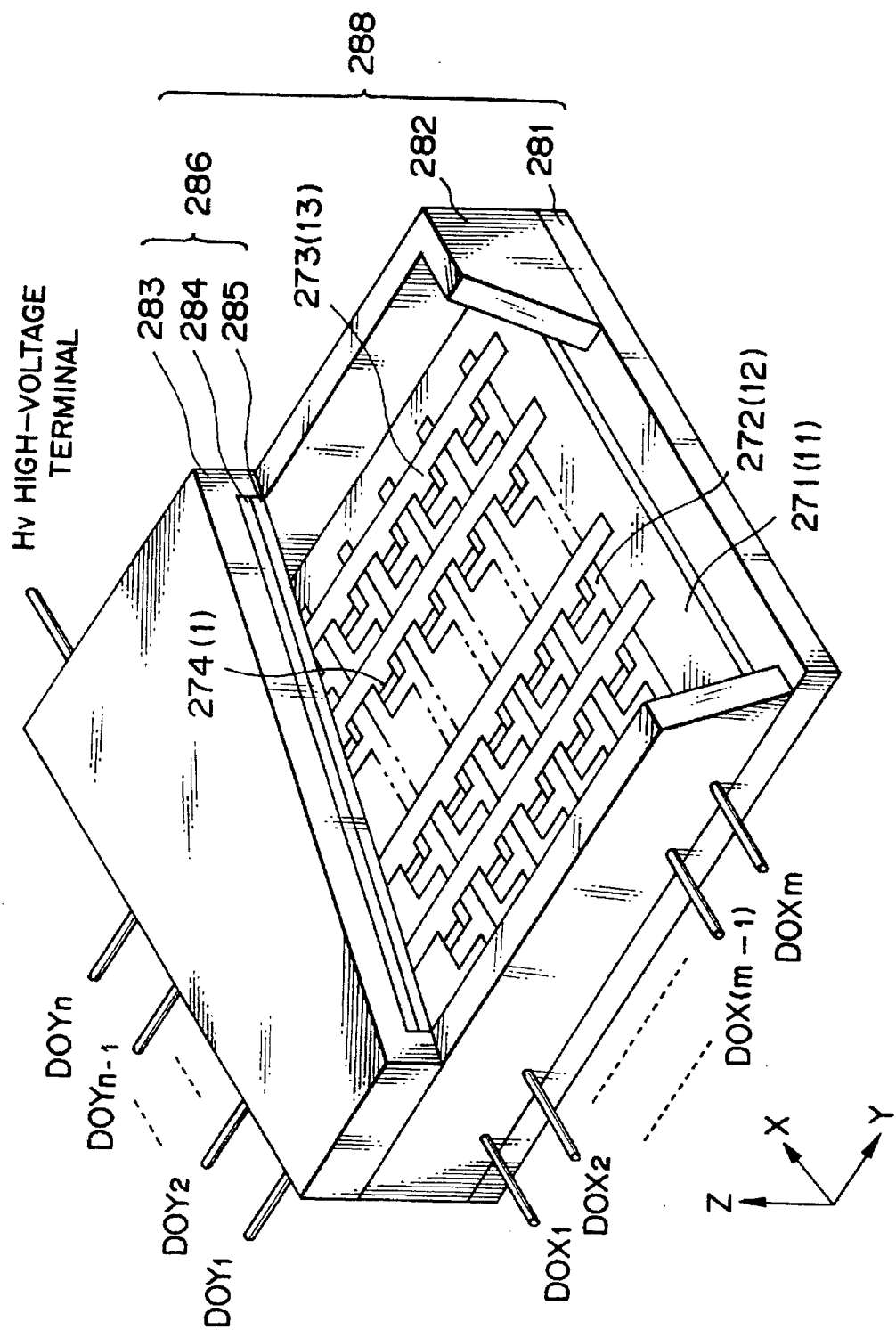
FIG. 11 is a perspective view illustrating the construction of a display panel used in the display device of the embodiment.

An example will now be described in which an image forming device that uses the electron source fabricated as set forth above is constructed. The image forming device will be described with reference to FIGS. 11, 12A and 12B.

An electron source in which a number of the planar-type surface-conduction electron emitting devices have been formed in the above-described manner is secured on a rear plate 281, after which a face plate 286 (constructed by forming a phosphor film 284 and a metal backing 285 on the inner surface of a glass substrate 283) is placed 5 mm above the insulative substrate 271 via a supporting frame 282. The joints of the face plate 286, supporting frame 282 and rear plate 281 are coated with frit glass, which is then heated in the atmosphere or in a nitrogen environment at 400°~500° C. for no less than 10 min to effect sealing. The insulative substrate 271 is fixed to the rear plate 281 also by using frit glass.

Figure 12A:
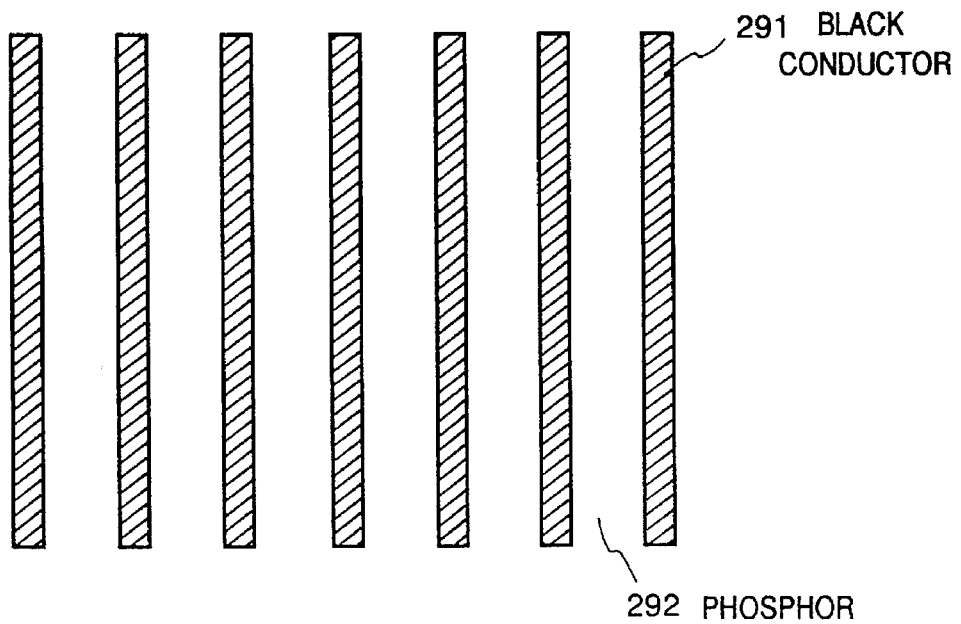
FIGS. 12A and 12B are partial plan views illustrating face plates of a display panel used in the display device of the embodiment.
Figure 12B:
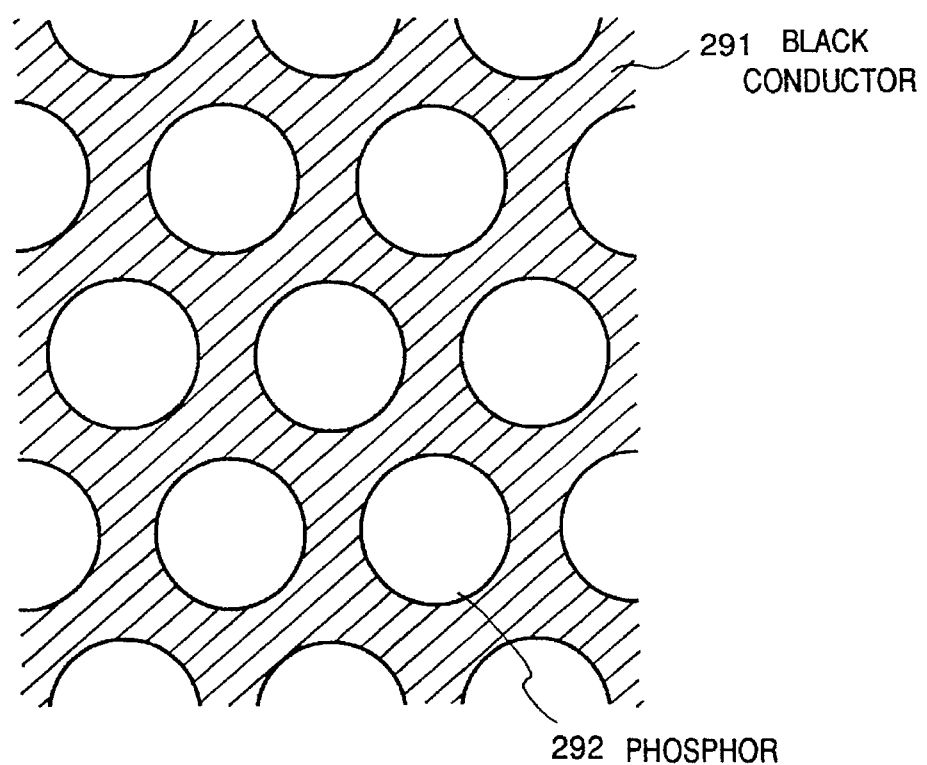

In FIGS. 12A and 12B, the phosphor film 284 comprises only phosphors if the device is for monochromatic use. In this embodiment, however, the phosphor film 284 is fabricated by forming black stripes in advance and applying a coating of various color (red, green, blue) phosphors between the stripes. As for the material constituting the black stripes, use is made of a substance whose principal ingredient is graphite.

In this embodiment, the slurry method is used to coat the glass substrate 283 with the phosphors. The inner side of the phosphor film 284 usually is provided with the metal backing 285. The latter is fabricated by applying a smoothing treatment (usually referred to as "filming") to the inner surface of the phosphor film after the phosphor film is formed, and then depositing Al by vacuum deposition.

In order to improve the conductivity of the phosphor film 284, there are cases in which the face plate 286 is provided with transparent electrodes (not shown) on the side of the outer surface of the film 284. In this embodiment, however, the electrodes are not used since satisfactory conductivity is obtained with the metal backing alone.

When the above-described sealing operation is performed, sufficient positioning is carried out since the color phosphors and the electron emission devices must be made to correspond in the case of a color display.

The environment within the glass vessel completed as described above is withdrawn through an exhaust pipe (not shown) using a vacuum pump. After a sufficient degree of vacuum is attained, a voltage is applied across the device electrodes through external terminals $DOX_1$~$DOX_m$, $DOY_1$~$DOY_n$, whereby the above-described electrical forming treatment is applied to a thin film 14, to form the electron emitting region.

The voltage waveform in the forming treatment is as shown in FIG. 3. In this embodiment, the treatment is carried out in accordance with the conditions set forth below.

In FIG. 3, T1 and T2 represent the pulse width and pulse interval, respectively, of the voltage waveform. In this embodiment, the pulse width T1 is on the order of 1 msec, the pulse interval T2 is on the order to 10 msec, and the peak value of the triangular wave (the peak voltage at the time of forming) is selected to be 5 V. The forming treatment is applied over a period of 60 sec under a vacuum of about $1 \times 10^{-6}$ Torr. Each electron-emitting region thus produced consists of fine particles, the main ingredient of which is the device palladium, in a dispersed state. The average particle diameter is 30 A.

Next, at the end of the forming treatment for all of the surface-conduction electron emitting devices, the exhaust pipe (not shown) is heated by a gas burner in a vacuum on the order of $1 \times 10^{-6}$ Torr, thereby sealing off the vessel by fusing it.

Finally, a getter treatment is applied in order to maintain the vacuum after sealing. This is a treatment in which a getter, which has been disposed at a prescribed position (not shown) in the image display device, is heated by a heating method such as high-frequency heating immediately before sealing is performed, thereby forming a vacuum-deposited getter film. The principal ingredient of the getter is Ba, etc.

In the image display device of the invention completed as described above, scanning signals and modulating signals are applied to each of the electron emission devices through the external terminals $DOX_1$~$DOX_m$, $DOY_1$~$DOY_n$ by signal generating means (not shown), whereby electrons are emitted. A high voltage greater than several kV is impressed upon the metal backing 285 through a high-voltage terminal Hv, thereby accelerating the electron beam. The electrons bombard the phosphor film 284, thereby exciting the phosphors into light emission to display an image.

The foregoing is the general process necessary to fabricate the image display device. The particular parts of the device, such as the materials constituting the various members, are not limited to those set forth above. Materials may be appropriately selected so as to be suitable for application to the image display device.

<Control of color image in the embodiment>

Figure 13:
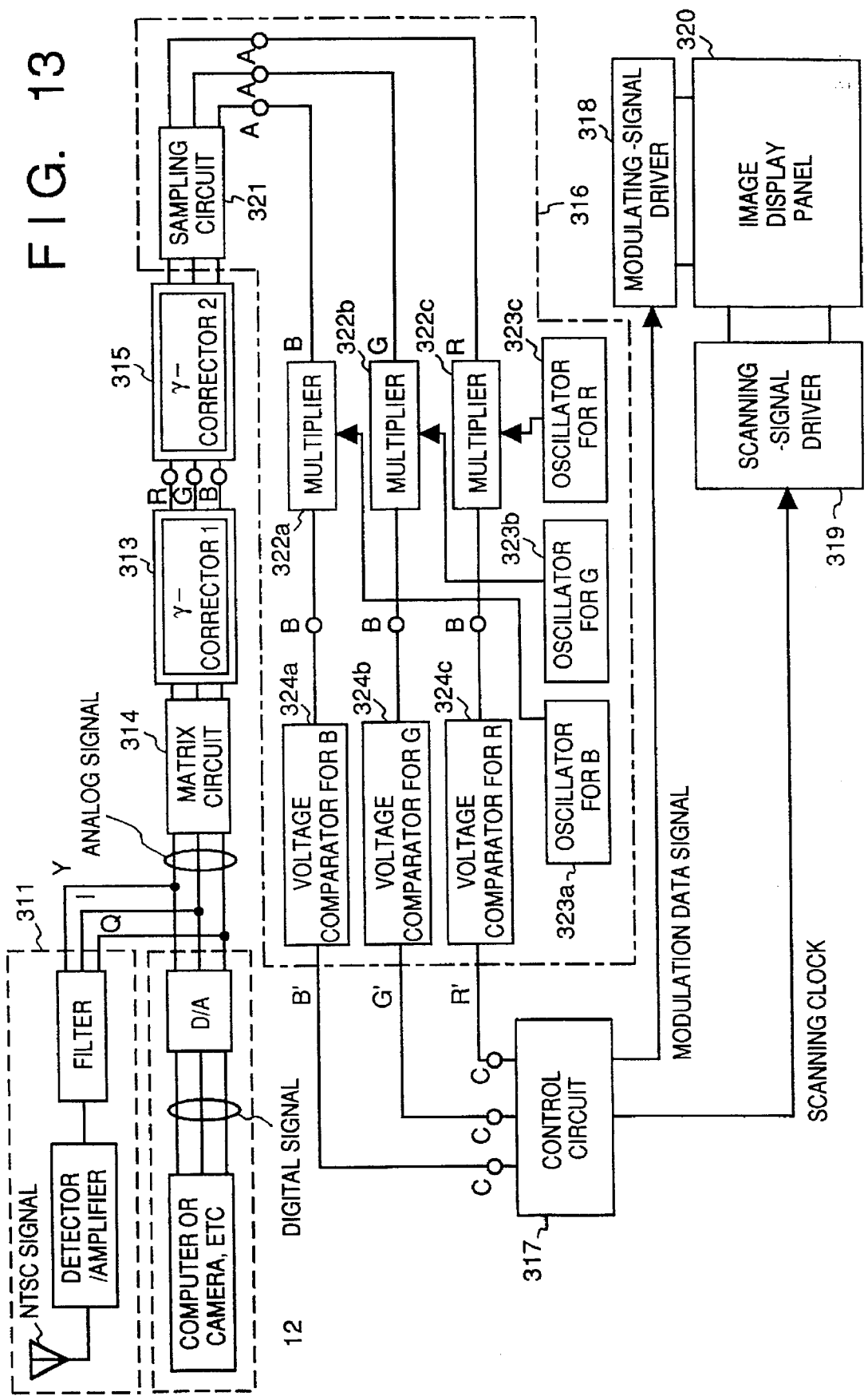
FIG. 13 is a block diagram of a circuit for realizing a gamma correction or color-balance adjustment in the display device according to an embodiment of the invention.

FIG. 13 is a block diagram of a circuit, which is in accordance with the present embodiment, for realizing control of color signals exhibiting tone.

In FIG. 13, a demodulator 311, which is enclosed by the dashed line, detects and amplifies a carrier wave 20 whose frequency has been modulated by video and color signals. A video interface 312, which is enclosed by the dashed line, receives a digital video signal as an input from a computer or the like and converts the signal to an analog signal. A gamma-corrector circuit 313 corrects the image signal in dependence upon a characteristic of applied voltage vs. emission current of the surface-conduction electron emitting devices. A matrix circuit 314 converts Y, I and Q signals, which are the three components of an NTSC signal, into R, G and B signals, which are the three components of a color signal. The matrix circuit 314 is an important circuit in conventional television circuits. FIG. 14 illustrates a typical example of the coefficients of the matrix circuit 314. The coefficients are generally decided by the coefficients of a matrix circuit that prevail when a certain image is converted into an NTSC signal using a television camera. However, the coefficients are not uniquely defined but are capable of being changed depending upon various characteristics on the side of the receiver. A gamma-corrector circuit 315 corrects the R, G, B signals, which are outputted by the matrix circuit 314, in dependence upon the light-emission characteristic of the phosphors.

A pulse-width modulating circuit 316 converts the voltage-modulated R, G, B signals outputted by the gamma-corrector circuit 315 into pulse-width modulated signals. In this embodiment, however, the voltage-modulated signals outputted by the gamma-corrector circuit 315 are inputted directly to a control circuit 317 without using the pulse-width modulating circuit 316. The control circuit 317 generates various signals, which are for driving an image display panel 320, from the voltage-modulated R, G, B signals, and outputs the generated signals to modulating-signal driver 318 and a scanning-signal driver 319. The modulating-signal driver 318 applies drive signals to each of the wiring lines in the column direction and the scanning-signal driver 319 applies drive signals to each of the wiring lines in the row direction. The image display panel 320 has the electron source described above.

The demodulator 311 can utilize circuitry similar to that used in conventional television circuitry.

The demodulator 311 is a circuit necessary for converting the NTSC signal in a television broadcast into predetermined signals (the Y, I and Q signals in this case). Accordingly, in case of a signal based upon a system other than the NTSC, it goes without saying that a different circuit arrangement would be used. For example, it does not matter if a color-component signal [a data signal (CAD data, etc.) from a computer or a signal from a TV camera) is the input signal. In such case the image signal would be accepted by the video interface 312 rather than by the demodulator 311. In this case the conversion into the analog R, G, B signals would be performed in the interface 312 and therefore the matrix circuit 314 would be controlled so as not to function.

Arrangements for realizing the color-signal control method of this embodiment can be divided into a first arrangement for performing color-signal control by the gamma-corrector circuit and matrix circuit 314 and a second arrangement for performing color-signal control by the pulse-width modulating circuit 310. The second arrangement will be described later in connection with the second and third embodiments.

The first arrangement of this embodiment applies the matrix circuit 314 to the image display device using the surface-conduction electron emitting devices. More specifically, by deciding the circuit constants of the matrix circuit 314 upon taking into consideration the electrical characteristics of the surface-conduction electron emitting devices and the light-emission characteristics of the phosphors constituting the image display device, control of control signals exhibits tones may be realized.

Figure 15A:
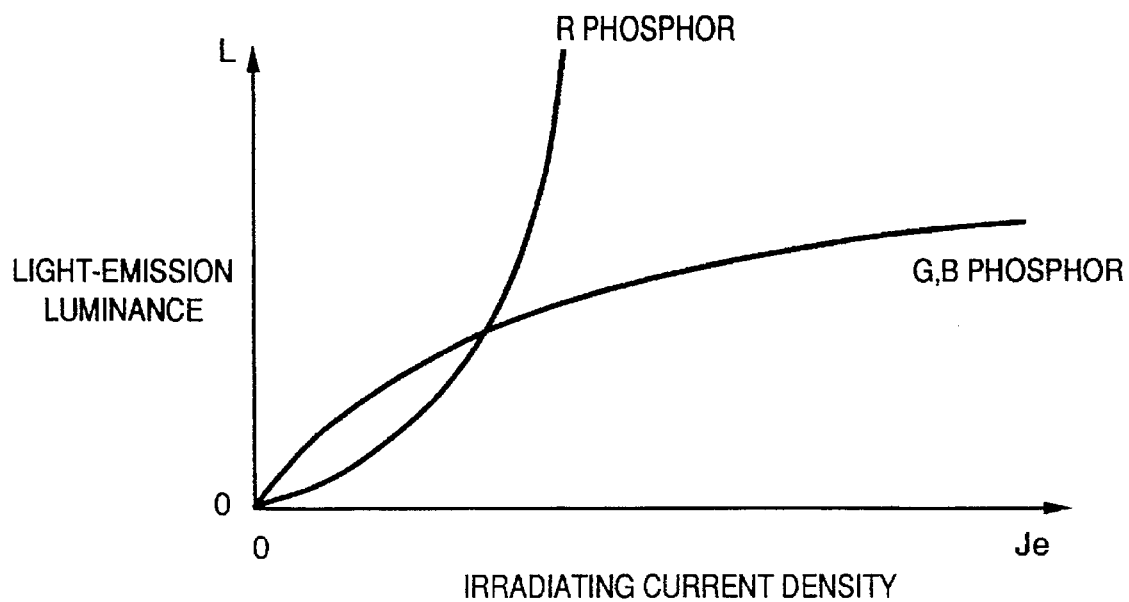
FIGS. 15A and 15B are diagrams illustrating light-emission characteristics of phosphors.
Figure 15B:
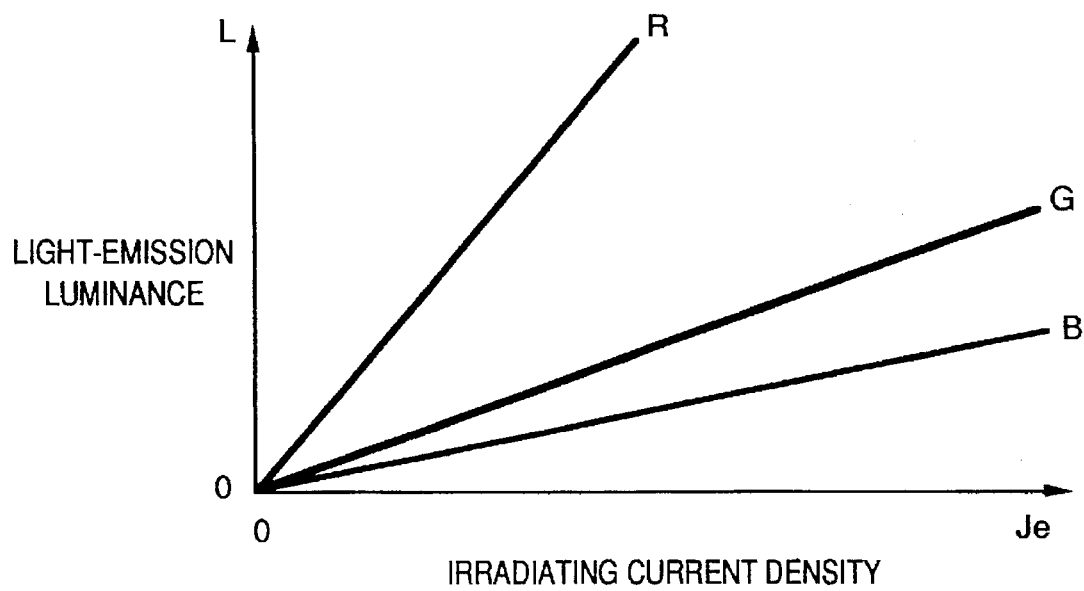

As mentioned above, FIG. 5 illustrates the typical electrical characteristics of a surface-conduction electron emitting devices, which constitutes a color-image display device using the surface-conduction electron emitting devices of this embodiment. FIGS. 15A and 15B are diagrams illustrating the light-emission characteristics of the phosphors constituting the image forming device of this embodiment. As shown in FIG. 5, the electron emission characteristic of the surface-conduction electron emitting devices is non-linear. When a voltage-modulated signal is used as the modulated signal, a change in emission current is large with respect to a very small change in voltage, and it is desired that a gamma-corrector circuit be used in controlling (modulating) the signal.

FIG. 15A illustrates typical light-emission characteristics of the phosphors that constitute the light-emitting portion of the image display device. As illustrated in FIG. 15A, the characteristic curves of the phosphors are not identical and are non-linear owing to differences in the colors of the light emitted. The light-emission characteristics of the phosphors are decided in dependence upon the total amount of electric charge that reaches the surface of the phosphors on a unit surface area in a unit of time. In other words, non-linearity is intrinsic to the phosphors. Of course, the degree of non-linearity differs depending upon the type of phosphor.

The non-linear characteristic of the phosphors can be made a substantially linear characteristic by introducing the gamma-corrector circuits 313, 315, which have long been used in CRTs, for each color. However, the slope of the linear characteristic will differ for each color [see FIG. 15B]. A gamma-corrector circuit is a circuit for converting the characteristic of a signal, which is applied to a circuit having the above-mentioned non-linear characteristic (let this be referred to as "characteristic A"), in such a manner that a characteristic, which is obtained by inverting the characteristic A in advance, will become the input signal. In other words, by making the inverted signal the input signal, a signal that has passed through the circuit having the characteristic A, for example, is outputted as a signal having linearity.

As will be understood from the foregoing description, a gamma-corrector circuit is applicable in a wide variety of circuits exhibiting non-linearity. It goes without saying that a gamma-corrector circuit is applicable not only to the characteristic of phosphors but can be applied also to correction of the non-linearity of the applied-voltage vs. emission-current characteristic of the surface-conduction electron emitting devices according to the invention. In FIG. 13, the gamma-corrector circuit is divided into two circuits, namely one (the gamma-corrector circuit 313) for correcting the characteristic of the surface-conduction electron emitting devices and one (the gamma-corrector circuit 313) for correcting the characteristic of the phosphors. However, this does not impose a restriction upon the invention and it goes without saying that the gamma-corrector may be realized by a single circuit. In this example, the gamma-corrector is described in the form of two circuits for the sake of convenience in order to facilitate an understanding of the functions of the block diagram and because the gamma-corrector circuit 313 for the surface-conduction electron emitting devices is not always necessary in the second arrangement of this embodiment described later.

Thus, as described above, the first arrangement of this embodiment is so adapted that the coefficients of the matrix circuit 314 are controlled to convert the intensity of the signals corresponding to the various colors, thereby correcting for differences (i.e., discrepancies in RGB balance) in the light-emission illuminances of the colors in a case where there is a change in irradiation current due to a difference in the slopes of the phosphor characteristics for the respective colors.

The matrix circuit that implements the first arrangement of this embodiment will now be described with reference to FIGS. 16 and 17.

Figure 16:
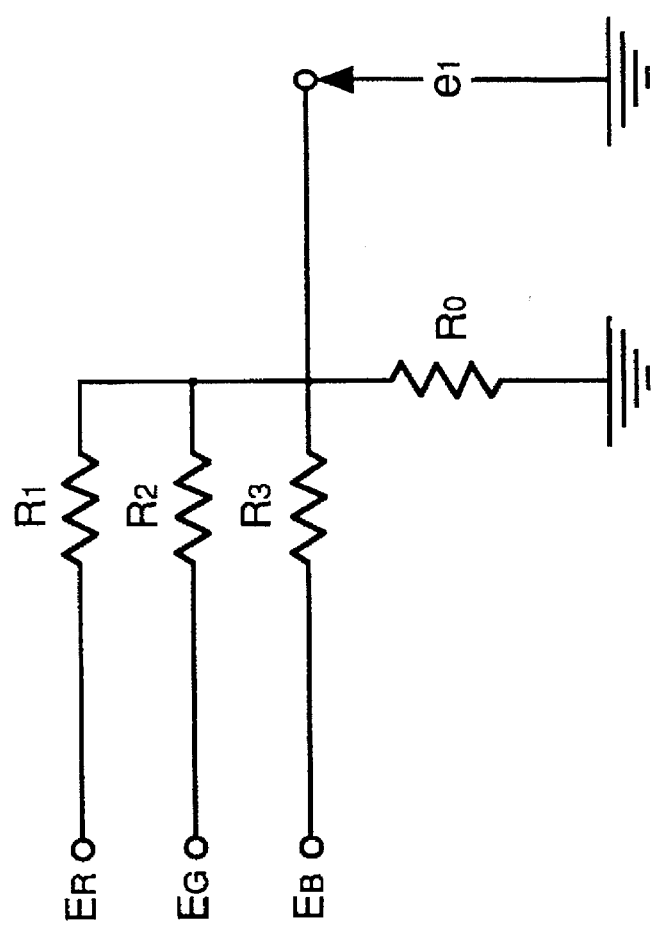
FIG. 16 is a diagram showing the basic configuration of a matrix circuit used in an ordinary television.

FIG. 16 illustrates the basic type of matrix circuit used in an ordinary television receiver. The basic components of the matrix circuit are resistors the accuracy of which has an influence upon color reproducibility. It is possible to change the coefficients of the matrix circuit by changing the resistance values of the resistors. As described earlier, the characterizing feature of this embodiment is that the resistance values of the matrix circuit are controlled upon taking into consideration the electrical characteristics of the surface-conduction electron emitting devices and the light-emission characteristics of the phosphors.

In this embodiment, it is assumed that the electrical characteristics of the surface-conduction electron emitting devices are uniform.

Figure 17:
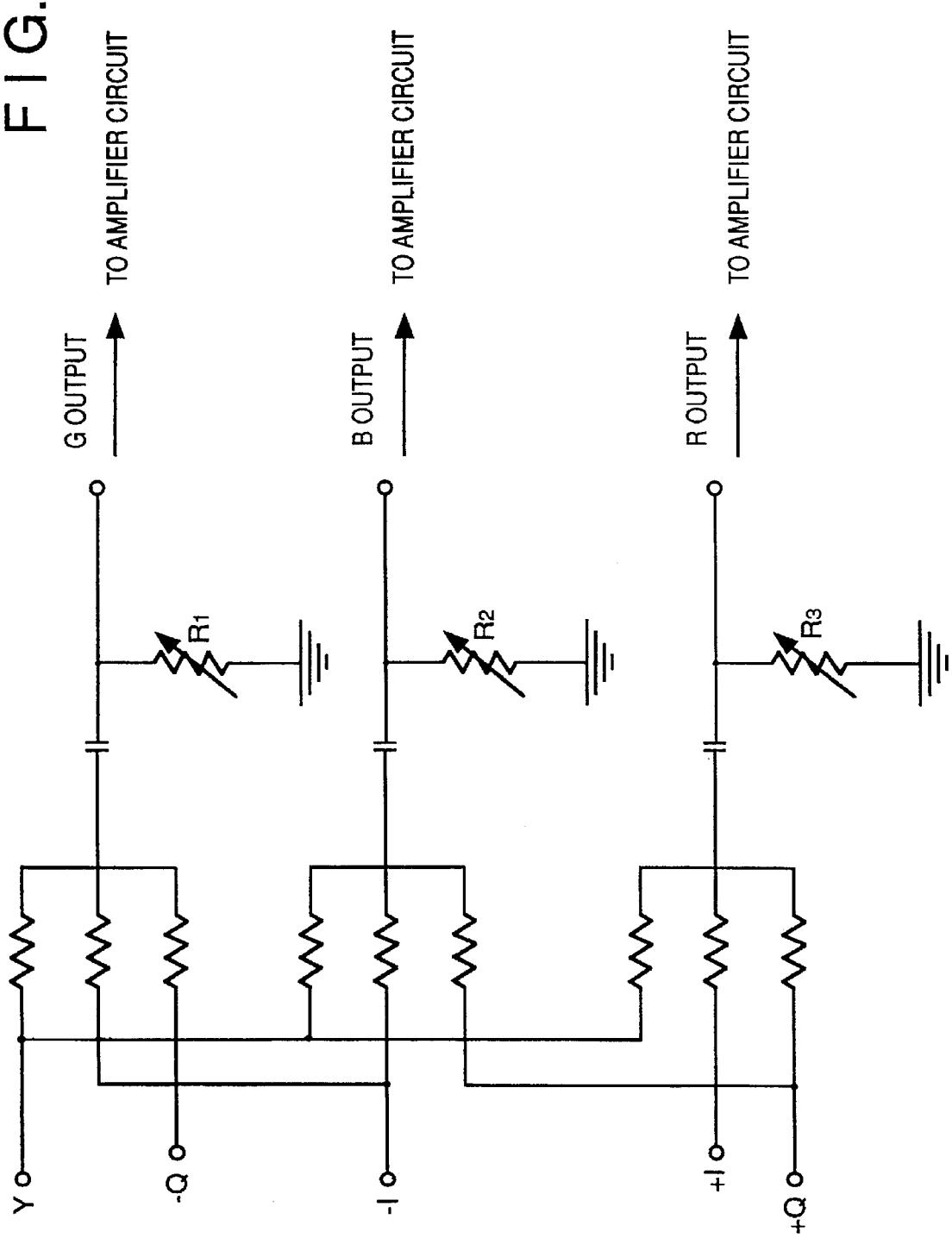
FIG. 17 is a diagram showing the construction of a matrix circuit in this embodiment.

As shown in FIG. 17, variable resistors having different ranges over which resistance is variable are connected for respective ones of the colors R, G and B. The relative ratio of the slopes are calculated from the phosphor characteristics of FIG. 3. In this embodiment, the ratio is R:G:B= 2:1.5:1.2. Next, the calculated relative ratio and the relative ratio of the maximum ranges of resistance variability of the R, G, B variable resistors connected to the matrix circuit are set to be identical. In this embodiment, the ratio is R1:R2:R3=2:1.5:1.2. It will suffice to operatively associate so-called "Brightness Control" signals as the control signals of the variable resistors.

In the first embodiment, as described above, a voltage-modulated signal is used as the modulated signal. Accordingly, it is possible to adjust color tone by a simple circuit arrangement. However, control of the variable resistors must be performed carefully based upon the aforementioned non-linearity of the electrical characteristics exhibited by the surface-conduction electron emitting devices.

[Second Embodiment]

The second arrangement will now be described. In the second arrangement, the pulse-width modulating circuit is used. Consequently, the voltage value applied to the surface-conduction electron emitting devices should be decided with a point on the voltage vs. emission-current characteristic serving as an operating point. As a result, modulation can easily be applied from the voltage-modulated signal. (For example, it is unnecessary to correct the non-linearity of the surface-conduction electron emitting devices.)

First, in FIG. 13, the pulse-width modulating circuit 316, which is the block enclosed by the one-dot chain line, converts the voltage-modulated R, G, B signals outputted by the gamma-corrector circuit 315 into pulse-width modulated color signals (R', G', B'). A sampling circuit 321 samples the R, G, B color signals at a prescribed sampling frequency. Multipliers 322a~322c superimpose signals of prescribed waveforms generated by oscillators 323a~323c upon the sampled color signals. The oscillators 323a~323c generate signals having prescribed waveforms. Voltage comparators 324a~324c compare the signals outputted by the multipliers 322a~322c with prescribed levels and output the results, thereby executing pulse-width modulation. The control circuit 317 controls display operation of the image display panel 320. The control circuit 317 outputs the PWM signals from the modulating circuit 316 to the modulating-signal driver 318 and the scanning clock to the scanning-signal driver 319, in synchronization with the PWM signal output.

The pulse-width modulating circuit 316 converts the voltage-modulated signal to a pulse-width modulated signal. However, the characterizing feature of this embodiment is that separate processing is executed for each component of the color signal and the control coefficients are decided in dependence solely upon the light-emission characteristics [FIG. 15A] of the phosphors. Further, in the second embodiment having the second arrangement, the gamma-corrector circuit 313 for the surface-conduction electron emitting devices is not always necessary.

The following three methods may be mentioned as specific methods of realizing the pulse-width modulating circuit 316 using analog circuitry:

(1) In a process for superimposing a certain fixed waveform (sinusoidal, triangular, sawtooth, etc.) upon the voltage-modulated signal sampled for each color, the width of the pulse-width modulated signal obtained is controlled by controlling the peak value of the fixed waveform for each color signal.

(2) In a process for obtaining a pulse-width modulated signal by passing a signal, which is the result of superimposing a certain fixed waveform (sinusoidal, triangular, sawtooth, etc.) upon a voltage signal sampled for each color, through a voltage comparator, the width of the pulse-width modulated signal obtained is controlled by controlling the comparison level voltage of the voltage comparator for each color signal.

(3) A method which is a combination of both (1) and (2) is of course possible.

It should be noted that the sampling circuit in the foregoing methods is not always necessary.

Next, an embodiment will be illustrated to describe in detail a method of controlling color signals exhibiting tone in a color-image display device using surface-conduction electron emitting devices.

Figure 18:
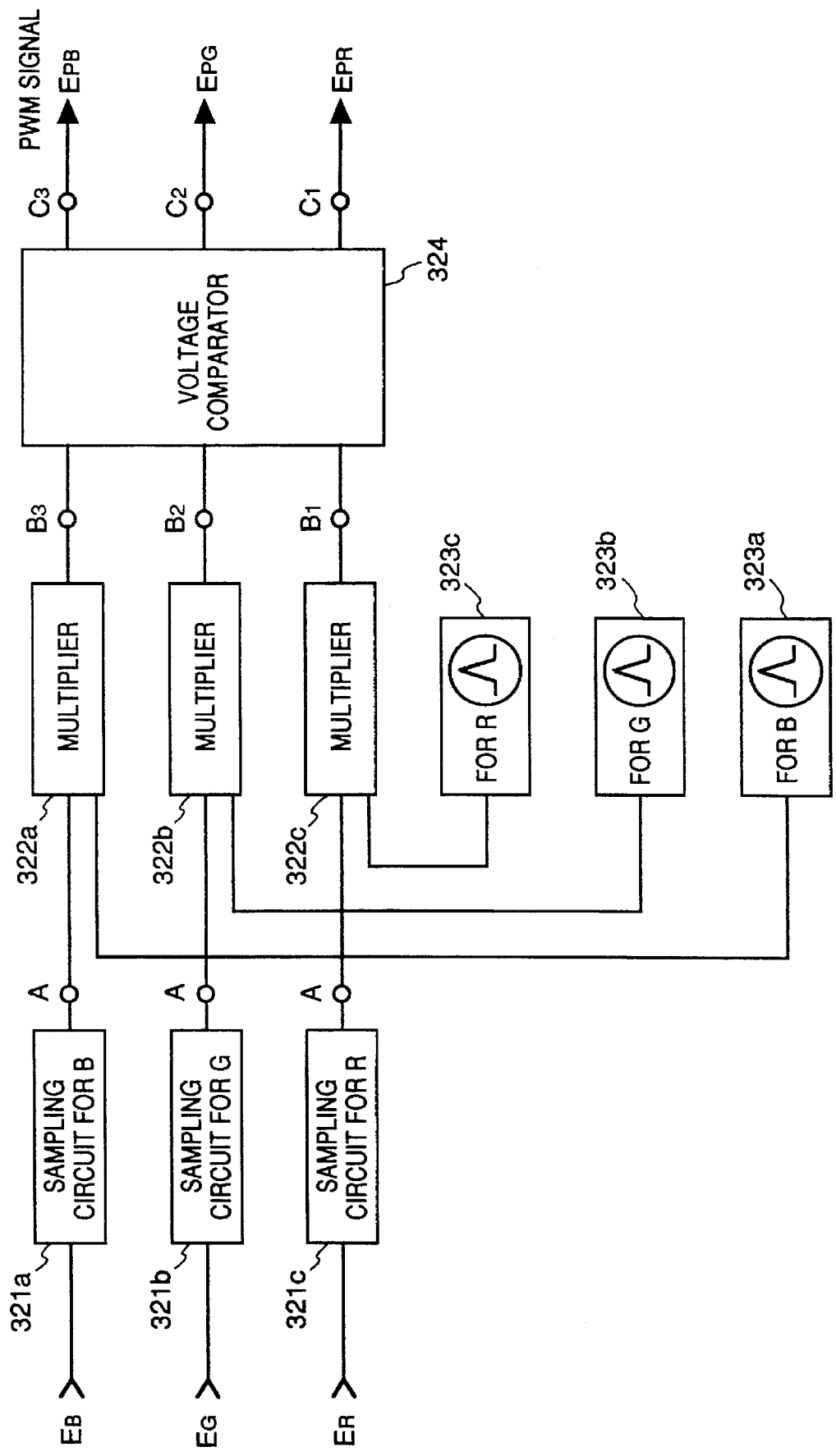
FIG. 18 is a block diagram illustrating an example of the construction of a pulse-width modulating circuit in a second embodiment.

The pulse-width-modulating circuit 316 will be described with reference to FIG. 18, which is a block diagram of the pulse-width modulating circuit 316 according to this embodiment. Further, FIGS. 19A, 19B1~19B3, 19C1~19C3 illustrate signal waveforms at various points in the pulse-width modulating circuit 316 of FIG. 18.

The voltage-modulated signal in each color is sampled in a respective one of the sampling circuits 321a~321c. The output of the sampling circuit at such time is shown in FIG. 19A. The description given here is based on the assumption that an identical voltage-modulated signal has been inputted for each of the colors R, G, B. Next, the oscillators 323a~323c, which generate the sawtooth waves applied to the multipliers 322a~322c, supply the sawtooth waves separately color by color. By controlling the peak values of the waveforms (assumed to be sawtooths in this embodiment) color by color, pulse-width modulation of each voltage-modulated signal is controlled for each color. More specifically, when the sawtooth waves are superimposed by the multipliers 322a~322c, waveforms specific to the respective colors are obtained, as shown in FIGS. 19B1~19B3. Furthermore, by passing these waveforms through the voltage comparator 324, pulse-width modulated waveforms of the kind shown in FIGS. 19C1~19C3 are obtained.

Accordingly, by deciding the relative ratio of the peak values of the superimposed waveforms upon taking into consideration the characteristics of the surface-conduction electron emitting devices and the light-emission characteristics of the phosphors, a correction is applied to the disparity among the light-emission illuminances of the respective colors (namely the shift in the RGB balance), which disparity prevails when the illumination current is changed and occurs owing to the difference among the slopes of the light-emission characteristics of the phosphors. In this embodiment, the electrical characteristics of the surface-conduction electron emitting devices are uniform for each color, just as in the first embodiment. In addition, the light-emission characteristics of the phosphors are assumed to be identical with those shown in FIGS. 15A and 15B. Accordingly, the relative ratio among the peak values of the superimposed waveforms is 2:1.5:1.2, which is the relative ratio among the slopes of the phosphor light-emission characteristics. In a case where there is a variance in the electrical characteristics of the electron emission devices, it will suffice to change the numerical values in conformity with the variance. Pulse-width modulated signals, which have been corrected for any disparity in the phosphor characteristics according to color, are thus obtained.

[Third Embodiment]

Figure 20:
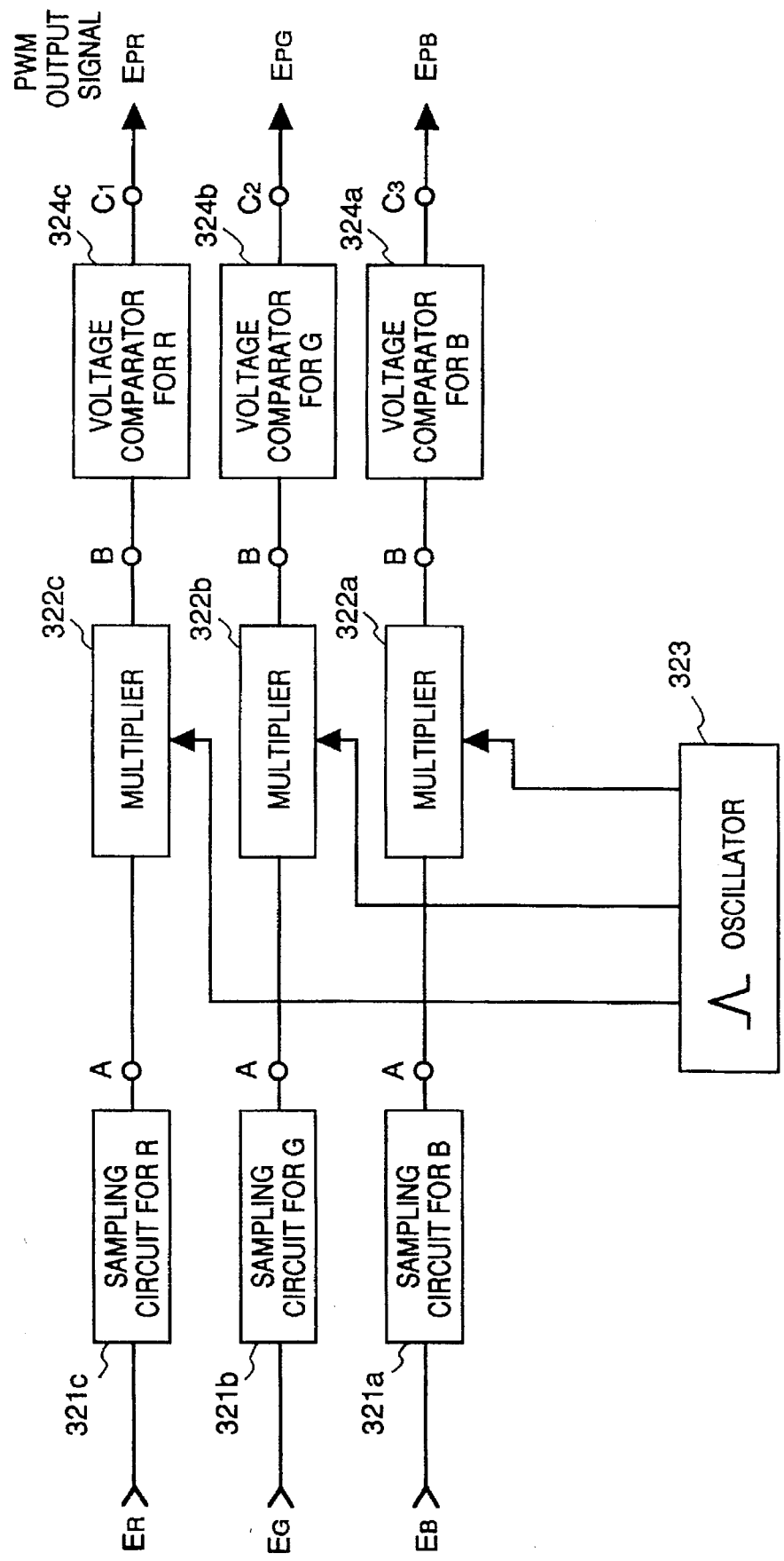
FIG. 20 is a block diagram illustrating the construction of a pulse-width modulator in a third embodiment.

Another example of the pulse-width modulating circuit 316 will be described with reference to FIGS. 20, 21A, 21B and 21C1~21C3. FIG. 20 is a block diagram illustrating a pulse-width modulating circuit, which is for converting voltage-modulated signals into pulse-width modulated signals, according to the third embodiment, and FIGS. 21A, 21B and 21C1~C3 illustrate signal waveforms at various points in the pulse-width modulating circuit of FIG. 20. In this example, the comparison level voltages of voltage comparators are controlled color by color. As in the first embodiment, it is assumed that the electrical characteristics of the surface-conduction electron emitting devices are uniform in each color and that the phosphor light-emission characteristics are identical with those shown in FIGS. 15A and 15B.

First, voltage-modulated signals corresponding to the respective colors are sampled by the sampling circuits 321a~321c for the respective colors. The output waveform of each of the sampling circuits 321a~321c at this time is shown in of FIG. 21A. Next, the multipliers 322a~322c superimpose prescribed waveforms (sawtooths in this example), which have been generated by the oscillator 323, on the signals outputted by the sampling circuits 321a~321c. The waveforms of the signals outputted by the multipliers 322a~322c are illustrated in of FIG. 21B.

Finally, the superimposed signals are converted to pulse-width modulated signals by voltage comparators 324a~324c arranged separately for respective ones of the colors. By controlling the comparison levels of the voltage comparators 324a~324c, pulse-width modulated signals, which have been corrected for any disparity in the phosphor characteristics according to color, are obtained. Accordingly, the relative ratio among the comparison level voltages of the voltage comparators is 2:1.5:1.2, which is the relative ratio among the slopes of the phosphor light-emission characteristics. In a case where there is a variance in the electrical characteristics of the electron emission devices, it will suffice to change the numerical values in conformity with the variance, just as in the second embodiment. The superimposed waveforms prevailing at this time are illustrated in FIGS. 21C1~21C3.

In accordance with the second and third embodiments, as described above, tone is expressed by pulse-width modulation. As a result, a constant voltage need only be applied to the surface-conduction electron emitting devices and it is unnecessary to correct for the non-linearity of the devices. This facilitates control and correction of tones. Furthermore, since the slopes of the light-emission characteristics of the phosphors in each of the colors is corrected for at the time of pulse-width modulation, the matrix circuit and gamma-corrector circuit are simplified in construction.

[Fourth Embodiment]

FIG. 22 is a block diagram of a circuit for controlling color signals having tones according to the present invention. In this embodiment, it is assumed that the signal that enters a gamma-corrector circuit 425 as a video signal is a digital signal. This arrangement is suitable for a case in which a digital signal such as that from a computer is handled. In a case where the circuit of this embodiment is applied to a TV NTSC signal as is, it is necessary that the signal be converted to a digital signal by an A/D converter 433, as shown in FIG. 22. In FIG. 22, numeral 421 denotes a demodulator that detects and amplifies a carrier wave whose frequency has been modulated by video and color signals. Numeral 422 denotes a video interface for outputting a digital RGB signal from a computer or the like. A gamma-corrector circuit 426 corrects the gamma characteristic of the phosphors. Since this embodiment handles digital signals, a conversion is made using a correction table (a look-up table) that conforms to the phosphor gamma characteristic. One example of the look-up table is illustrated in FIG. 23A. For the sake of simplicity, it is assumed that the digital signal is composed of eight bits. By way of example, at a level of grade 1, which has the lowest luminance, the output is 00H with respect to an input of 00H (where H is indicative of a hexadecimal number); at a level of grade 200, which has the intermediate level, the output is AAH with respect to an input of 55H; at a level of grade 256, which has the highest luminance, the output is FFH with respect to an input of FFH. As for the result of the conversion, it is possible to drive the display with the phosphor gamma characteristic of FIG. 23B being regarded as a linear characteristic, as illustrated in FIG. 23C.

Numeral 424 denotes a matrix circuit that converts Y, I and Q signals, which are the three components of an NTSC signal, into, say, R, G and B signals (actually color difference signals, such as Y−B), which are the three components of a color signal. Though this circuit is unnecessary in a case where a digital RGB signal from a computer or the like is handled, it is needed when a TV video signal is handled. Further, since the matrix circuit generally is formed by a resistor circuit network, it is not suitable for handling digital signals. Accordingly, in a case where a TV video signal is handled according to this embodiment, it is desired that signals be handled in analog form up to the matrix circuit, at which point the signals would be converted to digital signals.

Figure 24:
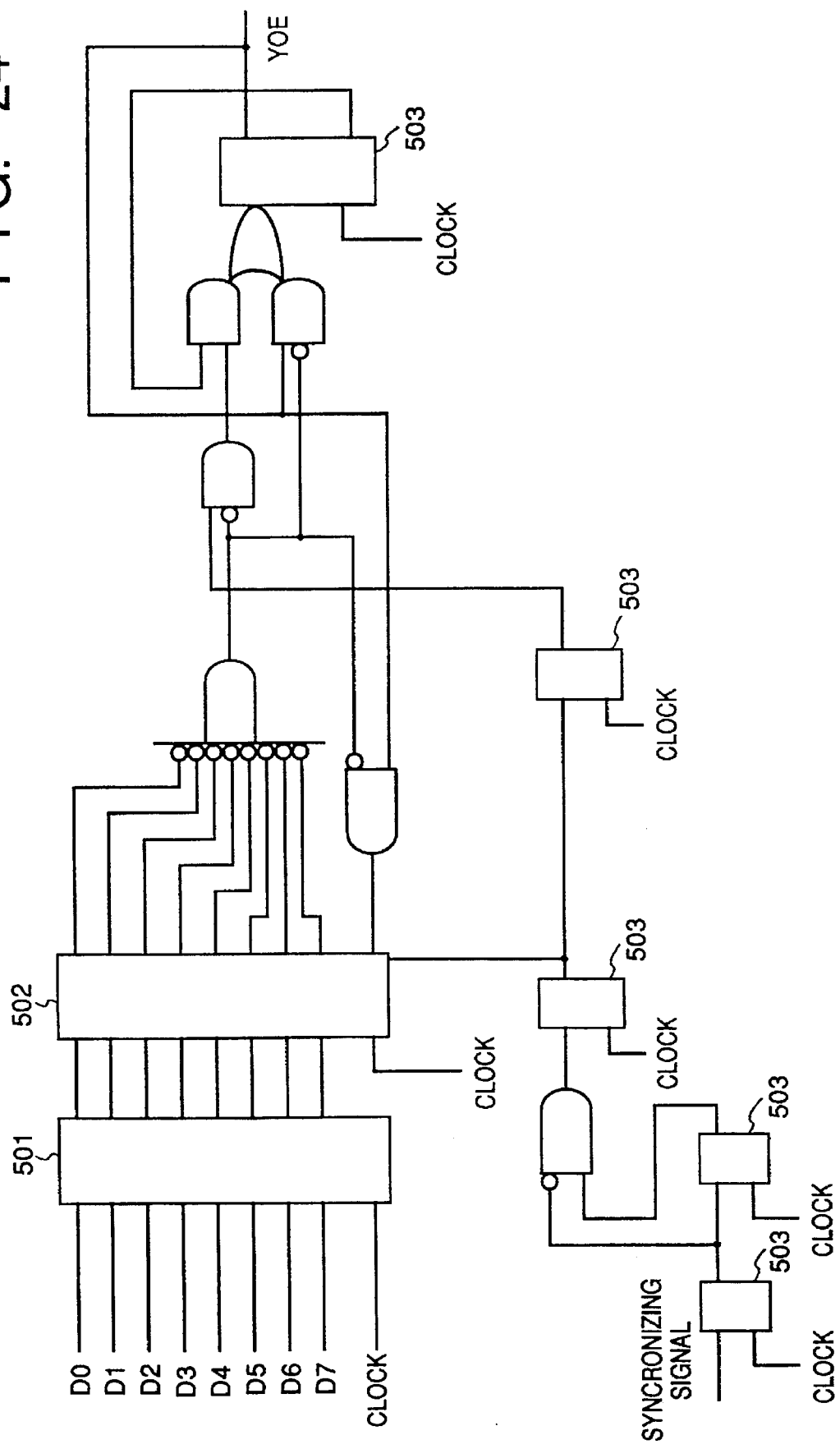
FIG. 24 is a circuit diagram illustrating a first example of a pulse-width modulating circuit used in FIG. 22.

Numeral 426 designates a pulse-width modulating circuit that converts the digital R, G, B signals outputted by the gamma-corrector circuit 425 into pulse-width modulated luminance signals. FIG. 24 illustrates a specific example of the construction of the digital circuitry constituting the pulse-width modulating circuit 426. In FIG. 24, numeral 501 denotes a latch circuit, 502 a counter and 503 a D-type flip-flop circuit. An eight-bit digital signal D0~D7 is applied as an input, the input data is fed into a counter 502 and the output level is set high. Next, a down-counter is actuated and the output level is set low when the value in the counter becomes zero, at a result of which a pulse-width modulated signal YOE can be obtained in conformity with the input data. By forming this circuit for each of the colors R, G, B, a pulse-width modulated signal can be obtained for each color. Furthermore, by adjusting variable power supplies 432a, 432b and 432c independently for each of the R, G, B signals, the clock frequency of the digital circuit can be controlled by external circuits 31a~31c [in this embodiment VCOs (voltage-controlled oscillators) are used as the external circuits] and the period of the reference clock of pulse-width modulation is changed to adjust pulse width over the entirety of a pulse-width modulated signal. This makes it possible to perform control of color tone suited to individual preference. The foregoing is merely an example of the circuitry and does not impose a limitation upon the invention.

Figure 25:
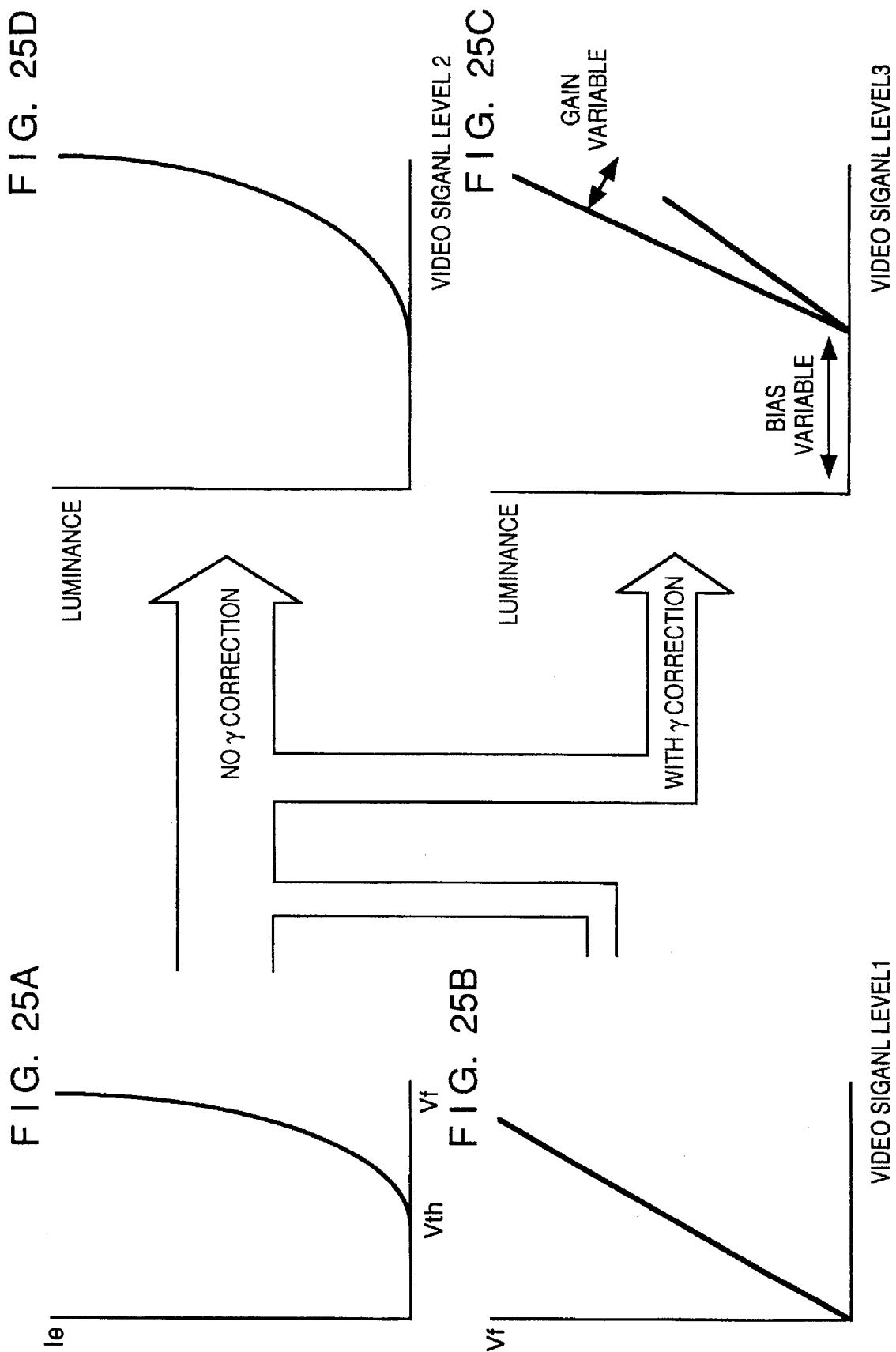
FIGS. 25A through 25D are diagrams for describing a method of controlling color signals having tones in a fifth embodiment.

FIGS. 25A through 25D are diagrams for describing the principle according to which color signals having tones are controlled by voltage modulation. FIG. 25A is a diagram showing the I-V characteristic of a surface-conduction electron emitting devices, FIG. 25B is a diagram showing a video-signal level vs. drive-voltage characteristic that has been gamma-corrected based upon a phosphor gamma characteristic. FIG. 25C is a diagram showing a video-signal level vs. luminance characteristic in a case where a gamma correction has been applied based upon the I–V characteristic of the surface-conduction electron emitting devices, and FIG. 25D is a diagram showing a video-signal level vs. luminance characteristic in a case where a gamma correction has not been applied based upon the I–V characteristic of the surface-conduction electron emitting devices. In this embodiment, the operating straight line is controlled on the I–V characteristic by ① positively or negatively biasing the drive voltage or ② changing gain when the drive voltage is variable or by a combination of ① and ②. As shown in FIG. 25C, the video signal (3) is gamma-corrected based upon the I–V characteristic of the surface-conduction electron emitting devices. As a result, luminance varies linearly along with the video signal.

Figure 26:
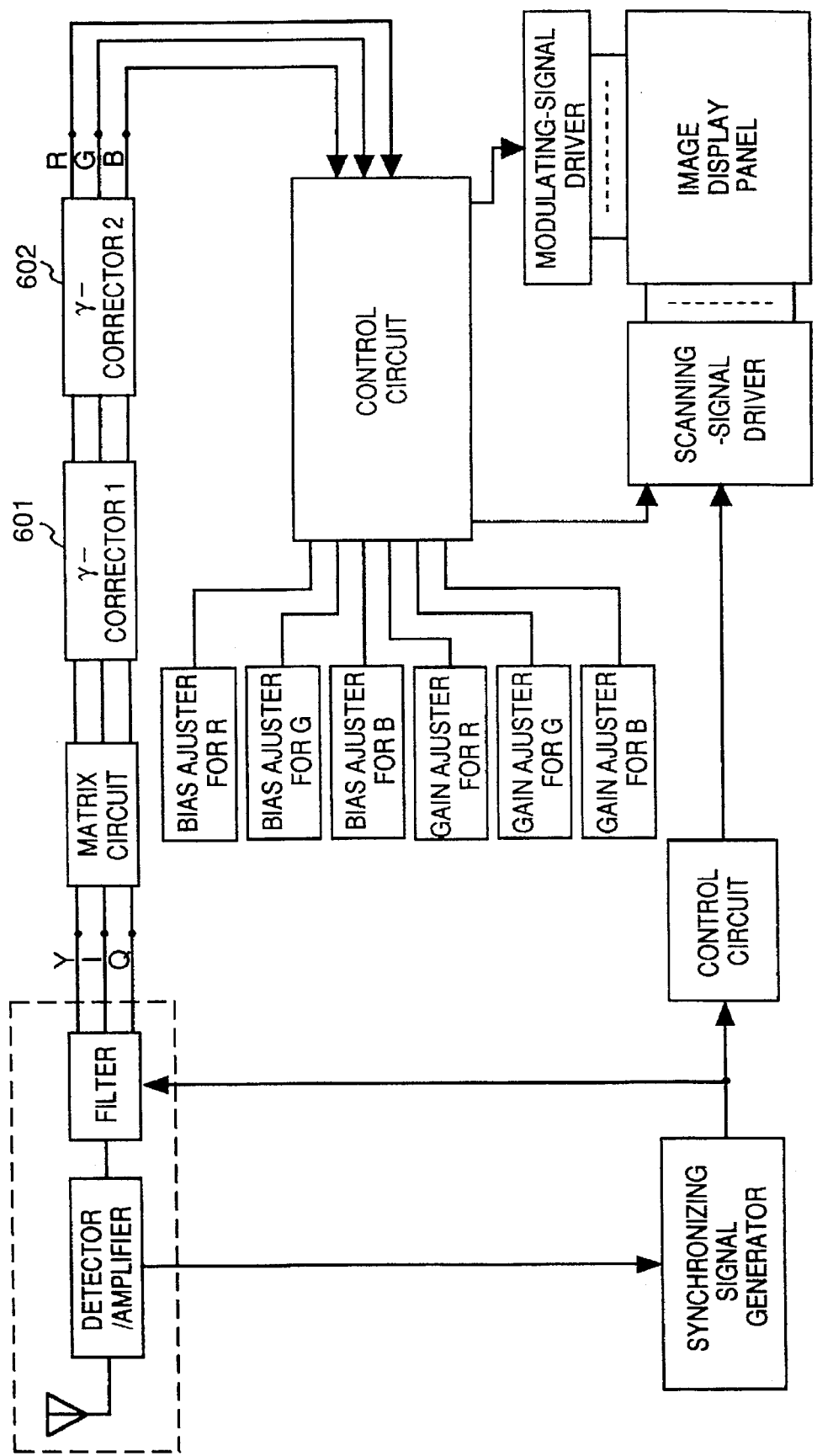
FIG. 26 is a block diagram of a circuit for controlling color signals having tones according to a fifth embodiment.

FIG. 26 is a block diagram of the actual circuit construction. As in the first embodiment, the detected and amplified Y, I, Q signals are converted into R, G, B signals in a matrix circuit, and a gamma correction is performed based upon the phosphor gamma characteristic using a gamma-corrector circuit 601. Next, a gamma-corrector circuit 602 performs a gamma correction, which is based upon the characteristics of the surface-conduction electron emitting devices, for each of the R, G, B signals.

As set forth in the description of the principles of the invention, adjustment of luminance by voltage modulation is made possible by controlling bias voltage or gain in operatively associated fashion based upon an input video signal for each color. Furthermore, it is possible to perform color adjustment suited to individual preference by controlling bias voltage or gain, using R, G, B bias adjusters or R, G, B gain adjusters, independently of the input signals of the respective colors. Though this embodiment is described for a case in which video signals are handled as analog signals, a circuit arrangement for digital signals also is possible as a matter of course.

In accordance with the first through fifth embodiments, as described above, tone control and color-signal control, namely control of color shift and color balance, etc., can readily be performed on the receiver side in a color-image display device using surface-conduction electron emitting devices. Such control was a problem when trying to express color signals having tone.

Furthermore, the tone control method of the second and fourth embodiments is such that control is performed independent of the electron emission devices. Therefore, even if a variance develops in the electrical characteristics of the surface-conduction electron emitting devices corresponding to each color, it is possible to correct for this variance. As a result, the manufacturing yield of the color-image forming device is improved.

[Sixth Embodiment]

Next, an embodiment will be described in which use is made of a display panel equipped-with surface-conduction electron emitting devices as an electron source. In this embodiment, however, the display panel has a construction different from that of FIG. 11.

Before describing this embodiment in detail, the display device of the embodiment will be explained in simple terms. The display device includes an electron-source substrate on which a number of surface-conduction electron emitting devices are arrayed two-dimensionally, and phosphors, which are disposed at a position opposing the electron-source substrate, for emitting visible light in response to irradiation with an electron beam, the substrate and the phosphors being sealed within an evacuated vessel held at a vacuum $1 \times 10^{-6}$ Torr. Furthermore, the surface-conduction electron emitting devices arrayed two-dimensionally on the electron-source substrate have drive wiring connected to both ends thereof in such a manner that the devices can be selected and driven in line units. Voltage is applied uniformly across the surface-conduction electron emitting devices on a scanning line as lines are scanned successively in line units by a scanning control circuit. The devices are driven as a result.

Furthermore, a grid is interposed between the surface-conduction electron emitting devices and the phosphors. The grid, which is elongated in a direction at right angles to the line direction, is for individually controlling the amounts of emission current reaching the phosphors. Illuminance of the light emission at the phosphor surface is controlled by controlling the applied voltage of the grid in dependence upon the image signal.

Furthermore, in accordance with a first color-balance correction method according to this embodiment, red (R), green (G) and blue (B) signals voltage-modulated in conformity with luminance for a color display are subjected to a correction conforming to the light-emission characteristics of the R, G, B phosphors and/or a correction conforming to the voltage dependency of the grid, and the grid is voltage-modulated for proper color balance to provide a color display.

Furthermore, in accordance with a second color-balance correction method according to this embodiment, R, G, B are corrected in dependence upon the light-emission characteristics of the phosphors, and the R, G, B signals pulse-width modulated in conformity with luminance for a color display are applied to the grid to provide a color display.

The grid is an electrode for controlling the trajectory of the electron beams emitted by the electron emission devices and is capable of controlling the quantity of the electron beams irradiating the phosphor surface by an electric signal applied to the electrode. The electrode may also serve to focus or deflect the electron beams. Further, the position at which the grid is placed in this embodiment is between the electron emission devices and the phosphor surface. However, the grid may be provided in the same plane as the electron emission devices or, in certain cases, the electron emission devices may be placed between the grid and the phosphor surface. Further, as described above, a pulsed voltage is used as the electric signal applied to the grid and the quantity of electron beams irradiating the phosphor surface is controlled by changing the peak value of the pulses or the pulse width. However, the invention is not limited to an arrangement in which only one of pulse peak value and pulse width is changed. For example, both peak value and pulse width may be changed. Alternatively, the number of pulses may be changed using a plurality of pulses, thereby to control the quantity of electron beams irradiating the phosphor surface.

This embodiment will now be described in detail.

Figure 27:
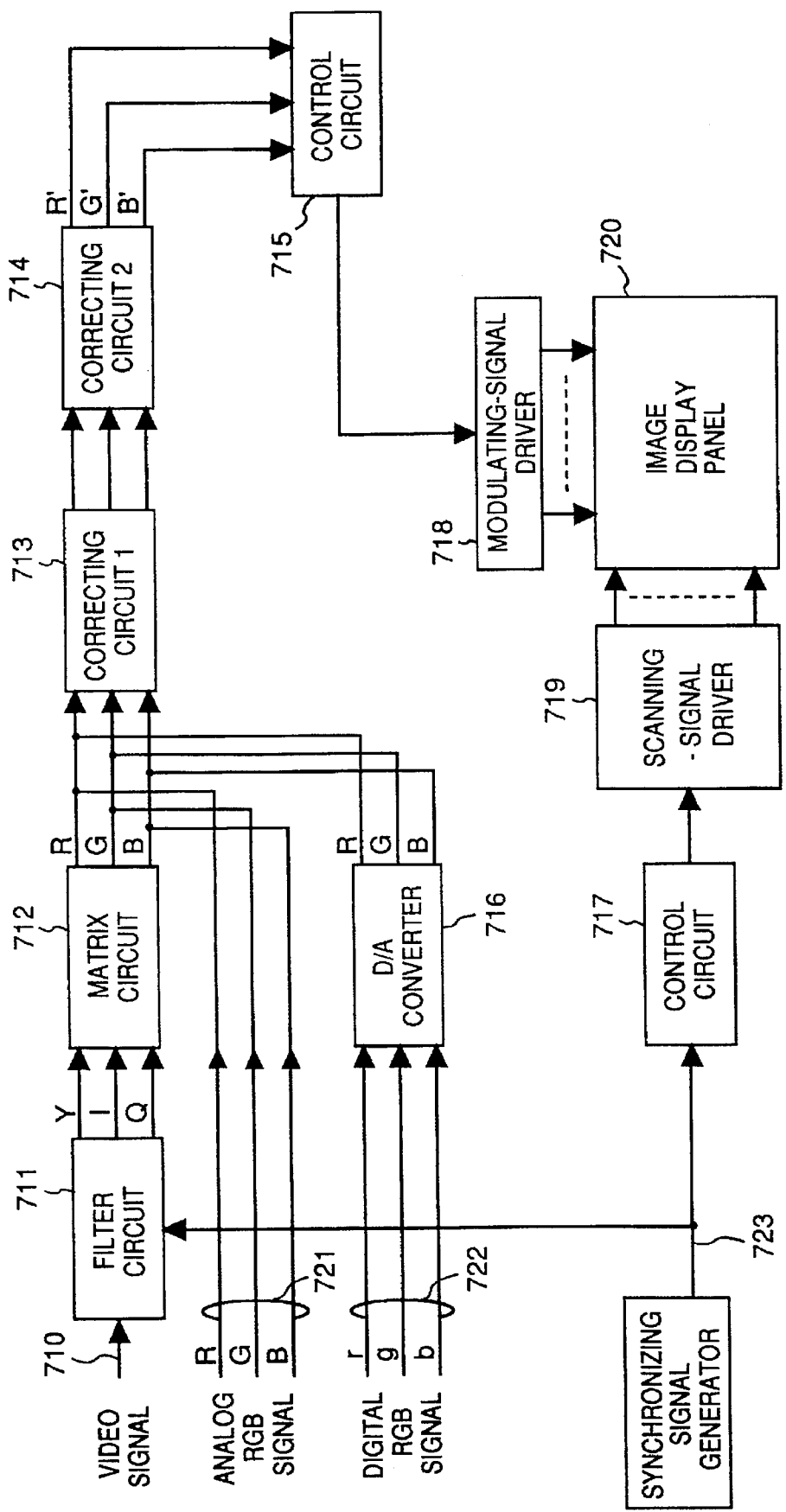
FIG. 27 is a block diagram illustrating the construction of a color-image display device according to a sixth embodiment.

FIG. 27 is a block diagram illustrating the circuitry of a sixth embodiment for controlling color signals having tones according to the invention.

In FIG. 27, an input video signal 710 is a signal obtained by modulating a carrier wave of a certain frequency by video and color signals. This signal enters a filter circuit 711. The latter detects and amplifies the video signal 710. A circuit similar to that of a conventional television circuit can be used. A matrix circuit 712 is an important circuit conventional television circuitry and has circuit constants for converting Y, I and Q signals, which are the three components of an NTSC Signal, into R, G and B signals, which are the components of a color signal. FIG. 14 illustrates a typical example of the coefficients of the matrix circuit 712. The coefficients are generally decided by the coefficients of a matrix circuit that prevail when a certain image is converted into an NTSC signal using a television camera. However, the coefficients are not uniquely defined but are capable of being changed depending upon various characteristics on the side of the receiver.

In case of a signal based upon a system other than the NTSC, it goes without saying that a different circuit arrangements would be used for the filter circuit 711 and matrix circuit 712. For example, in a case where certain color signal components (e.g., analog R, G, B signals 721 or digital R, G, B signals 722, which are shown in FIG. 27) are entered, the analog R, G, B signals 721 directly enter a correcting circuit (1) 713, which is the next stage, and the digital R, G, B signals 722 enter a correcting circuit (2) 713 upon first being converted into analog signals by a D/A converter 716. The image signal thus entered may be a data signal from a computer, a baseband signal from a television camera, etc.

The correction characteristics in the correcting circuit (1) 713 and (2) 714 will now be described.

Figure 28A:
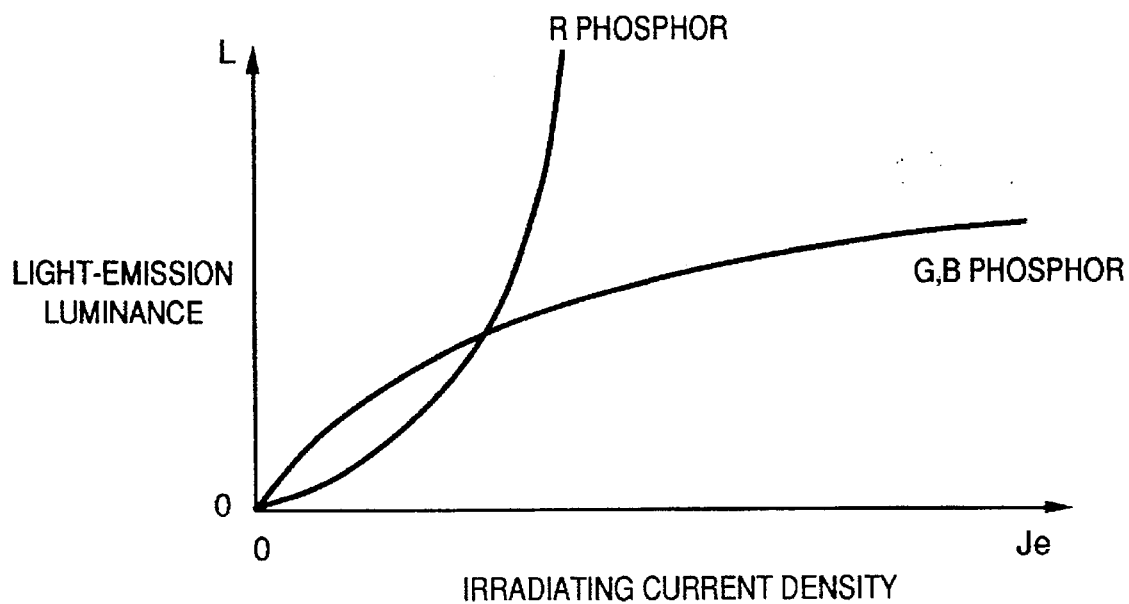
FIGS. 28A and 28B are diagrams illustrating the light-emission characteristics of phosphors.
Figure 28B:
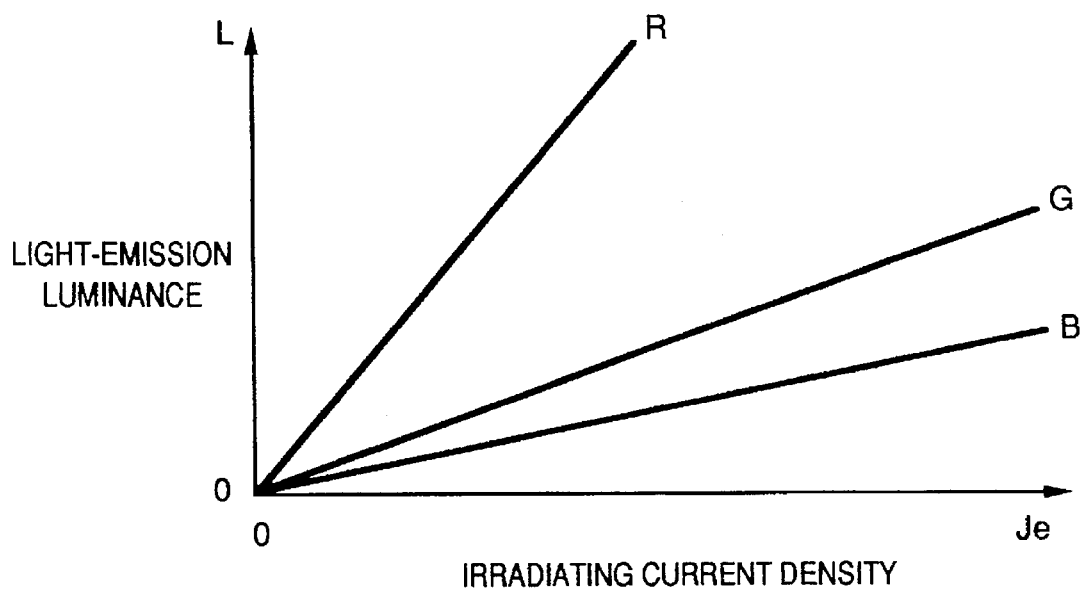

FIGS. 28A and 28B are diagrams for describing the phosphor light-emission characteristics of this embodiment. FIG. 28A illustrates typical light-emission characteristics of the phosphors forming the light-emission portion of the color-image display device. As shown in FIG. 28A, the phosphor characteristics do not define exactly the same characteristic curves owing to a difference in the color emitted. In addition, the curves are non-linear. The non-linear characteristic can be made a substantially linear characteristic by introducing gamma-corrector circuits, which have long been used in CRTs. However, slope differs for each color [see FIG. 28B]. In order to correct for the slope in conformity with each of the color components R, G, B, the correcting circuit (1) 713 in FIG. 27 is provided. In the description that follows, it is assumed that a gamma correction has been performed with regard to the phosphor characteristics.

Furthermore, with regard also to the grid serving as means for controlling irradiation current, as described below, the grid exhibits non-linearity, as shown in FIG. 5, with respect to applied voltage. Therefore, a correction to an image signal having a linear characteristic is performed by the correcting circuit (2) 714 in FIG. 27. Thus, an image having a linear characteristic can be displayed by applying voltage modulation to the voltage impressed upon the gird. Further, rather than relying upon voltage modulation, pulse-width modulation of the kind described later can be carried out to control the voltage impressed upon the grid.

Furthermore, one line of an image display can be presented by rearranging the R, G, B signals while synchronization is established in pixel units using a control circuit 715, and the rearranged signals are outputted to a driver 718 on the data side. Concurrently, a horizontal synchronizing signal 723 extracted from the video signal 710 is entered and a line synchronizing signal is outputted to a scanning-signal driver 719 through the control circuit 717. As a result, the display lines are scanned successively so that a two-dimensional image is displayed on a display panel 720.

The color-image display device of this embodiment described above provides outstanding effects as a grid-type color-image display device using surface-conduction electron emitting devices.

It should be noted that the basic construction, method of manufacture and characteristics of the surface-conduction electron emitting devices that constitute the display panel 720 of this embodiment are as described above.

Figure 29:
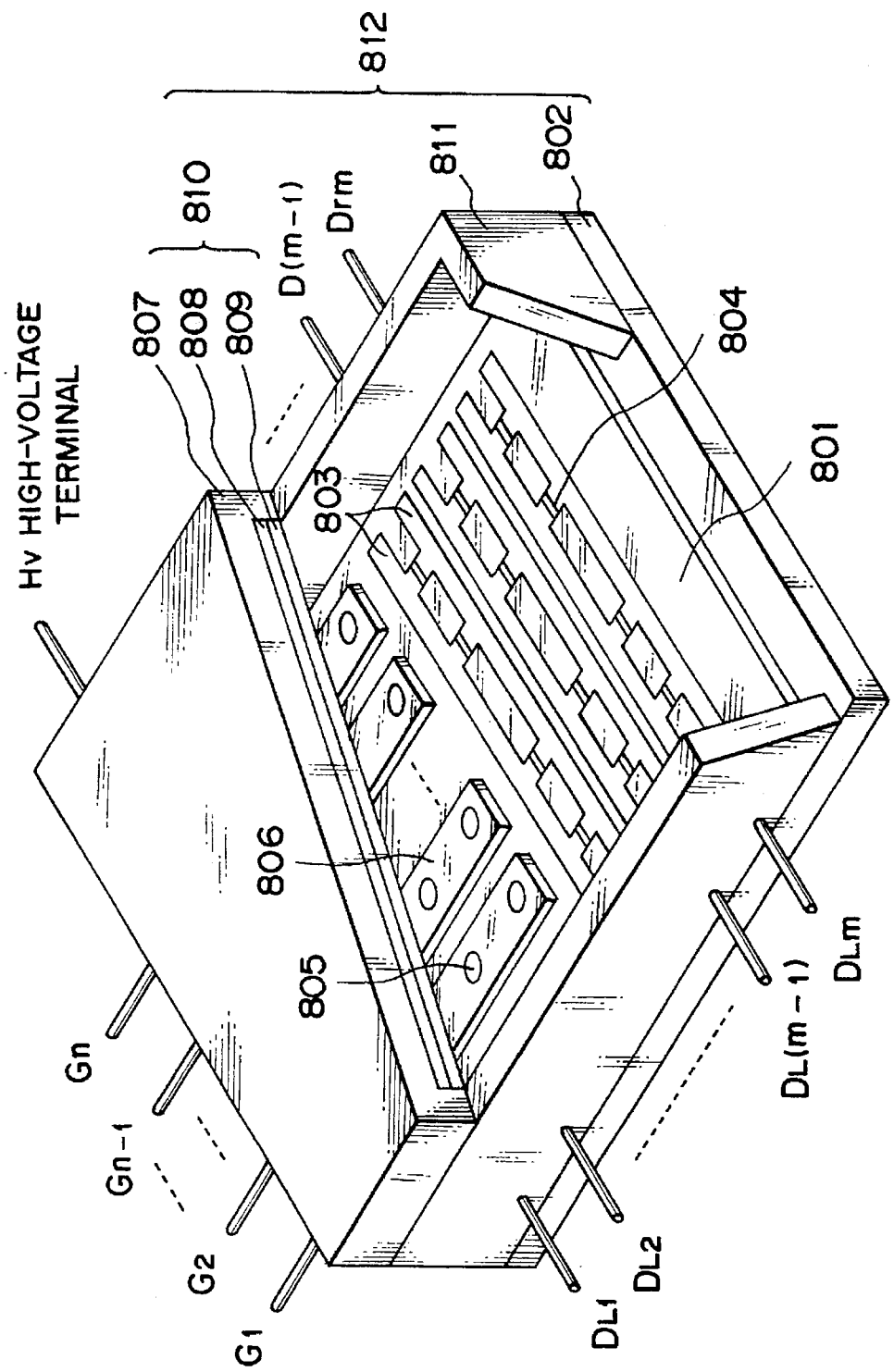
FIG. 29 is a perspective view showing the construction of a color display panel used in the display device of the sixth embodiment.

FIG. 29 is a diagram illustrating a typical example of the construction of a color-image display device of this embodiment.

In FIG. 29, a number of the electron emission devices are arranged in parallel, and both ends of the individual devices are connected to respective wires to form rows. A substrate 801 (for example, see Japanese Patent Application Laid-Open No. 1-31332 filed by this applicant) on which a number of these rows are arrayed is secured to a rear plate 802, after which a grid 806 having electron transmitting holes 805 is placed above the substrate 801 and oriented in a direction perpendicular to device electrodes 803 of the electron emission devices. Furthermore, a face plate 810 (constructed by forming a phosphor film 808 and a metal backing 809 on the inner surface of a glass substrate 807) is placed approximately 5 mm above the substrate 801 via a supporting frame 811. The joints of the face plate 810, supporting frame 811 and rear plate 802 are coated with frit glass, which is then calcined in the atmosphere or in a nitrogen environment at 400°~500° C. for no less than 10 min to effect sealing. The substrate 801 is fixed to the rear plate 802 also by using frit glass.

In FIG. 29, numeral 804 denotes an electron-emitting region. In this embodiment, a vessel 812 is constructed by the face plate 810, supporting frame 811 and rear plate 802, as described above. However, since the rear plate 802 is provided mainly for the purpose of reinforcing the substrate 801, it may be dispensed with if the substrate 801 itself has sufficient strength. The support frame 811 may be sealed directly on the substrate 801 so that the vessel 812 may be constructed by the face plate 810, support frame 811 and substrate 801.

The phosphor film 808 on the face plate 810 comprises only phosphors if the device is for monochromatic use. In the case of a phosphor film for a color display, however, the phosphor film comprises a black electrically conductive material 291, such as black stripes [see FIG. 12A] or a black matrix [FIG. 12B], and phosphors 292. The purpose of providing the black stripes or black matrix is to make compound colors and the like less conspicuous by blackening the coated portions between the phosphors 292, which are phosphors of the three primary colors necessary to present a color display, and to suppress a decline in contrast caused by reflection of external light at the phosphor film 808. In this embodiment, the phosphors 292 employ the striped configuration [FIG. 12A]. The black stripes are formed in advance and the coating of the various phosphors is applied in the gaps between them to fabricate the phosphor film 808.

As for the material constituting the black stripes, in this embodiment use is made of a substance whose principal ingredient is graphite. However, any material may be used so long as it is electrically conductive and allows but little light to pass through or to be reflected. As for the methods of coating the glass substrate 807 with the phosphors 292, a precipitation method or printing method can be used in case of a monochrome display. In this embodiment, which relates to a color display, the slurry method is employed. However, in case of a color display, it goes without saying that an equivalent coating film will be obtained even if the printing method is used.

The inner side of the phosphor film 808 usually is provided with the metal backing 809. The purpose of the metal backing 809 is to raise luminance by reflecting the part of the phosphor light emission that is directed toward the inner surface to the side of the face plate 810, to act as an electrode for applying an accelerating voltage to the electron beams, and to protect the phosphors 92 against damage due to bombardment of negative ions generated within the vessel 812. The metal backing 809 is fabricated by applying a smoothing treatment (usually referred to as "filming") to the inner surface of the phosphor film 808 after the phosphor film is formed, and then depositing aluminum (Al) by vacuum deposition. In order to improve the conductivity of the phosphor film 808, there are cases in which the face plate 810 is provided with transparent electrodes (not shown) on the side of the outer surface of the film 808. In this embodiment, however, the electrodes are not used since satisfactory conductivity is obtained with the metal backing 809 alone. Furthermore, when the joints of the face plate 810, support frame 811 and rear plate 802 are sealed, sufficient positioning is carried out since the color phosphors 242 of the various colors and the electron emission devices must be made to correspond in the case of a color display.

The environment within the glass vessel completed as described above is withdrawn through an exhaust pipe (not shown) using a vacuum pump. After a sufficient degree of vacuum is attained, a voltage is applied across the device electrodes 803 through external terminals $D_{r1} \sim D_{rm}$, $D_{L1} \sim D_{Lm}$, whereby the above-described forming treatment is applied. Thus, the electron-emitting regions 804 are formed to fabricate the electron emission devices on the substrate 801. Next, the exhaust pipe (not shown) is heated by a gas burner in a vacuum on the order of $10^{-6}$, thereby sealing off the vessel 812 by fusing it. Finally, a getter treatment is applied in order to maintain the vacuum after sealing. This is a treatment in which a getter, which has been disposed at a prescribed position (not shown) in the image display device, is heated by a heating method such as resistive heating or high-frequency heating immediately before sealing is performed or after sealing, thereby forming a vacuum-deposited film. The principal ingredient of the getter is Ba, etc. The vacuum is maintained by the vacuum pumping action of the vapor-deposited getter film.

In the image display device of the invention formed as described above, a voltage is applied to each of the electron emission devices through the external terminals $D_{r1} \sim D_{rm}$, $D_{L1} \sim D_{Lm}$, whereby electrons are emitted by the electron-emitting regions 804. After the emitted electrons pass through electron transmitting holes 805 of the modulating electrodes 806, a high voltage Hv greater than several kV is impressed upon the metal backing 809 or transparent electrodes (not shown) through a high-voltage terminal Hv, thereby accelerating the electrons. The electrons bombard the phosphor film 808, thereby exciting the phosphors 292 into light emission to display an image. At this time a voltage conforming to the information signal is applied to the modulating electrodes 806 through external electrodes G1 ~Gn, thereby controlling the electron beams that pass through the electron transmitting holes 805, as a result of which an image is displayed.

In this embodiment, the modulating electrodes 806 having the electron transmitting holes 805, the diameter of which is approximately 50 µm, is placed about 10 µm above the substrate 801 via an SiO2 insulating layer (not shown). When 6 kV is applied as the accelerating voltage, therefore, on/off control of the electron beam can be performed at a modulating voltage of less than 50 V.

Figure 30:
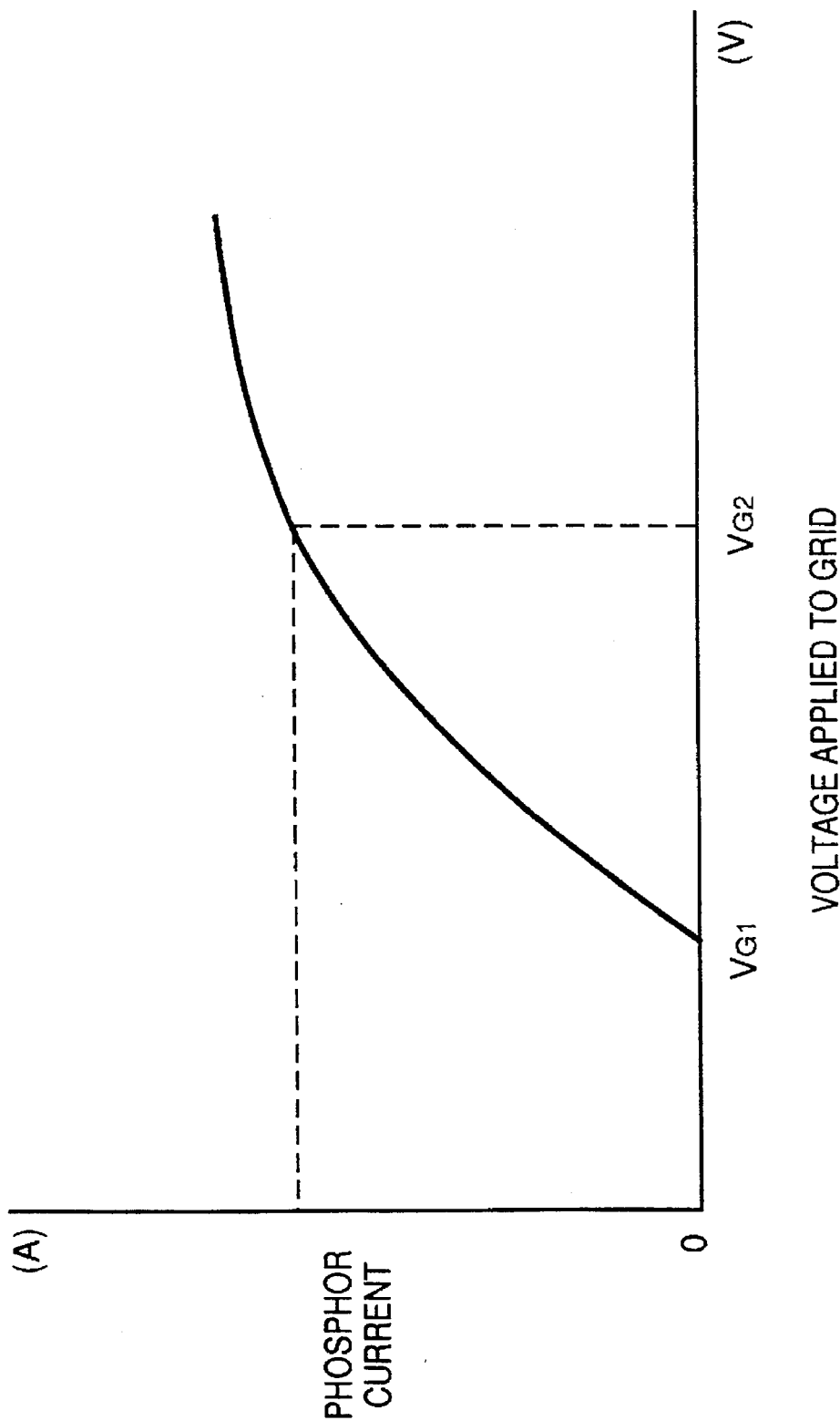
FIG. 30 is a diagram showing the modulation characteristic of a grid electrode in the display panel of FIG. 29.

FIG. 30 is a diagram showing the relationship between grid voltage $V_G$, which is applied to the modulating electrodes 806, and phosphor current which flows into the phosphor film 808. When the grid voltage $V_G$ is increased, the phosphor current begins to flow when the voltage exceeds a certain threshold value VG1. As the grid voltage $V_G$ is increased further, the phosphor current increases monotonously and eventually saturates, as illustrated in FIG. 30.

The components described above are those necessary to fabricate an image display device. The particular parts of the device, such as the materials constituting the various members, are not limited to those set forth above. Materials and parts may be appropriately selected so as to be suitable for application to the image display device.

It should be noted that color balance can be achieved even by changing the coefficients (see FIG. 14) of the conversion formula in the matrix circuit 712 of FIG. 27. The particular operation is as described earlier. Further, the control circuit 715 includes the R adjuster, G adjuster and B adjuster of FIG. 26 and is capable of operating in the same manner.

[Seventh Embodiment]

A seventh embodiment of the invention will now be described with reference to FIG. 31.

Figure 31:
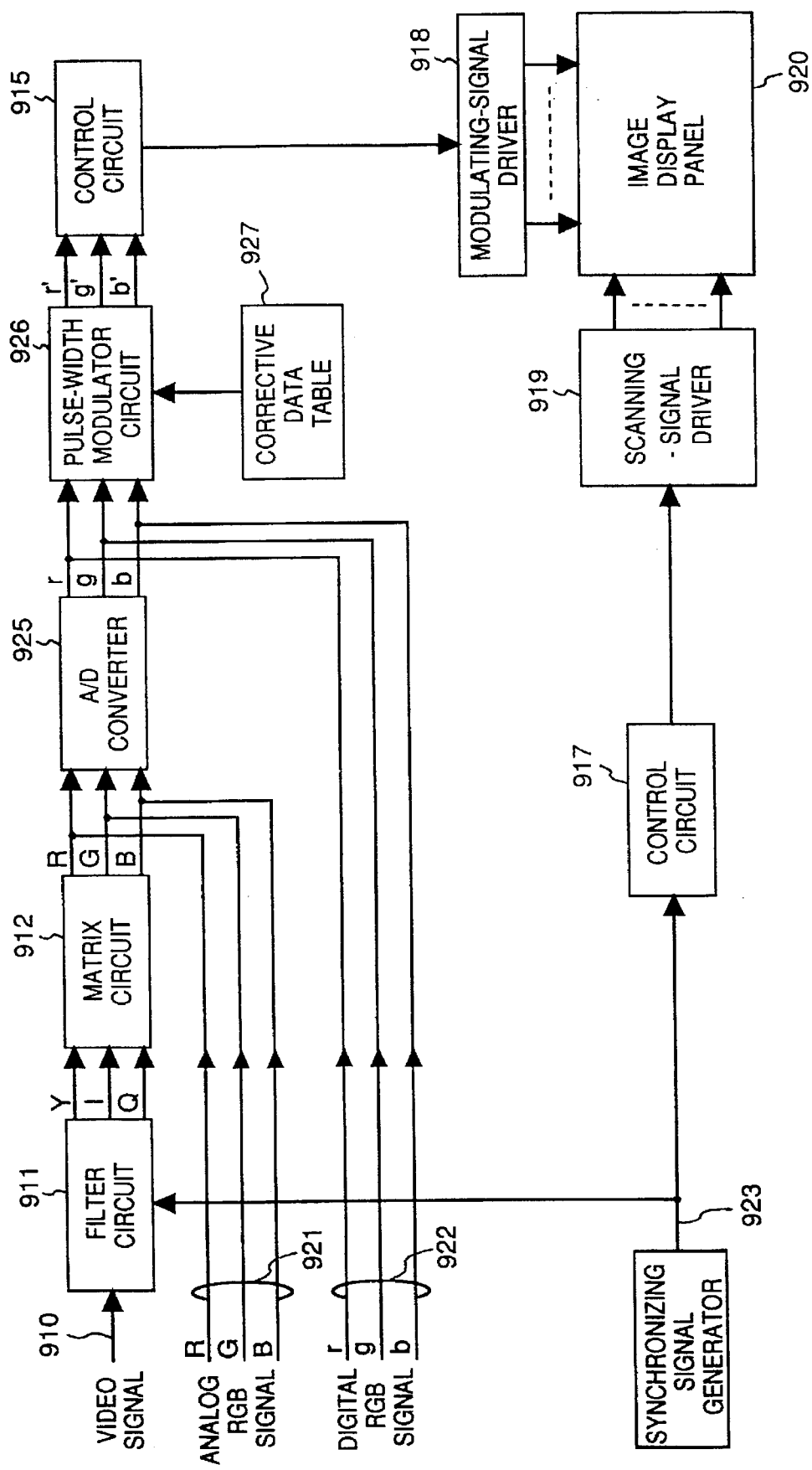
FIG. 31 is a block diagram of a circuit for controlling color signals having tones according to a seventh embodiment.

In FIG. 31, analog R, G, B signals obtained in the same manner as in FIG. 27 are converted into R, G, B signals by an A/D converter 925. It should be noted that if digital R, G, B signals are applied as the input, conversion by the A/D converter 925 will be unnecessary.

A pulse-width modulating circuit 926 is further provided for converting digitally converted R, G, B signals or inputted digital R, G, B signals (r, g, b) into pulse lengths in conformity with luminance. In accordance with a corrective data table 927 created on the basis of a disparity in the emission color characteristics of the phosphors 292 corresponding to the three primary colors, the pulse-width modulating circuit 926 converts the R, G, B signals into pulse-width modulated R, G, B signals (r', g', b') upon assigning weights independently to respective ones of the R, G, B signals. The R, G, B signals (r', g', b') enter a control circuit 915 which, through an operation similar to that described in connection with FIG. 27, delivers a signal conforming to the image data to a modulating-signal driver 918, whereby one line of the image is displayed. In synchronization with this display operation, a scanning-signal driver 919 is driven by a control circuit 917 through an operation similar to that of FIG. 27, thereby making it possible to present a two-dimensional display on an image display panel 920. It goes without saying that this operation can be realized also by the circuits of FIGS. 22–24.

An eighth embodiment according to the present invention will now be described with reference to FIG. 32.

Figure 32:
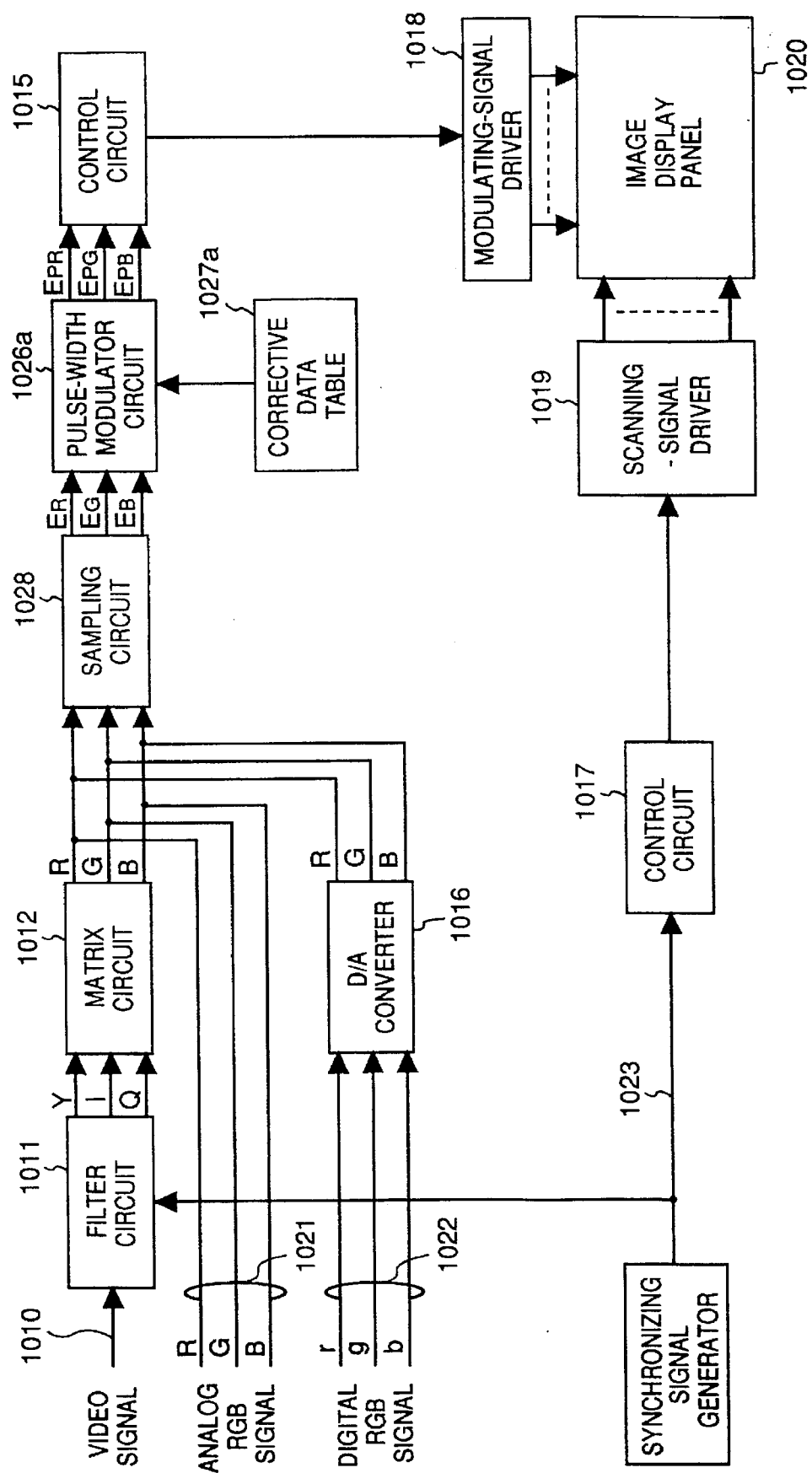
FIG. 32 is a block diagram of a circuit for controlling color signals having tones according to an eighth embodiment.
Figure 33:
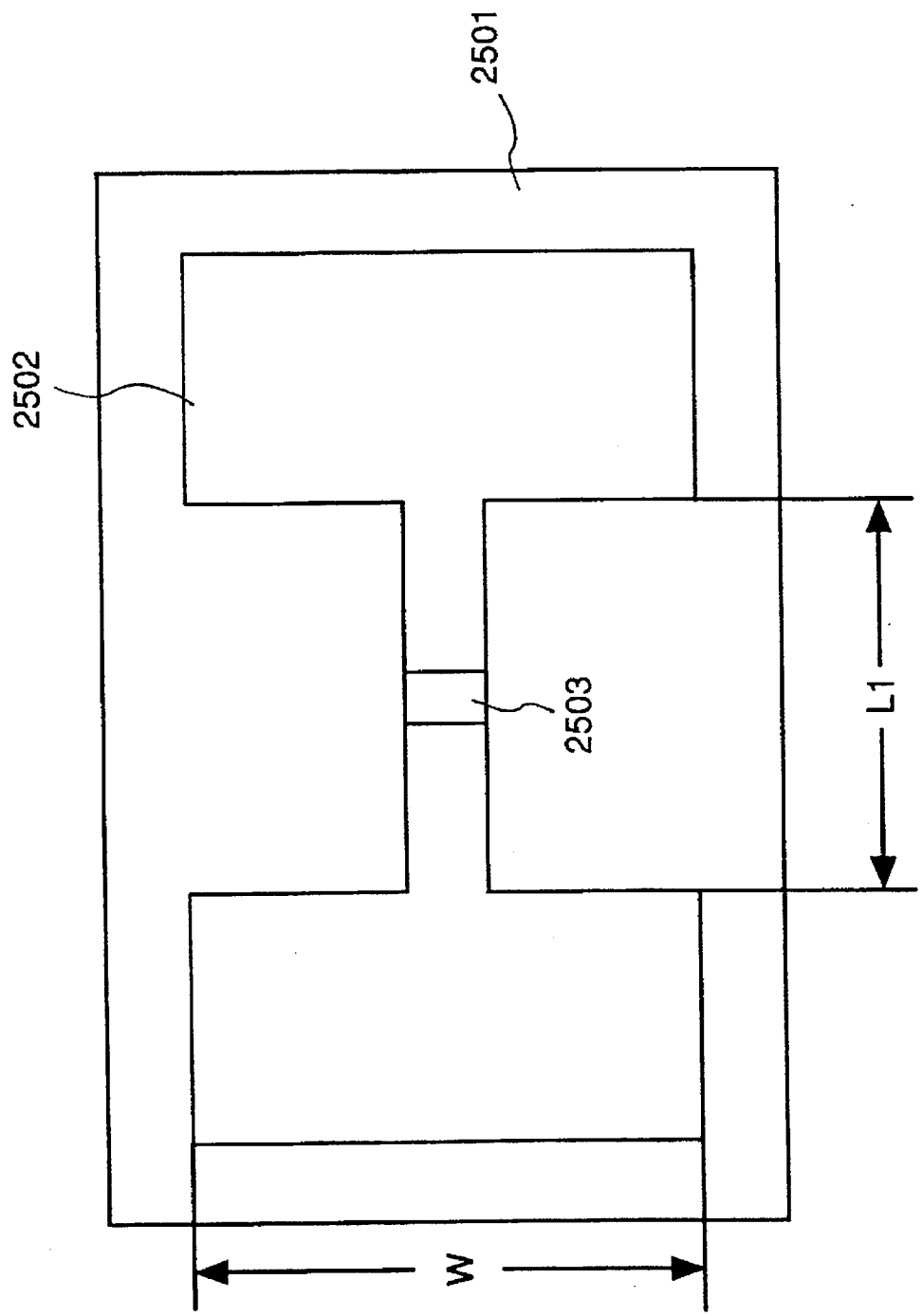
FIG. 33 is a plan view of a surface-conduction electron emitting devices according to the prior art.
Figure 34:
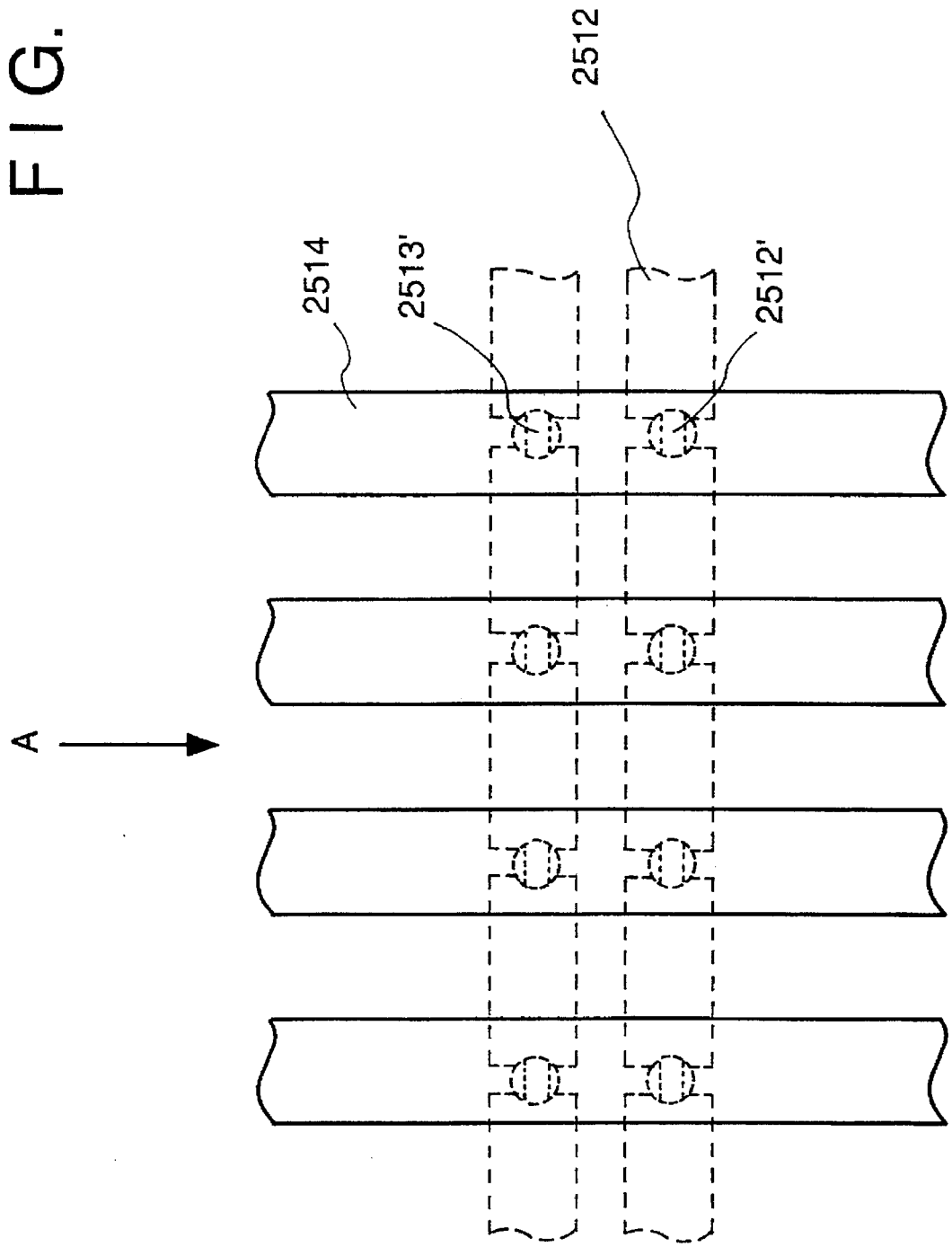
FIG. 34 is a diagram showing an example of the basic construction of a display device according to the prior art.
Figure 35:
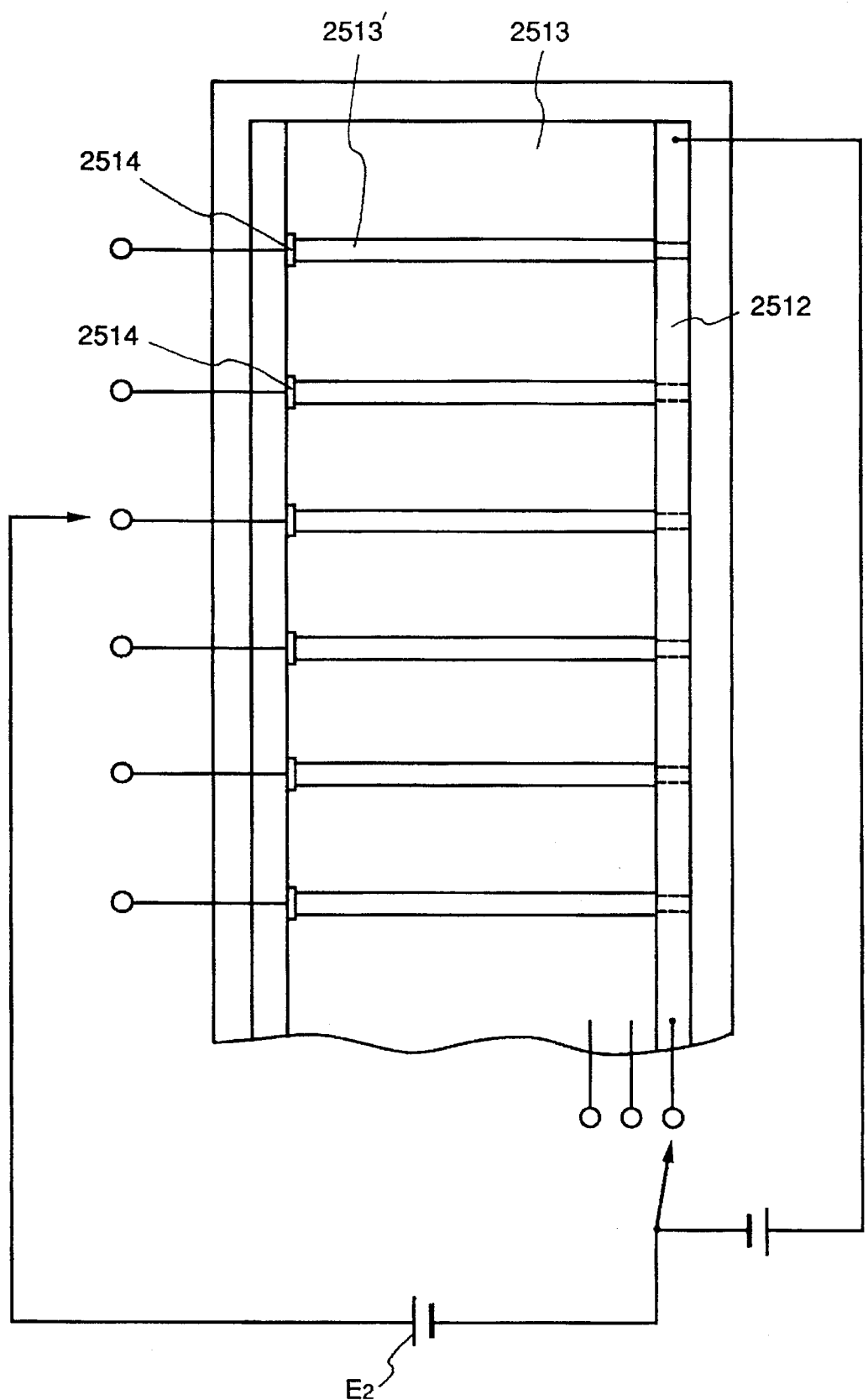
FIG. 35 is a sectional view showing a display device according to the prior art.

In FIG. 32, the analog R, G, B signals in the circuit of FIG. 32 are sampled by a sampling circuit 1028, and the sampled analog R, G, B signals are subjected to pulse-width modulation-by a pulse-width modulating circuit 1026a. This pulse-width modulating circuit 1026a also refers to a corrective data table 1027a to independently weight the modulated R, G, B signals. The modulated signals are outputted to a control circuit 1015 to obtain the drive signals of a modulating-signal driver 1018.

The pulse-width modulating circuit 1026a of FIG. 32 is composed of circuitry similar to that of FIGS. 18 through 21 and operates in a similar manner.

In accordance with the embodiments as described above, tone control and color-signal control can be carried out in a color-image display device that relies upon surface-conduction electron emitting devices. More specifically, control of color shift and color balance, which was a problem when displaying color signals having tones, can be readily performed on the receiver side.

Furthermore, since the method of controlling tone according to the embodiments is executed independently of the electron emission devices, variance can be corrected for if any should develop in the electrical characteristics of the surface-conduction electron emitting devices corresponding to the various colors. As a result, the manufacturing yield of the color-image forming device is improved.

The display device of the present invention can be applied widely in apparatus that present a television display based upon NTSC television signals, and in display devices connected directly or indirectly to image signal sources such as computers, image memories and communication networks. The display device is well suited to large-screen displays that display images having a large capacity.

In accordance with the present invention, it is possible to present a flat-type color display exhibiting excellent tone.

As many apparently widely different embodiments of the present invention can be made without departing from the spirit and scope thereof, it is to be understood that the invention is not limited to the specific embodiments thereof except as defined in the appended claims.

What is claimed is:

1. An image forming device comprising:

an electron-beam generating source in which a plurality of surface-conduction electron emitting devices are arrayed on a substrate;

phosphors for the three primary colors red, green and blue for emitting light in response to being irradiated with electron beams from said electron-beam generating source; and modulating means for modulating the electron beams, which irradiate said phosphors, based upon an image signal, said modulating means having correcting means for subjecting the image signal to a gamma correction, said modulating means modulating the electron beams based upon the image signal corrected in advance by said correcting means, and wherein said electron-beam generating source includes a device group in which a plurality of surface-conduction electron emitting devices are arrayed along a row direction on the substrate, and an electrode array in which grid electrodes are arrayed along a column direction, which is substantially perpendicular to the row direction, on or off said substrate.

2. The device according to claim 1, wherein said modulating means has at least correcting means for correcting the image signal based upon a gamma characteristic, of light-emission intensity vs. amount of electron beam irradiation, of the phosphors.

3. The device according to claim 1, wherein said modulating means has at least correcting means for correcting the image signal based upon a gamma characteristic, of amount of electron beam transmission vs. grid-electrode application signal, of said grid electrodes.

4. An image forming device comprising:

an electron-beam generating source in which a plurality of surface-conduction electron emitting devices are arrayed on a substrate;

phosphors for the three primary colors red, green and blue for emitting light in response to being irradiated with electron beams from said electron-beam generating source; and modulating means for modulating the electron beams, which irradiate said phosphors, based upon an image signal, said modulating means having correcting means for subjecting the image signal to a gamma correction, said modulating means modulating the electron beams based upon the image signal corrected in advance by said correcting means, and wherein said means for modulating the electron beams that irradiate the phosphors modulates a length of time, during which phosphors are irradiated with the electron beams, based upon the gamma-corrected image signal.

5. The device according to claim 4, wherein said modulating means has means for adjusting the modulating signal, which is for modulating the electron beams, independently for each of the color components (red, green, blue).

6. The device according to claim 5, wherein said means for adjusting the modulating signal, which is for modulating the electron beams, independently for each of the color components (red, green, blue) includes a comparator provided individually for each color component of the gamma-corrected image signal, said adjusting means independently adjusting a correlation between a comparison reference of each comparator and the image signal.

7. The device according to claim 5, wherein said means for adjusting the modulating signal, which is for modulating the electron beams, independently for each of the color components (red, green, blue) includes an amplifier, the amplification factor of which is capable of being adjusted independently, and a comparator, said amplifier and comparator being provided for each color component of the gamma-corrected image signal, image signals amplified by said amplifiers being compared with reference values in said comparators, whereby modulated pulses are generated.

8. The device according to claim 5, wherein said means for adjusting the modulating signal, which is for modulating the electron beams, independently for each of the color components (red, green, blue) includes a pulse-width modulator provided individually for each color component of the gamma-corrected image signal, said adjusting means independently adjusting the frequency of an operating reference clock of each pulse-width modulator.

9. The device according to claim 4, wherein said electron-beam generating source includes a plurality of surface-conduction electron emitting devices arrayed two-dimensionally on the substrate, said devices being connected in the form of a matrix by wiring in a row direction and wiring in a column direction.

10. The device according to claim 9, wherein said modulating means has at least correcting means for correcting the image signal based upon a gamma characteristic, of emission-current intensity vs. applied voltage, of the surface-conduction electron emitting devices.

11. The device according to claim 9, wherein said modulating means has at least correcting means for correcting the image signal based upon a gamma characteristic, of light-emission intensity vs. amount of electron beam irradiation, of the phosphors.

12. The device according to claim 4, wherein said electron-beam generating source includes a device group in which a plurality of surface-conduction electron emitting devices are arrayed along a row direction on the substrate, and an electrode array in which grid electrodes are arrayed along a column direction, which is substantially perpendicular to the row direction, or off said substrate.

13. The device according to claim 12, wherein said modulating means has at least correcting means for correcting the image signal based upon a gamma characteristic, of light-emission intensity vs. amount of electron beam irradiation, of the phosphors.

14. The device according to claim 12, wherein said modulating means has at least correcting means for correcting the image signal based upon a gamma characteristic, of amount of electron beam transmission vs. grid-electrode application signal, of said grid electrodes.

15. An image forming device comprising:

an electron-beam generating source in which a plurality of surface-conduction electron emitting devices are arrayed on a substrate;

phosphors for the three primary colors red, green and blue for emitting light in response to being irradiated with electron beams from said electron-beam generating source; and modulating means for modulating the electron beams, which irradiate said phosphors, based upon an image signal, said modulating means having correcting means for subjecting the image signal to a gamma correction, said modulating means modulating the electron beams based upon the image signal corrected in advance by said correcting means, and wherein said means for modulating the electron beams that irradiate the phosphors modulates the current amplitude of the electron beams, which irradiate the phosphors, based upon the gamma-corrected image signal, wherein said modulating means has means for adjusting the modulating signal, which is for modulating the electron beams, independently for each of the color components (red, green, blue), and wherein said means for adjusting the modulating signal, which is for modulating the electron beams, independently for each of the color components (red, green, blue), includes a level shifter provided individually for each color component of the gama-corrected image signal, said adjusting means independently adjusting an amount of shift of each level shifter.

16. An image forming method using an image forming device having at least an electron-beam generating source in which a plurality of surface-conduction electron emitting devices are arrayed on a substrate, phosphors for the three primary colors red, green and blue for emitting light in response to being irradiated with electron beams from said electron-beam generating source, and modulating means for modulating the electron beams, which irradiate said phosphors, based upon an image signal, said method comprising the following steps in a process for forming an image:

A a step of subjecting an image signal, which includes tone information and is inputted from an external image information source, to a gamma correction based upon light-emission characteristics of said image forming device in which the surface-conduction electron emitting devices serve as the electron-beam generating source; and B a step of modulating the electron beams based upon the image signal corrected in advance at said step A, wherein said step B includes a step of generating a modulating signal for modulating a length of time, during which the phosphors are irradiated with the electron beams, based upon an image signal gamma-corrected in advance.

17. The method according to claim 16, wherein said step B includes a step of adjusting the image signal or modulating signal independently for each of the color components (red, green, blue).

* * * * *

UNITED STATES PATENT AND TRADEMARK OFFICE
CERTIFICATE OF CORRECTION

PATENT NO. : 5,654,607

DATED : August 5, 1997

INVENTOR(S): EIJI YAMAGUCHI ET AL.   Page 1 of 3

It is certified that error appears in the above-identified patent and that said Letters Patent is hereby corrected as shown below:

On the title page, item

[30] FOREIGN APPLICATION PRIORITY DATA

"Apr. 5, 1995 [JP] Japan ... 5-077898" should read
--Apr. 5, 1993 [JP] Japan ... 5-077898--.

[56] REFERENCES CITED

Foreign Patent Documents
"4531615 10/1970 Japan." should be deleted as a duplicate.
"6431332 2/1989 Japan." should be deleted as a duplicate.
Other Publications
"H. Araki, et al., "Electroforming and Electron Emission of Carbon Thin Films", Journal of the Vacuum Society of Japan, vol. 26, No. 1." should be deleted as a duplicate.

In "C.A. Spindt, et al." "molybdenum" should read
--Molybdenum--.

Insert: --McInwain et al., "Principles of Color Television" (Wiley, New York) 1956 "contents" pages.--.

In the Drawings:
SHEET 25

Figure 24, ""SYNCRONIZING" should read --SYNCHRONIZING--.

SHEET 26

Figure 25B-D, "SIGANL" should read --SIGNAL--.

UNITED STATES PATENT AND TRADEMARK OFFICE
CERTIFICATE OF CORRECTION

PATENT NO. : 5,654,607

DATED : August 5, 1997

INVENTOR(S): EIJI YAMAGUCHI ET AL.   Page 2 of 3

It is certified that error appears in the above-identified patent and that said Letters Patent is hereby corrected as shown below:

COLUMN 1

Line 32, "32.616" should read --32.646--.
　　Line 39, "this" should read --these--.
　　Line 42, "Dillmer" should read --Dittmer--.
　　Line 52, "a" should read --an--.

COLUMN 2

Line 18, "is" should read --are--.
　　Line 40, "devices" should read --device--.
　　Line 44, "area" should read --are--.

COLUMN 8

Line 60, "devices" should read --device--.

COLUMN 14

Line 32, "$LAB_6$," should read --$LaB_6, O$--.

COLUMN 25

Line 25, "of" should be deleted.

COLUMN 26

Line 66, "devices," should read --device,--.

UNITED STATES PATENT AND TRADEMARK OFFICE
CERTIFICATE OF CORRECTION

PATENT NO. : 5,654,607

DATED : August 5, 1997

INVENTOR(S) : EIJI YAMAGUCHI ET AL.

It is certified that error appears in the above-identified patent and that said Letters Patent is hereby corrected as shown below:

<u>COLUMN 27</u>

```
  Line 57, "equipped-with" should read --equipped with--.
```

<u>COLUMN 29</u>

```
  Line 2, "Signal," should read --signal,--.
  Line 48, "gird." should read --grid.--.
```

Signed and Sealed this

Eighteenth Day of August, 1998

Attest:

BRUCE LEHMAN

*Attesting Officer*   *Commissioner of Patents and Trademarks*